US012786297B2

(12) United States Patent
Zhang et al.

(10) Patent No.: US 12,786,297 B2
(45) Date of Patent: Nov. 3, 2026

(54) DISPLAY CONTROL METHOD AND APPARATUS

(71) Applicant: Honor Device Co., Ltd., Shenzhen (CN)

(72) Inventors: Cheng Zhang, Shenzhen (CN); Danhong Li, Shenzhen (CN); Yao Cao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 383 days.

(21) Appl. No.: 18/277,452

(22) PCT Filed: Apr. 19, 2023

(86) PCT No.: PCT/CN2023/089153

§ 371 (c)(1),
(2) Date: Aug. 16, 2023

(87) PCT Pub. No.: WO2023/236663

PCT Pub. Date: Dec. 14, 2023

(65) Prior Publication Data

US 2025/0008007 A1 Jan. 2, 2025

(30) Foreign Application Priority Data

Jun. 7, 2022 (CN) ......................... 202210635122.2

(51) Int. Cl.
*H04M 1/02* (2006.01)
*G06F 1/16* (2006.01)
(Continued)

(52) U.S. Cl.
CPC ........ *H04M 1/0245* (2013.01); *G06F 1/1652* (2013.01); *G06F 3/1423* (2013.01); *H04M 1/0214* (2013.01); *H04M 1/0268* (2013.01); *H04M 1/72403* (2021.01); *H04M 2250/16* (2013.01)

(58) Field of Classification Search
USPC .......................................................... 715/761
See application file for complete search history.

(56) References Cited

U.S. PATENT DOCUMENTS 9,817,549 B2 * 11/2017 Chandrasekaran .......................... H04M 1/72412
2014/0347397 A1 11/2014 Wu
(Continued)

FOREIGN PATENT DOCUMENTS

CN 104182114 A 12/2014
CN 109240575 A 1/2019
(Continued)

*Primary Examiner* — William L Bashore
*Assistant Examiner* — Koorosh Nehchiri
(74) *Attorney, Agent, or Firm* — Leydig, Voit & Mayer, Ltd.

(57) ABSTRACT

This application provides a display control method and apparatus, applied to an electronic device. The method includes: in response to a first type of operation of a user, if the electronic device is in a first usage posture of a folded state, displaying first application content in a first display direction through the first display screen, and if the electronic device is in a first usage posture of an unfolded state, displaying the first application content in the first display direction through the second display screen.

20 Claims, 43 Drawing Sheets

(51) Int. Cl.
*G06F 3/14* (2006.01)
*H04M 1/72403* (2021.01)

(56) References Cited

U.S. PATENT DOCUMENTS

| | | | | |
|---|---|---|---|---|
| 2017/0097692 | A1* | 4/2017 | Furukawa | G06F 1/1694 |
| 2019/0042066 | A1* | 2/2019 | Kim | H04M 1/725 |
| 2022/0075519 | A1 | 3/2022 | Clark et al. | |
| 2022/0107821 | A1 | 4/2022 | Zhu | |
| 2022/0269314 | A1* | 8/2022 | Chen | G06F 3/04886 |
| 2022/0335406 | A1* | 10/2022 | Xu | G06Q 20/3223 |
| 2022/0398057 | A1* | 12/2022 | Cheng | H04M 1/0268 |
| 2022/0414819 | A1* | 12/2022 | Rappaport | H04N 23/611 |
| 2023/0152862 | A1* | 5/2023 | Choi | G06F 3/14 361/679.27 |
| 2023/0298498 | A1* | 9/2023 | Luo | G09G 3/035 345/659 |

FOREIGN PATENT DOCUMENTS

| | | | | |
|---|---|---|---|---|
| CN | 110647731 | A | 1/2020 | |
| CN | 110691166 | A | 1/2020 | |
| CN | 110851067 | A | 2/2020 | |
| CN | 111669462 | A | 9/2020 | |
| CN | 112114912 | A | 12/2020 | |
| CN | 113535284 | A | 10/2021 | |
| CN | 114003161 | A | 2/2022 | |
| CN | 114401373 | A | 4/2022 | |
| CN | 115167616 | A | 10/2022 | |
| JP | 201773127 | A | 4/2017 | |
| WO | 2019127158 | A1 | 7/2019 | |
| WO | WO-2021093847 | A1 * | 5/2021 | G06F 3/0412 |
| WO | 2021139767 | A1 | 7/2021 | |
| WO | 2021208723 | A1 | 10/2021 | |
| WO | 2022031047 | A1 | 2/2022 | |

* cited by examiner

CONT. FROM FIG. 2C (8)

(9)

CONT. FROM FIG. 4C (6)

CONT. FROM FIG. 5B (5)

CONT. FROM FIG. 7A

CONT. FROM FIG. 12A

CONT. FROM FIG. 12E

DISPLAY CONTROL METHOD AND APPARATUS

CROSS-REFERENCE TO RELATED APPLICATIONS

This application is a national stage of International Application No. PCT/CN2023/089153, filed on Apr. 19, 2023, which claims priority to Chinese Patent Application No. 202210635122.2, filed on Jun. 7, 2022. The disclosures of both of the aforementioned application are hereby incorporated by reference in their entireties.

TECHNICAL FIELD

This application relates to the field of display technologies, and in particular, to a display control method and apparatus.

BACKGROUND

With the gradual maturity of folding screen technologies, there are more and more foldable electronic devices. When a foldable electronic device is in an unfolded state, the foldable electronic device can be used as a tablet, and displays content through an inner screen of the foldable electronic device. When the foldable electronic device is in a folded state, the foldable electronic device can be used as a mobile phone, and displays content through an outer screen of the foldable electronic device.

Display states of the inner screen and the outer screen include a landscape state and a portrait state. Content is displayed in the landscape state or the portrait state, but content display does not meet the needs of users. It can be seen that content display of the foldable electronic device needs to be improved.

SUMMARY

This application provides a display control method and apparatus, aiming at improving content display of foldable electronic devices. To achieve the foregoing objective, this application provides the following technical solutions.

According to a first aspect, this application provides a display control method, applied to an electronic device including a first display screen and a second display screen. The method includes: in response to a first type of operation of a user, if the electronic device is in a first usage posture of a folded state, displaying first application content in a first display direction through the first display screen, and if the electronic device is in a first usage posture of an unfolded state, displaying the first application content in the first display direction through the second display screen; in response to a second type of operation of a user, if the electronic device is switched from the first usage posture of the folded state to a second usage posture of the folded state and a first control flag of the electronic device is a first value, displaying the first application content in a second display direction through the first display screen, where the second display direction is different from the first display direction, and the first usage posture is different from the second usage posture; and if the electronic device is switched from the first usage posture of the unfolded state to a second usage posture of the unfolded state and a second control flag of the electronic device is a second value, continuing to display the first application content in the first display direction through the second display screen.

It can be seen from the above technical solutions that the electronic device can be used in different usage postures of the folded state or the unfolded state, the content is displayed through the first display screen in the folded state, and the content is displayed through the second display screen in the unfolded state. If the electronic device is switched from the first usage posture of the folded state to the second usage posture of the folded state and the first control flag is the first value, the first display screen is switched from the first display direction to the second display direction, and the first application content is displayed in the second display direction. If the electronic device is switched from the first usage posture of the unfolded state to the second usage posture of the unfolded state and the second control flag is the second value, the second display screen can continue to display the first application content in the first display direction, to control the first display screen and the second display screen based on the first control flag and the second control flag. Besides, the first control flag corresponds to the first display screen, and the second control flag corresponds to the second display screen. The first control flag and the second control flag are independent of each other and do not affect each other. Therefore, the first display screen can be independently controlled based on the first control flag, and the second display screen can be independently controlled based on the second control flag, preventing the display of the first display screen from affecting the display of the second display screen.

For example, the first usage posture and the second usage posture are respectively one of a portrait usage posture, a left landscape usage posture, and a right landscape usage posture. The portrait usage posture corresponds to portrait display, and the left landscape usage posture corresponds to left landscape display, and the right landscape usage gesture corresponds to right landscape display. If the electronic device is in the folded state and is switched from the portrait usage posture to the left landscape usage posture, the first control flag is the first value, and the first value indicates that a first display screen automatic rotation function is enabled, the electronic device can be switched from portrait display to left landscape display to display the first application content. If the electronic device is in the unfolded state and is switched from the portrait usage posture to the left landscape usage posture, the second control flag is the second value, and the second value indicates that an automatic rotation function of the second display screen is disabled, the usage posture of the electronic device changes but the second display screen still displays the first application content in the portrait mode, so that the display of the first display screen and the second display screen can be independently controlled according to whether the automatic rotation function is enabled, so as to prevent the first display screen and the second display screen from affecting each other.

In a possible implementation, the method further includes: if the electronic device is switched from the first usage posture of the unfolded state to the second usage posture of the unfolded state, and the second control flag is the first value, displaying the first application content in the second display direction through the second display screen, where the first application content is content of a first application running in the foreground of the electronic device; in response to a third type of operation of the user, adjusting the second control flag from the first value to the second value; in response to the second type of operation of the user, if the electronic device is switched from the second usage posture of the unfolded state to a third usage posture of the unfolded state, displaying the first application content in the second display direction through the second display screen, where the second usage posture and the third usage posture are different; in response to a fourth type of operation of the user, switching an application running in the foreground of the electronic device from the first application to a second application, where the first application and the second application are landscape and portrait display applications; and displaying second application content in the second display direction through the second display screen, where the second application content is content of the second application.

In this embodiment, if the second control flag is the first value, it means that the electronic device has enabled the automatic rotation function of the second display screen, and when the usage posture of the electronic device in the unfolded state changes, the display direction of the second display screen can also change. When the second control flag maintains the second value, the application running in the foreground of the electronic device is switched from the first application to the second application of the same type as the first application, and the electronic device can display the content of the second application in the same display direction as that of the first application content, so that the first application and the second application of the same type can adopt the same display direction when the second control flag is the second value. Therefore, after the display direction is fixed, this reduces the probability that the display direction of the second display screen is forced to rotate due to application switching. For example, when the second control flag is the first value, the second display screen is displayed in left landscape mode, the electronic device is switched from the gallery application to the setting application, and when the setting application is started, the electronic device can display content of the setting application in left landscape mode.

In a possible implementation, the method further includes: in response to the fourth type of operation of the user, switching the application running in the foreground of the electronic device from the second application to the first application; and displaying the first application content in the second display direction through the second display screen, so that when the second control flag maintains the second value, after the electronic device runs the first application again, the content of the first application is still displayed in the previous display direction (that is, the second display direction).

In a possible implementation, after displaying the first application content in the second display direction through the second display screen or displaying the second application content in the second display direction through the second display screen, the method further includes: in response to a screen lock operation of the user, the second display screen is in a black screen state; when the second display screen is switched from the black screen state to an off screen display state, displaying an unlocking interface in the second display direction through the second display screen; and in response to an unlocking operation of the user, switching the second display screen from displaying the unlocking interface to displaying application content, and displaying application content in the second display direction through the second display screen. Because the second control flag maintains the second value, and the display direction of the electronic device is fixed at the second display direction, regardless of whether the unlocking interface or the application content is displayed, the electronic device can display the unlocking interface or the application content in the second display direction. Therefore, after the display direction is fixed, when the application is entered again, the display direction maintains unchanged and there is no forced rotation of the display direction.

In a possible implementation, the first application content is the content of the first application running in the foreground of the electronic device, and the first application is a landscape and portrait display application. The method further includes: in response to the fourth type of operation of the user, switching an application running in the foreground of the electronic device from the first application to a fourth application, where the fourth application is a portrait display application; and if the electronic device is switched from the first usage posture of the unfolded state to the second usage posture of the unfolded state, and the second control flag is the first value, displaying fourth application content in the second display direction or the first display direction through the second display screen, where the fourth application content is content of the fourth application, a usage direction of the first usage posture is one of portrait and inverted portrait, a usage direction of the second usage posture is opposite to that of the first usage posture, and the second display direction is opposite to the first display direction. For a portrait display application, after the electronic device is switched from a portrait usage posture to an inverted portrait usage posture, the display direction of the second display screen may change or maintain unchanged.

In a possible implementation, the method further includes: in response to the first type of operation of the user, if the electronic device is in a special usage posture of the unfolded state, and the second control flag is the first value, displaying the first application content in a portrait display direction through the second display screen; in response to the third type of operation of the user, adjusting the second control flag from the first value to the second value; and when the electronic device maintains the special usage posture of the unfolded state, displaying the first application content in the portrait display direction through the second display screen. In this embodiment, the special usage posture may be a flat posture. If the electronic device is in the flat posture, and the second control flag is the first value before the first application is started, the second display screen can display the first application content in the portrait mode. After the first application is started, the second control flag is adjusted to the second value. In this case, the first application content can maintain display in the portrait mode.

In a possible implementation, the method further includes: if the electronic device is in the special usage posture of the unfolded state and the second control flag is the first value after displaying the first application content, maintaining the display direction of the second display screen unchanged. For example, the second display screen displays the first application content in the second display direction, and then the electronic device is in the special usage posture of the unfolded state. Even if the second control flag is the first value, the second display screen still displays the first application content in the second display direction. If switching from the first application to the second application, when the electronic device maintains the special usage posture, the second display screen can display the content of the second application in the second display direction, so that the display direction of the second display screen maintains unchanged under the special usage posture.

In a possible implementation, the method further includes: determining a current usage form of the electronic device through an angle recognition module of the electronic device; determining a current usage posture of the electronic device through a direction recognition module of the electronic device; if the current usage form of the electronic device is the folded state, controlling display of the first display screen through a first display screen direction control module of the electronic device according to the current usage posture of the electronic device and the first control flag; and if the current usage form of the electronic device is the unfolded state, controlling display of the second display screen through a second display screen direction control module of the electronic device according to the current usage posture of the electronic device and the second control flag, so as to control the first display screen through the first display screen direction control module, and control the second display screen through the second display screen direction control module.

In a possible implementation, the method further includes: determining a type of the first application running in the foreground of the electronic device; and referring to the type of the first application by the first display screen direction control module and the second display screen direction control module when controlling the display, so as to control the display of the first display screen or the second display screen according to the type of the first application.

In a possible implementation, the controlling, if the current usage form of the electronic device is the unfolded state, display of the second display screen through a second display screen direction control module of the electronic device according to the current usage posture of the electronic device and the second control flag includes: if the first application is a landscape display application, controlling the second display screen to display in the left landscape mode when the current usage posture of the electronic device is the left landscape usage posture, and controlling the second display screen to display in the right landscape mode when the current usage posture of the electronic device is the right landscape usage posture; if the first application is a landscape and portrait display application and the current usage posture of the electronic device is a special usage posture, if it is determined that the second control flag is the first value before the first application is started, controlling the second display screen to display in the portrait mode, and if it is determined that the second control flag is the first value after the first application is started, controlling the second display screen to display in a display direction that is used before the first application is started; if the first application is a landscape and portrait display application and the current usage posture of the electronic device is not the special usage posture, if it is determined that the second control flag is the first value, controlling the second display screen to display in a display direction that matches the usage posture; and if the first application is a landscape and portrait display application, if it is determined that the second control flag is the second value, controlling the second display screen to display in an original effective direction, where the original effective direction is a display direction used by the second display screen for the last time before the second control flag is adjusted to the second value.

In a possible implementation, the controlling, if the current usage form of the electronic device is the unfolded state, display of the second display screen through a second display screen direction control module of the electronic device according to the current usage posture of the electronic device and the second control flag includes: if the first application is a portrait display application and the second control flag is the first value, controlling the second display screen to display in the portrait mode when the current usage posture of the electronic device is the portrait usage posture, and controlling the second display screen to display in portrait or inverted portrait mode when the current usage posture of the electronic device is an inverted portrait usage posture.

In a possible implementation, the determining a current usage form of the electronic device through an angle recognition module of the electronic device includes: obtaining a folding angle of the electronic device through the angle recognition module; if the folding angle of the electronic device is greater than a preset angle, determining that the electronic device is in the unfolded state; and if the folding angle of the electronic device is less than or equal to the preset angle, determining that the electronic device is in the folded state.

In a possible implementation, the determining a current usage posture of the electronic device through a direction recognition module of the electronic device includes: obtaining, by the direction recognition module, a pitch angle of the electronic device according to an acceleration value of a current frame; obtaining, by the direction recognition module, a deflection angle of the electronic device according to the pitch angle of the electronic device; and determining, by the direction recognition module, a usage direction of the electronic device according to the deflection angle of the electronic device, where the usage direction of the electronic device represents the usage posture of the electronic device.

In a possible implementation, the direction recognition module obtaining a pitch angle of the electronic device based on the acceleration value of the current frame includes: if the direction recognition module determines that a modulus of the acceleration value of the current frame does not exceed a preset modulus threshold, an amplitude difference between the acceleration value of the current frame and an acceleration value of a previous frame does not exceed a preset amplitude difference threshold, and a y-axis amplitude value of the acceleration value of the current frame is not a preset value, obtaining, by the direction recognition module, the pitch angle of the electronic device according to the acceleration value of the current frame; obtaining, by the direction recognition module, the deflection angle of the electronic device when the pitch angle is less than a preset pitch angle, and the determining, by the direction recognition module, a usage direction of the electronic device according to the deflection angle of the electronic device includes: correcting, by the direction recognition module, the deflection angle of the electronic device, where correcting the deflection angle includes correcting the deflection angle of the electronic device to a positive number if it is determined that the deflection angle of the electronic device is a negative number; maintaining the deflection angle unchanged if it is determined that the deflection angle of the electronic device is a positive number; and obtaining, by the direction recognition module, the usage direction of the electronic device according to the corrected deflection angle.

In a possible implementation, if the direction recognition module determines that a modulus of the acceleration value of the current frame exceeds a preset modulus threshold, or an amplitude difference between the acceleration value of the current frame and an acceleration value of a previous frame exceeds a preset amplitude difference threshold, or a y-axis amplitude value of the acceleration value of the current frame is a preset value, the direction recognition module determines that the acceleration value of the current frame is invalid; and/or the direction recognition module determines that the usage posture of the electronic device is the special usage posture when the pitch angle is greater than or equal to the preset pitch angle; and/or the direction recognition module replaces the acceleration value of the previous frame with the acceleration value of the current frame after determining the usage direction of the electronic device.

According to a second aspect, this application provides an electronic device. The electronic device includes a first display screen, a second display screen, one or more processors, and a memory; where the memory stores programs, and when executed by the one or more processors, the programs cause the electronic device to perform the above display control method.

According to a third aspect, this application provides a readable storage medium. The readable storage medium stores a computer program, and when the computer program is executed by a processor, the above display control method is implemented.

According to a fourth aspect, this application provides a display control apparatus, applied to an electronic device including a first display screen and a second display screen. The apparatus includes: a first control module, configured to: in response to a first type of operation of a user, if the electronic device is in a first usage posture of a folded state, display first application content in a first display direction through the first display screen, and if the electronic device is in a first usage posture of an unfolded state, display the first application content in the first display direction through the second display screen; a first display screen direction control module, configured to: in response to a second type of operation of a user, if the electronic device is switched from the first usage posture of the folded state to a second usage posture of the folded state and a first control flag of the electronic device is a first value, display the first application content in a second display direction through the first display screen, where the second display direction is different from the first display direction, and the first usage posture is different from the second usage posture; and a second display screen direction control module, configured to: if the electronic device is switched from the first usage posture of the unfolded state to a second usage posture of the unfolded state and a second control flag of the electronic device is a second value, continue to display the first application content in the first display direction through the second display screen.

It can be seen from the above technical solutions that the electronic device can be used in different usage postures of the folded state or the unfolded state, the content is displayed through the first display screen in the folded state, and the content is displayed through the second display screen in the unfolded state. If the electronic device is switched from the first usage posture of the folded state to the second usage posture of the folded state and the first control flag is the first value, the first display screen is switched from the first display direction to the second display direction, and the first application content is displayed in the second display direction. If the electronic device is switched from the first usage posture of the unfolded state to the second usage posture of the unfolded state and the second control flag is the second value, the second display screen can continue to display the first application content in the first display direction, to control the first display screen and the second display screen based on the first control flag and the second control flag. Besides, the first control flag corresponds to the first display screen, and the second control flag corresponds to the second display screen. The first control flag and the second control flag are independent of each other and do not affect each other. Therefore, the first display screen can be independently controlled based on the first control flag, and the second display screen can be independently controlled based on the second control flag, preventing the display of the first display screen from affecting the display of the second display screen.

For example, the first usage posture and the second usage posture are respectively one of a portrait usage posture, a left landscape usage posture, and a right landscape usage posture. The portrait usage posture corresponds to portrait display, and the left landscape usage posture corresponds to left landscape display, and the right landscape usage gesture corresponds to right landscape display. If the electronic device is in the folded state and is switched from the portrait usage posture to the left landscape usage posture, the first control flag is the first value, and the first value indicates that a first display screen automatic rotation function is enabled, the electronic device can be switched from portrait display to left landscape display to display the first application content. If the electronic device is in the unfolded state and is switched from the portrait usage posture to the left landscape usage posture, the second control flag is the second value, and the second value indicates that an automatic rotation function of the second display screen is disabled, the usage posture of the electronic device changes but the second display screen still displays the first application content in the portrait mode, so that the display of the first display screen and the second display screen can be independently controlled according to whether the automatic rotation function is enabled, so as to prevent the first display screen and the second display screen from affecting each other.

In a possible implementation, the second display screen direction control module is configured to: if the electronic device is switched from the first usage posture of the unfolded state to the second usage posture of the unfolded state, and the second control flag is the first value, display the first application content in the second display direction through the second display screen, where the first application content is content of a first application running in the foreground of the electronic device. The apparatus further includes: an adjustment module and a switching module. The adjustment module is configured to: in response to the third type of operation of the user, adjust the second control flag from the first value to the second value. The second display screen direction control module is configured to: in response to the second type of operation of the user, if the electronic device is switched from the second usage posture of the unfolded state to a third usage posture of the unfolded state, display the first application content in the second display direction through the second display screen, where the second usage posture and the third usage posture are different. The switching module is configured to: in response to a fourth type of operation of the user, switch an application running in the foreground of the electronic device from the first application to a second application, where the first application and the second application are landscape and portrait display applications. The second display screen direction control module is configured to display second application content in the second display direction through the second display screen, where the second application content is content of the second application.

In this embodiment, if the second control flag is the first value, it means that the electronic device has enabled the automatic rotation function of the second display screen, and when the usage posture of the electronic device in the unfolded state changes, the display direction of the second display screen can also change. When the second control flag maintains the second value, the application running in the foreground of the electronic device is switched from the first application to the second application of the same type as the first application, and the electronic device can display the content of the second application in the same display direction as that of the first application content, so that the first application and the second application of the same type can adopt the same display direction when the second control flag is the second value. Therefore, after the display direction is fixed, this reduces the probability that the display direction of the second display screen is forced to rotate due to application switching. For example, when the second control flag is the first value, the second display screen is displayed in left landscape mode, the electronic device is switched from the gallery application to the setting application, and when the setting application is started, the electronic device can display content of the setting application in left landscape mode.

In a possible implementation, the switching module is configured to: in response to the fourth type of operation of the user, switch the application running in the foreground of the electronic device from the second application to the first application; and the second display screen direction control module is configured to display the first application content in the second display direction through the second display screen, so that when the second control flag maintains the second value, after the electronic device runs the first application again, the content of the first application is still displayed in the previous display direction (that is, the second display direction).

In a possible implementation, the apparatus further includes: a screen lock module, configured to: in response to a screen lock operation of the user, locking the second display screen in a black screen state; and an unlocking module, configured to: when the second display screen is switched from the black screen state to an off screen display state, display an unlocking interface in the second display direction through the second display screen; a second display screen direction control module, configured to: in response to an unlocking operation of the user, switch the second display screen from displaying the unlocking interface to displaying application content, and display application content in the second display direction through the second display screen. Because the second control flag maintains the second value, and the display direction of the electronic device is fixed at the second display direction, regardless of whether the unlocking interface or the application content is displayed, the electronic device can display the unlocking interface or the application content in the second display direction. Therefore, after the display direction is fixed, when the application is entered again, the display direction maintains unchanged and there is no forced rotation of the display direction.

In a possible implementation, the first application content is the content of the first application running in the foreground of the electronic device, and the first application is a landscape and portrait display application. The apparatus further includes: a switching module, configured to: in response to the fourth type of operation of the user, switch an application running in the foreground of the electronic device from the first application to a fourth application, where the fourth application is a portrait display application; and a second display screen direction control module, configured to: if the electronic device is switched from the first usage posture of the unfolded state to the second usage posture of the unfolded state, and the second control flag is the first value, display fourth application content in the second display direction or the first display direction through the second display screen, where the fourth application content is content of the fourth application, a usage direction of the first usage posture is one of portrait and inverted portrait, a usage direction of the second usage posture is opposite to that of the first usage posture, and the second display direction is opposite to the first display direction. For a portrait display application, after the electronic device is switched from a portrait usage posture to an inverted portrait usage posture, the display direction of the second display screen may change or maintain unchanged.

In a possible implementation, the second display screen direction control module is configured to: in response to the first type of operation of the user, if the electronic device is in a special usage posture of the unfolded state, and the second control flag is the first value, display the first application content in a portrait display direction through the second display screen. The apparatus further includes: an adjustment module, configured to: in response to the third type of operation of the user, adjust the second control flag from the first value to the second value; and a second display screen direction control module, configured to: when the electronic device maintains the special usage posture of the unfolded state, display the first application content in the portrait display direction through the second display screen. In this embodiment, the special usage posture may be a flat posture. If the electronic device is in the flat posture, and the second control flag is the first value before the first application is started, the second display screen can display the first application content in the portrait mode. After the first application is started, the second control flag is adjusted to the second value. In this case, the first application content can maintain display in the portrait mode.

In a possible implementation, the second display screen direction control module is configured to: if the electronic device is in the special usage posture of the unfolded state and the second control flag is the first value after displaying the first application content, maintain the display direction of the second display screen unchanged. For example, the second display screen displays the first application content in the second display direction, and then the electronic device is in the special usage posture of the unfolded state. Even if the second control flag is the first value, the second display screen still displays the first application content in the second display direction. If switching from the first application to the second application, when the electronic device maintains the special usage posture, the second display screen can display the content of the second application in the second display direction, so that the display direction of the second display screen maintains unchanged under the special usage posture.

In a possible implementation, the apparatus further includes: an angle recognition module and a direction recognition module, where the angle recognition module is configured to determine the current usage form of the electronic device and the direction recognition module is configured to determine the current usage posture of the electronic device; a first display screen direction control module, configured to: if the current usage form of the electronic device is the folded state, control display of the first display screen according to the current usage posture of the electronic device and the first control flag; and a second display screen direction control module, configured to: if the current usage form of the electronic device is the unfolded state, control display of the second display screen according to the current usage posture of the electronic the second control flag, so as to control the first display screen through the first display screen direction control module, and control the second display screen through the second display screen direction control module.

In a possible implementation, the apparatus further includes: a determining module, configured to determine a type of the first application running in the foreground of the electronic device. The first display screen direction control module and the second display screen direction control module refer to the type of the first application when controlling the display, so as to control the display of the first display screen or the second display screen according to the type of the first application.

In a possible implementation, the second display screen direction control module being configured to: if the current usage form of the electronic device is the unfolded state, control display of the second display screen according to the current usage posture of the electronic device and the second control flag includes: if the first application is a landscape display application, controlling the second display screen to display in the left landscape mode when the current usage posture of the electronic device is the left landscape usage posture, and controlling the second display screen to display in the right landscape mode when the current usage posture of the electronic device is the right landscape usage posture; if the first application is a landscape and portrait display application and the current usage posture of the electronic device is a special usage posture, if it is determined that the second control flag is the first value before the first application is started, controlling the second display screen to display in the portrait mode, and if it is determined that the second control flag is the first value after the first application is started, controlling the second display screen to display in a display direction that is used before the first application is started; if the first application is a landscape and portrait display application and the current usage posture of the electronic device is not the special usage posture, if it is determined that the second control flag is the first value, controlling the second display screen to display in a display direction that matches the usage posture; and if the first application is a landscape and portrait display application, if it is determined that the second control flag is the second value, controlling the second display screen to display in an original effective direction, where the original effective direction is a display direction used by the second display screen for the last time before the second control flag is adjusted to the second value.

In a possible implementation, the second display screen direction control module being configured to: if the current usage form of the electronic device is the unfolded state, control display of the second display screen according to the current usage posture of the electronic device and the second control flag includes: if the first application is a portrait display application and the second control flag is the first value, controlling the second display screen to display in the portrait mode when the current usage posture of the electronic device is the portrait usage posture, and controlling the second display screen to display in portrait or inverted portrait mode when the current usage posture of the electronic device is an inverted portrait usage posture.

In a possible implementation, the angle recognition module is configured to obtain a folding angle of the electronic device; if the folding angle of the electronic device is greater than a preset angle, determine that the electronic device is in the unfolded state; and if the folding angle of the electronic device is less than or equal to the preset angle, determine that the electronic device is in the folded state.

In a possible implementation, the direction recognition module is configured to obtain a pitch angle of the electronic device based on the acceleration value of the current frame; obtain a deflection angle of the electronic device according to the pitch angle of the electronic device; and determine a usage direction of the electronic device according to the deflection angle of the electronic device, where the usage direction of the electronic device represents the usage posture of the electronic device.

In a possible implementation, the direction recognition module is configured to: if the direction recognition module determines that a modulus of the acceleration value of the current frame does not exceed a preset modulus threshold, an amplitude difference between the acceleration value of the current frame and an acceleration value of a previous frame does not exceed a preset amplitude difference threshold, and a y-axis amplitude value of the acceleration value of the current frame is not a preset value, obtain the pitch angle of the electronic device according to the acceleration value of the current frame; obtain a deflection angle of the electronic device when the pitch angle is less than a preset pitch angle; and correct the deflection angle of the electronic device, where correcting the deflection angle includes correcting the deflection angle of the electronic device to a positive number if it is determined that the deflection angle of the electronic device is a negative number; maintain the deflection angle unchanged if it is determined that the deflection angle of the electronic device is a positive number; and obtain the usage direction of the electronic device according to the corrected deflection angle.

In a possible implementation, if the direction recognition module determines that a modulus of the acceleration value of the current frame exceeds a preset modulus threshold, or an amplitude difference between the acceleration value of the current frame and an acceleration value of a previous frame exceeds a preset amplitude difference threshold, or a y-axis amplitude value of the acceleration value of the current frame is a preset value, the direction recognition module is configured to determine that the acceleration value of the current frame is invalid; and/or the direction recognition module is configured to determine that the usage posture of the electronic device is the special usage posture when the pitch angle is greater than or equal to the preset pitch angle; and/or the direction recognition module is configured to replace the acceleration value of the previous frame with the acceleration value of the current frame after determining the usage direction of the electronic device.

In this application, based on the implementations according to the foregoing aspects, further combination may be performed, to provide more implementations.

DESCRIPTION OF EMBODIMENTS

Figure 1:
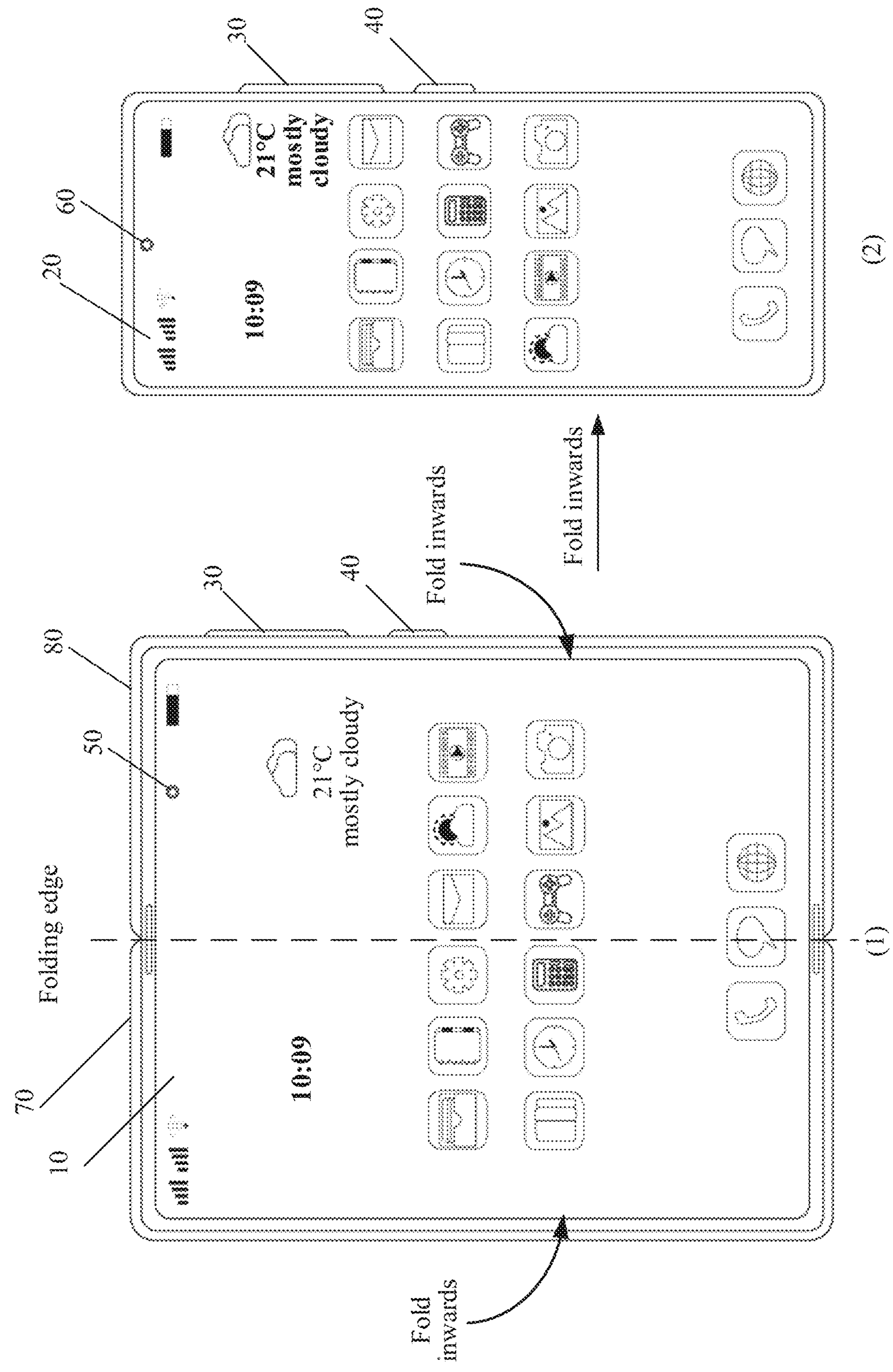
FIG. 1 is a schematic diagram of a usage form of a foldable electronic device according to this application.
Figure 2A:
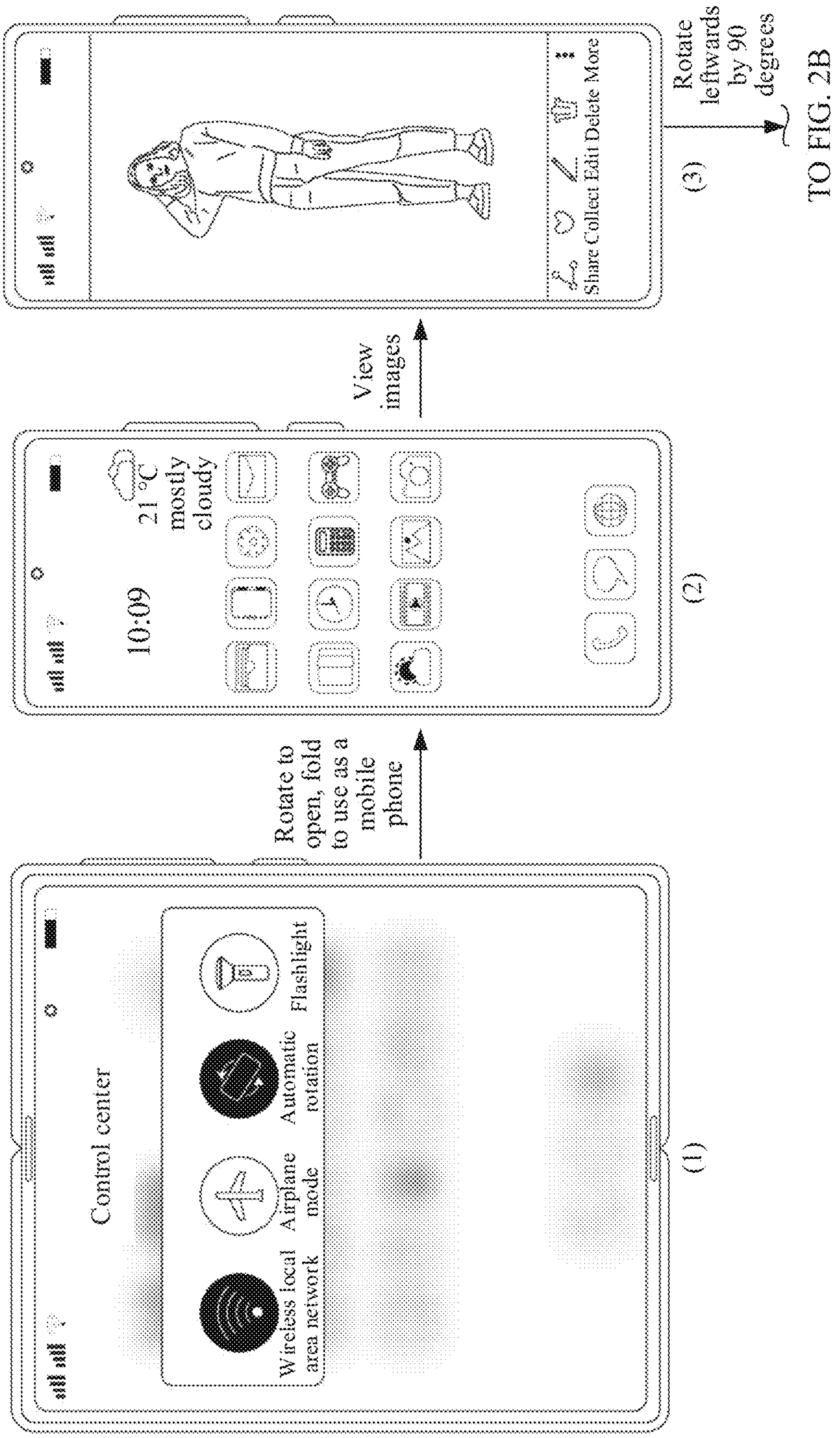
FIG. 2A, FIG. 2B, FIG. 2C, and FIG. 2D are a schematic diagram of displaying content on a display screen according to this application.
Figure 2B:
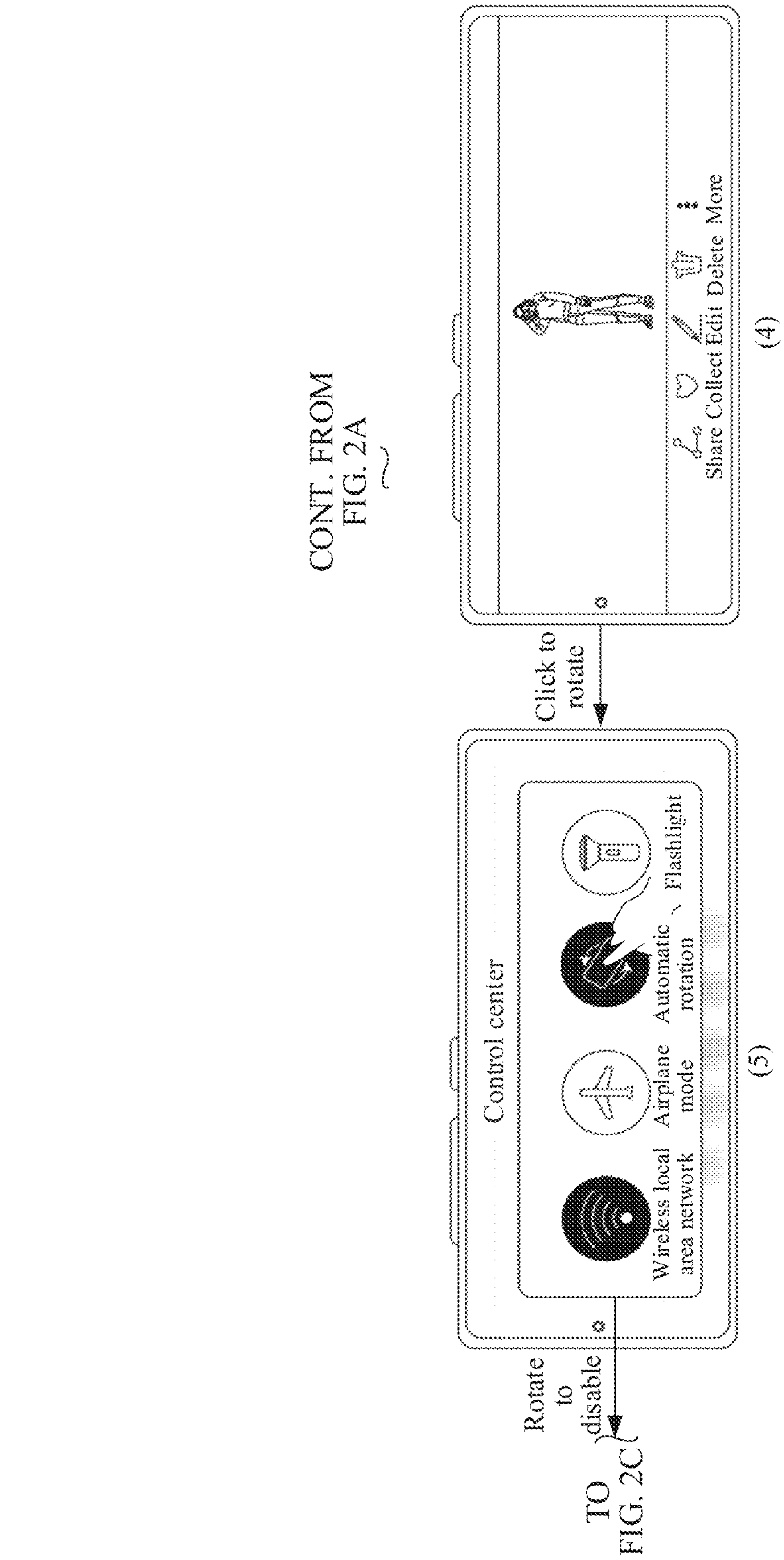
Figure 2C:
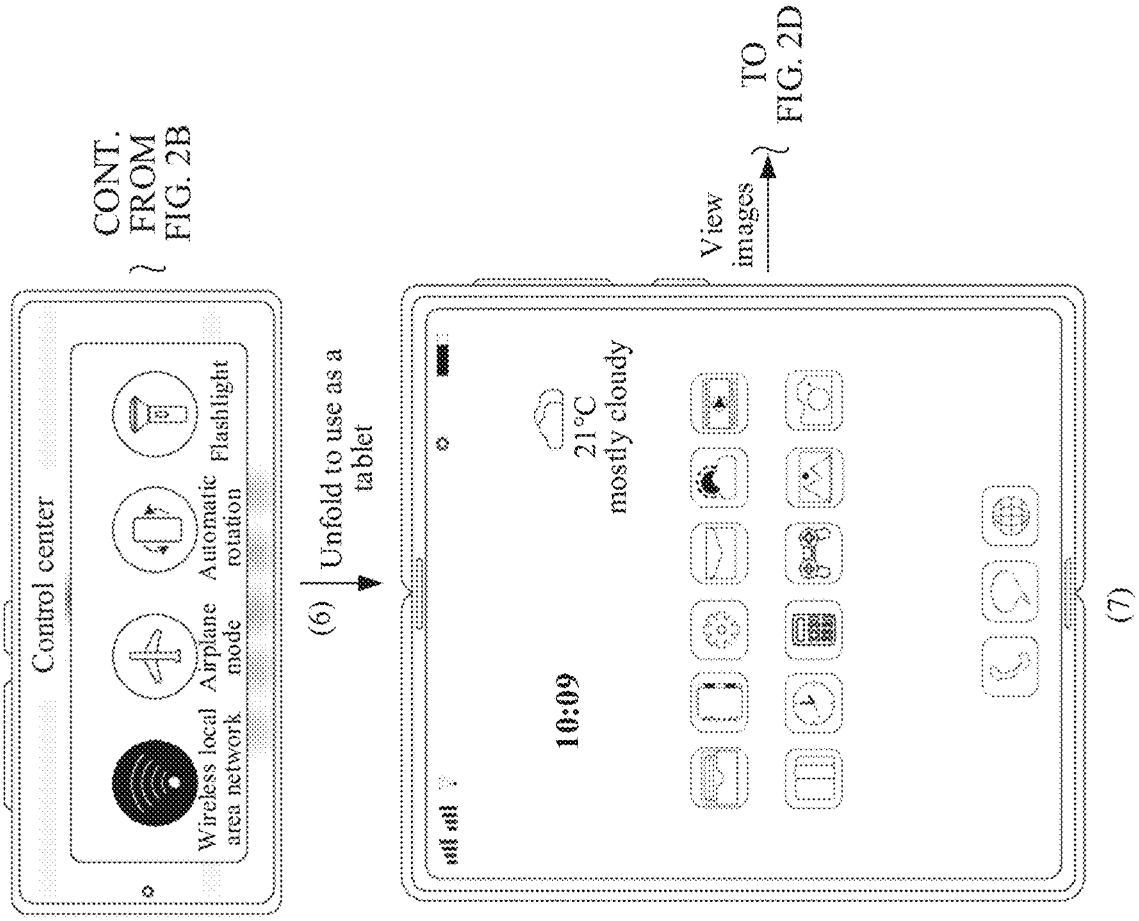
Figure 2D:
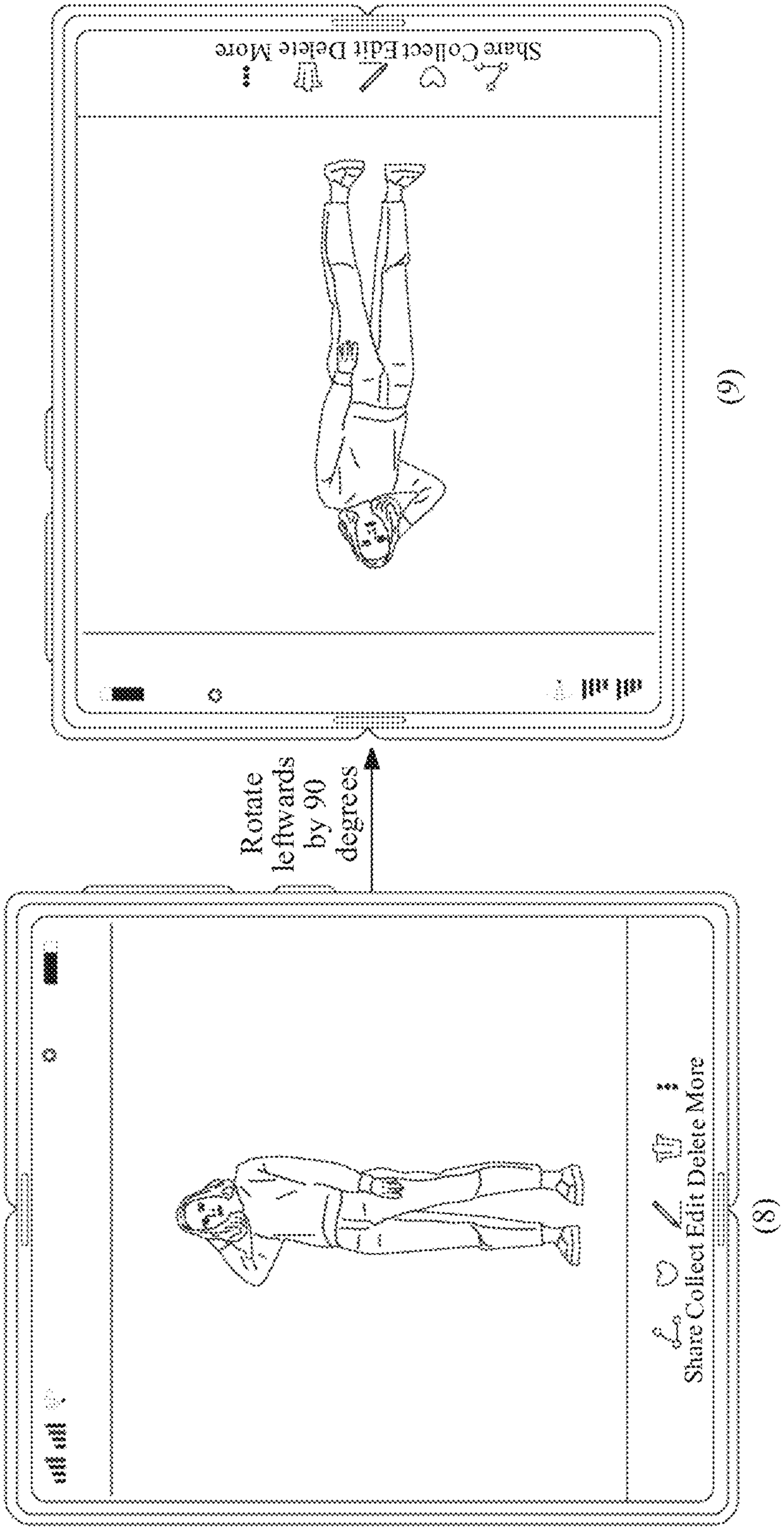

The following clearly and completely describes technical solutions in embodiments of this application with reference to the accompanying drawings in the embodiments of this application. Terms used in the following embodiments are only intended to describe particular embodiments, and are not intended to limit this application. As used in this specification and the claims of this application, a singular expression form, "one", "a", "the", "foregoing", "the", or "this", is intended to also include "one or more" expression form, unless clearly indicated to the contrary in the context. It should be further understood that, in the embodiments of this application, "one or more" means one, two, or more. "and/or" describes an association relationship between associated objects and represents that three relationships may exist, for example, A and/or B may mean: only A exists, both A and B exist, and only B exists, where A and B may be singular or plural. The character "/" generally indicates that associated objects are in an "or" relationship.

Reference to "one embodiment" or "some embodiments" described in this specification means that a specific characteristic, structure or feature described in combination with this embodiment is included in one or more embodiments of this application. Therefore, the statements "in one embodiment", "in some embodiments", "in other embodiments", "in some other embodiments", and the like in the differences in this specification do not necessarily refer to the same embodiment, but mean "one or more but not all embodiments", unless otherwise specially emphasized in other ways. The terms "include", "contain", "have" and their variations mean "including but not limited to", unless otherwise specially emphasized in other ways.

A plurality of involved in the embodiments of this application refers to two or more. It should be noted that in descriptions of the embodiments of this application, terms such as "first" and "second" are merely used for distinguishing descriptions, and cannot be understood as an indication or implication of relative importance, or an indication or implication of a sequence.

In order to provide a clear and concise description of the following embodiments, a brief introduction to relevant concepts or technologies is first provided:

An unfolded state means that an angle between a first body and a second body of an electronic device is 180 degrees or close to 180 degrees.

A folded state means that an angle between a first body and a second body of an electronic device may be 0 degrees or close to 0 degrees.

First portrait usage can also be called upward portrait usage or portrait usage, and refers to a portrait state in which when a user uses an electronic device, the top of the electronic device faces upwards. For example, in the world coordinate system, that the top of the electronic device faces upwards means that the top of the electronic device faces the positive direction of the Z-axis of the world coordinate system or has an angle with the positive direction of the Z-axis of the world coordinate system. An angle range of the angle can be (0, 45 degrees]. In the portrait state, the electronic device can be perpendicular to the horizontal plane formed by the X axis and the Y axis of the world coordinate system or has an angle with the horizontal plane. The top of the electronic device generally refers to the end of the electronic device with the camera.

Second portrait usage can also be called downward portrait usage or inverted portrait usage, and refers to a portrait state in which when a user uses an electronic device, the top of the electronic device faces downwards. For example, in the world coordinate system, that the top of the electronic device faces downwards means that the top of the electronic device faces the negative direction of the Z-axis of the world coordinate system or has an angle with the negative direction of the Z-axis of the world coordinate system. An angle range of the angle can be (−45 degrees, 0].

First landscape usage can also be called left landscape use, and refers to a landscape state in which when a user uses an electronic device, the top of the electronic device faces leftwards. For example, in the world coordinate system, that the top of the electronic device faces leftwards means that the top of the electronic device faces the negative direction of the X-axis of the world coordinate system. In the landscape state, the electronic device may be parallel to the landscape plane formed by the X axis and the Y axis of the world coordinate system or has an angle with the vertical plane formed by the Y axis and the Z axis.

Second landscape usage can also be called right landscape use, and refers to a landscape state in which when a user uses an electronic device, the top of the electronic device faces rightwards. For example, in the world coordinate system, that the top of the electronic device faces rightwards means that the top of the electronic device faces the positive direction of the X-axis of the world coordinate system.

The first portrait display, the second portrait display, the first landscape display and the second landscape display are four display modes (also called display directions) of content displayed by the electronic device. Among these four display modes, one display mode is the main one, and contents displayed in other display modes are rotated with reference to this display mode. For example, the first portrait display is the main one. When the electronic device displays content in first portrait mode, the rotation angle of the content is 0. Then, the second portrait display means that the content is rotated by 180 degrees relative to the first portrait display. First landscape display means that the content is rotated by 90° counterclockwise relative to the first portrait display, and second landscape display means that the content is rotated by 90° clockwise relative to the first portrait display. The first portrait display can be called upward portrait display or portrait display, the second portrait display can be called downward portrait display or inverted portrait display, the first landscape display can be called left landscape display, and the second landscape display may be called right landscape display.

FIG. 1 shows a schematic diagram of a foldable electronic device, which includes: an inner screen 10, an outer screen 20, a volume key 30, a power key 40, a first camera 50, a second camera 60, a first body 70, and a second body 80. The inner screen 10 can also be called the second display screen, the outer screen 20 can also be called the first display screen, and the inner screen and the outer screen are two display screens. The size of the inner screen 10 is larger than the size of the outer screen 20, the inner screen 10 is arranged on a first surface of the first body 70 and a first surface of the second body 80, and the outer screen 20 is arranged on a second surface of the first body 70. The first surface of the first body 70 and the second surface of the first body 70 are two opposite surfaces of the first body 70, the second surface of the second body 80 is provided with a housing, and similarly the first surface of the second body 80 and the second surface of the second body 80 are two opposite surfaces of the second body 80. The volume key 30 and the power key 40 are arranged on a side of the second body 80, the first camera 50 is disposed on the first body 70, and the second camera 60 is arranged on the second body 80.

For ease of description, the foldable electronic device is simply referred to as an electronic device. The electronic device can have two usage states, where the usage configuration of the electronic device includes an unfolded state and a folded state. (1) in FIG. 1 shows that the electronic device is in an unfolded state. In the unfolded state, the electronic device can be used as a tablet, the electronic device can display content through the inner screen 10, and the first camera 50 can be used as a front camera.

(2) in FIG. 1 shows that the electronic device is in a folded state. In the folded state, the electronic device can be used as a mobile phone, the electronic device can display content through the outer screen 20, and the second camera 60 can be used as a front camera. In the folded state, the first surface of the first body 70 is attached to the first surface of the second body 80, and the part of the inner screen on the first surface of the first body 70 is also attached to the part of the inner screen on the first surface of the second body 80, that is, in the folded state, the inner screen 10 is invisible to the user.

Regardless of whether the electronic device is used as a tablet or a mobile phone, the electronic device can be used in landscape or portrait mode. When the electronic device is used, the display screen can display content in landscape or portrait mode. For example, when the electronic device is used in the portrait mode, the display screen can display content in the portrait mode. When the electronic device is used in landscape mode, the display screen can display content in landscape mode. Certainly, when the electronic device is used in the portrait mode, the display screen can display content in landscape mode. The landscape mode includes a first landscape mode and a second landscape mode, and the portrait mode includes a first portrait mode and a second portrait mode.

FIG. 2A, FIG. 2B, FIG. 2C, and FIG. 2D show a schematic diagram of displaying content on a display screen, and the electronic device can control the display of content according to the automatic rotation function of the control center. One manner of controlling the display of content is that if the automatic rotation function is disabled, the electronic device rotates but the displayed content does not rotate. If the automatic rotation function is enabled, the electronic device rotates and the displayed content may also rotate. That is, when the automatic rotation function is enabled, the displayed content can rotate when the electronic device rotates. Generally, the automatic rotation function can also be called a direction lock function, a direction rotation function, or the like. When the electronic device is switched from landscape usage to portrait usage, it can be regarded as that the electronic device rotates, or when the electronic device is switched from a portrait usage to landscape usage, it can be regarded as that the electronic device rotates.

The display of content is described in conjunction with FIG. 2A, FIG. 2B, FIG. 2C, and FIG. 2D. (1) in FIG. 2A, FIG. 2B, FIG. 2C, and FIG. 2D shows a schematic interface diagram of a control center of an electronic device, and the automatic rotation controlling control (also called an automatic rotation control key or a rotation direction control key) in the control center corresponds to the automatic rotation function, and if the automatic rotation controlling control is enabled, the automatic rotation function is enabled. If the automatic rotation controlling control is disabled, the automatic rotation function is disabled. In (1) in FIG. 2A, FIG. 2B, FIG. 2C, and FIG. 2D, the electronic device is in the unfolded state and used as the tablet in first portrait mode. In (1) in FIG. 2A, FIG. 2B, FIG. 2C, and FIG. 2D, the automatic rotation controlling control has been enabled, and then the electronic device has enabled the automatic rotation function.

The user folds the electronic device inwards, the electronic device is switched from the unfolded state to the folded state, and the electronic device is used as a mobile phone, and as shown in (2) in FIG. 2A, FIG. 2B, FIG. 2C, and FIG. 2D, the electronic device is used as a mobile phone in first portrait mode. The user clicks the image application in the electronic device to view images in the image application, for example, switches from (2) in FIG. 2A, FIG. 2B, FIG. 2C, and FIG. 2D to (3) in FIG. 2A, FIG. 2B, FIG. 2C, and FIG. 2D, the electronic device can display the images, and the images are displayed in the first portrait display mode. In the first portrait display mode, the length of the image may be greater than the width of the image. The user can rotate the electronic device, as shown in (4) in FIG. 2A, FIG. 2B, FIG. 2C, and FIG. 2D, the user rotates the electronic device by 90 degrees to the left, and the mobile phone is switched from first portrait mode to left landscape mode. Because the automatic rotation function is enabled when the electronic device is used as a tablet, when the electronic device is used as a mobile phone, the automatic rotation function is enabled by default on the mobile phone, and the automatic rotation function is enabled. In this way, after rotating the electronic device by 90 degrees to the left, the image displayed on the electronic device changes. The image can be rotated by 90 degrees counterclockwise, as shown in (4) in FIG. 2A, FIG. 2B, FIG. 2C, and FIG. 2D, and the image is displayed in left landscape display mode. The left landscape display means that the image is rotated by 90 degrees counterclockwise in portrait display mode, and the length of the image in the left landscape display mode can be smaller than the width of the image.

In display of images, the user can view a control center menu through a slide down operation, and as shown in (5) in FIG. 2A, FIG. 2B, FIG. 2C, and FIG. 2D, the user clicks the automatic rotation controlling control in the control center to switch the automatic rotation controlling control from enabled to disabled. Correspondingly, the automatic rotation function is disabled, as shown in (6) in FIG. 2A, FIG. 2B, FIG. 2C, and FIG. 2D, and the automatic rotation function is disabled.

The user can fold the electronic device outwards, the electronic device is switched from the folded state to the unfolded state, and the electronic device is first used as a tablet, as shown in (7) in FIG. 2A, FIG. 2B, FIG. 2C, and FIG. 2D. The user may click the image application in the electronic device to view images in the image application, for example, switches from (7) in FIG. 2A, FIG. 2B, FIG. 2C, and FIG. 2D to (8) in FIG. 2A, FIG. 2B, FIG. 2C, and FIG. 2D, the electronic device can display the images, and the images are displayed in the first portrait display mode. The user can rotate the electronic device, and as shown in (9) in FIG. 2A, FIG. 2B, FIG. 2C, and FIG. 2D, the user rotates the electronic device by 90 degrees to the left. Because the automatic rotation function is disabled when the electronic device is used as a mobile phone, when the electronic device is used as a tablet, the automatic rotation function is disabled by default on the tablet, and the automatic rotation function is disabled. After the electronic device is rotated by 90 degrees to the left, the images displayed on the electronic device do not rotate, and as shown in (9) in FIG. 2A, FIG. 2B, FIG. 2C, and FIG. 2D, the image is still displayed in the first portrait display mode.

It can be seen from FIG. 2A, FIG. 2B, FIG. 2C, and FIG. 2D that after the electronic device is switched from the unfolded state to the folded state, the automatic rotation function of the electronic device in the unfolded state can continue to act on the electronic device in the folded state, so that the automatic rotation function of the electronic device in the unfolded state can affect usage of the electronic device in the folded state. Similarly, after the electronic device is switched from the folded state to the unfolded state, the automatic rotation function of the electronic device in the folded state can affect the usage of the electronic device in the unfolded state. For example, the automatic rotation function is enabled in the unfolded state, and then after the electronic device is switched to the folded state, the automatic rotation function is enabled by default on the electronic device in the folded state. If the automatic rotation function is disabled in the unfolded state, after the electronic device is switched to the folded state, the automatic rotation function may be disabled by default on the electronic device in the folded state. As a result, the automatic rotation of the inner and outer screens of the electronic device cannot be independently controlled, and therefore, landscape and portrait display switching of the inner and outer screens of the electronic device cannot meet the needs of users.

In view of the above problems, this application provides a display control method, which can realize the separate control of the direction rotation of the inner and outer screens, realize the independent control of the automatic rotation of the inner and outer screens, and meet the user needs for landscape and portrait switching of the inner and outer screens, to reduce the interference between the automatic rotation functions when the electronic device is used as a mobile phone and a tablet. Independent control means that the automatic rotation of the inner screen does not affect the automatic rotation of the outer screen, and the automatic rotation of the outer screen does not affect the automatic rotation of the inner screen.

In this embodiment, the inner screen automatic rotation function and the outer screen automatic rotation function are two independent functions, a corresponding inner screen automatic rotation controlling control and outer screen automatic rotation controlling control are two variables, and a detection method of the electronic device for these two variables is as follows:

One detection method is to set an automatic rotation controlling control in the electronic device to determine the current usage form of the electronic device according to the folding angle. If the electronic device is in the unfolded state, the automatic rotation controlling control is the inner screen automatic rotation controlling control. If the electronic device is in the folded state, the automatic rotation controlling control is the outer screen automatic rotation control. The folding angle is an angle between the first body of the electronic device and the second body of the electronic device.

Figure 3:
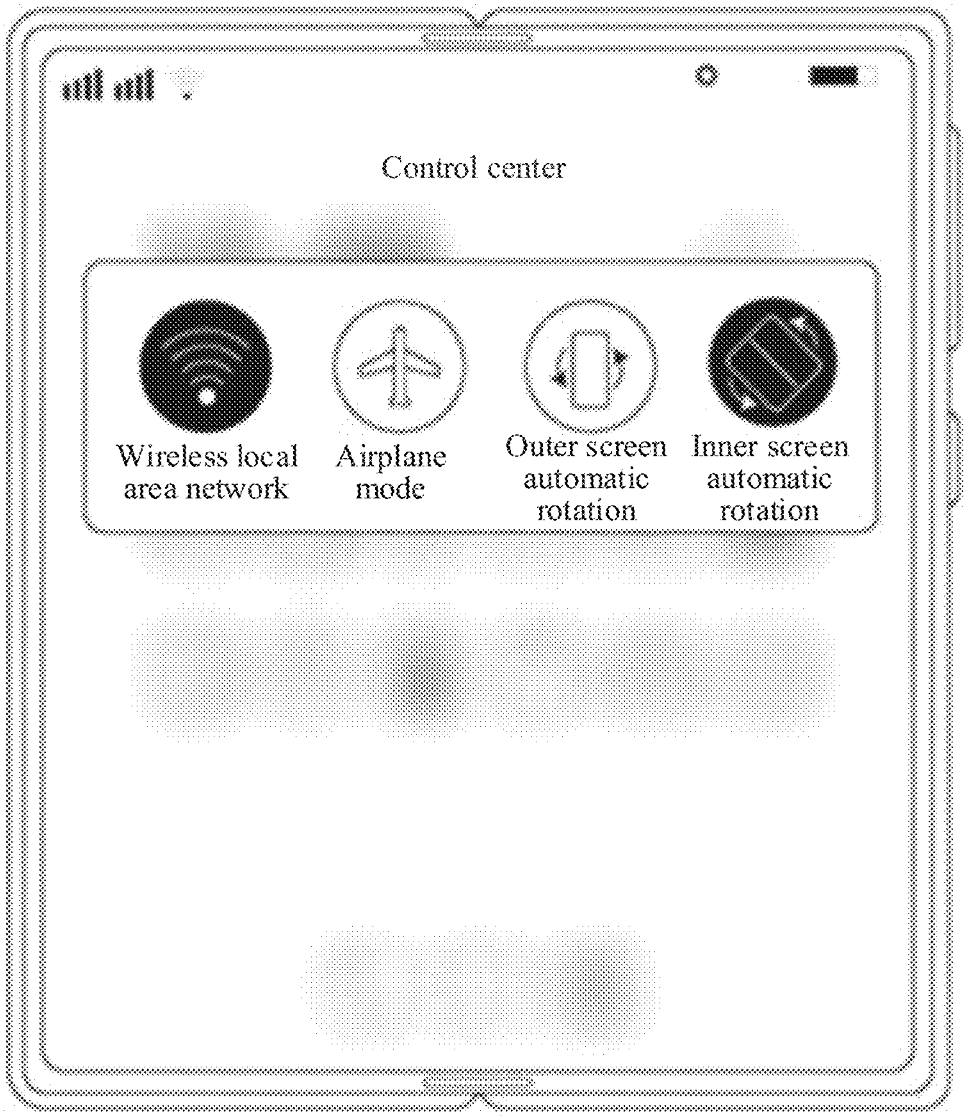
FIG. 3 is a schematic diagram of a control center menu according to this application.
Figure 4A:
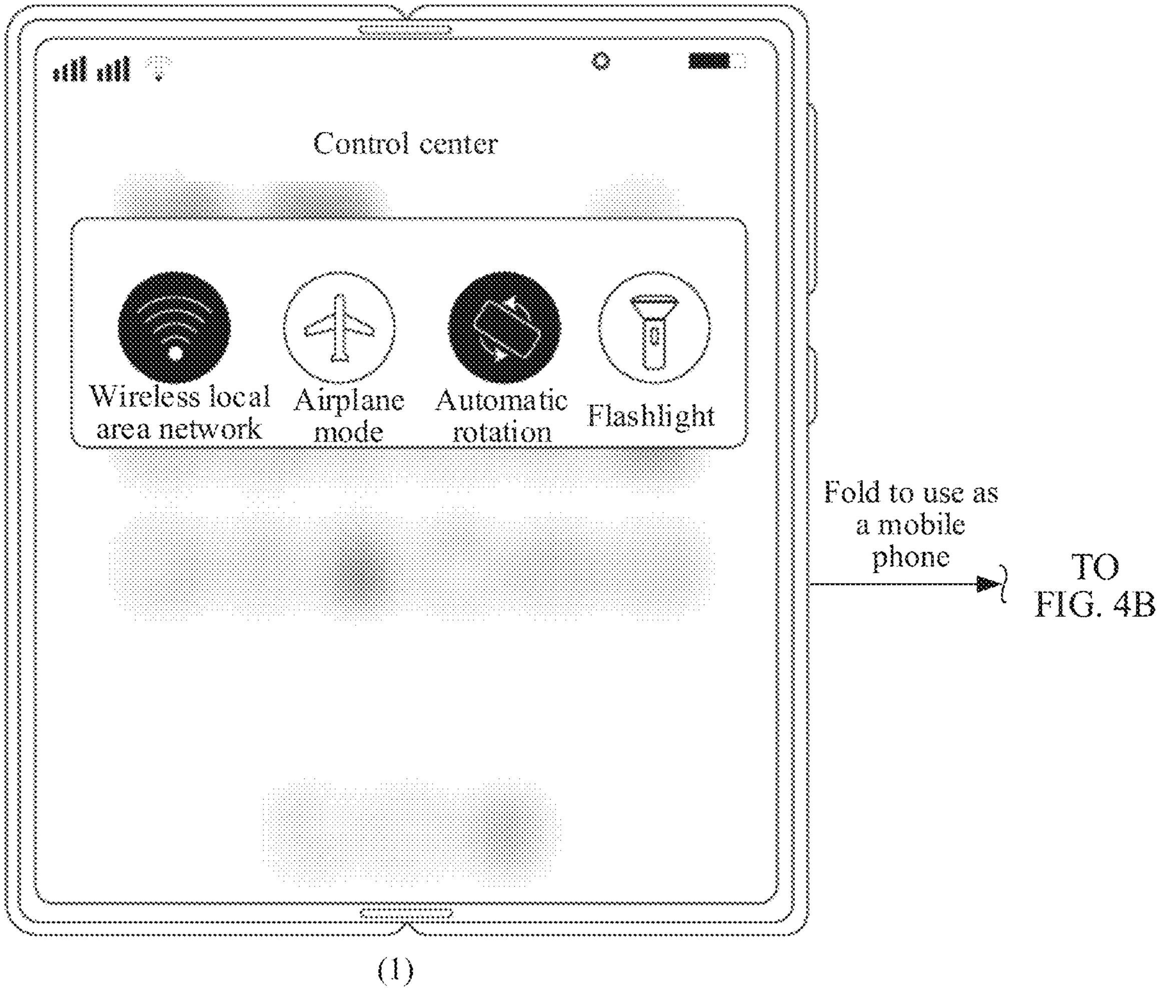
FIG. 4A, FIG. 4B, FIG. 4C, and FIG. 4D are a schematic diagram of displaying content according to this application.
Figure 4B:
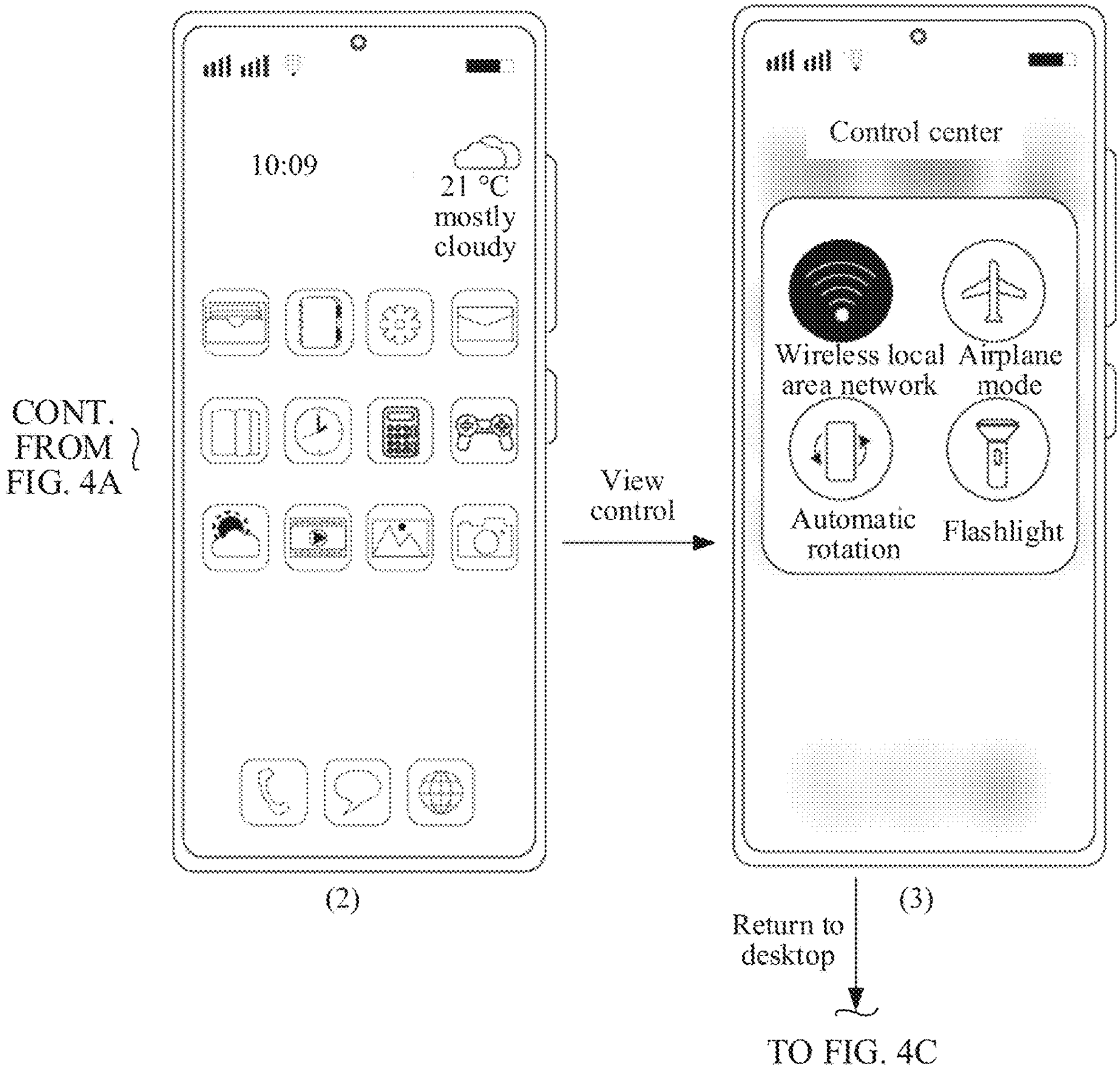
Figure 4C:
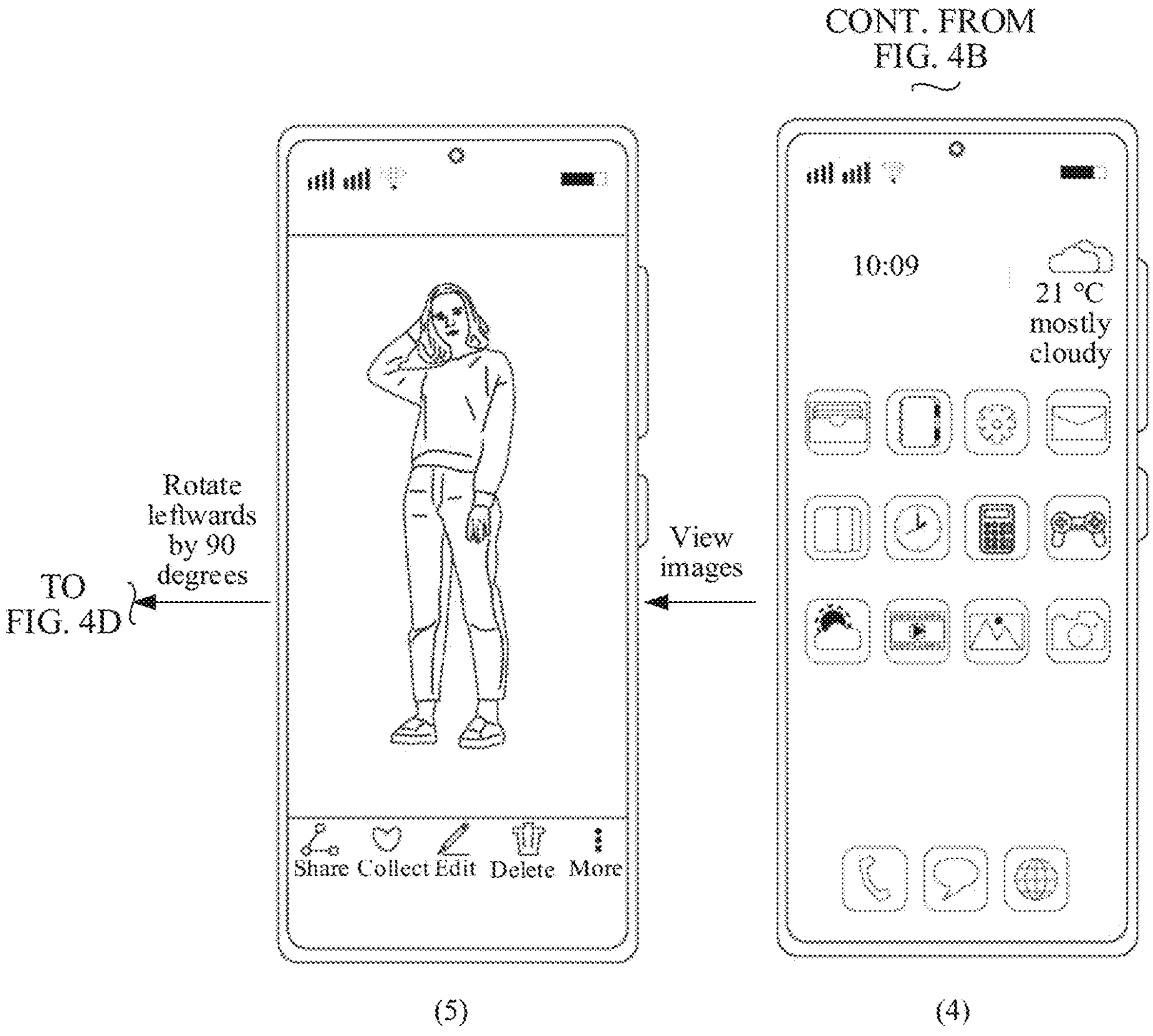
Figure 4D:
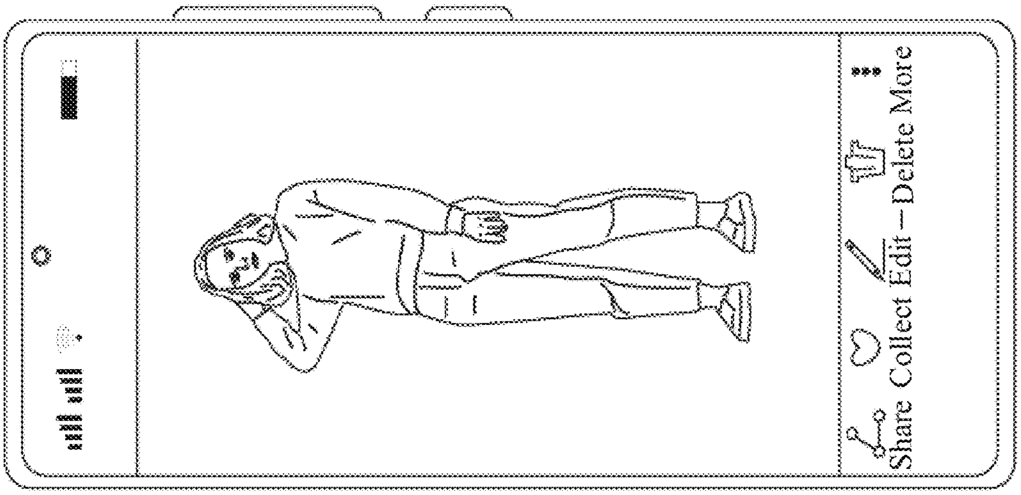

Another detection method is to set two automatic rotation controlling controls in the electronic device. As shown in FIG. 3, the control center menu includes an outer screen automatic rotation controlling control and an inner screen automatic rotation controlling control. The outer screen automatic rotation controlling control corresponds to the outer screen automatic rotation function. When the electronic device is used as a mobile phone, the outer screen automatic rotation controlling control can control the landscape and portrait display switching of the outer screen of the electronic device. The inner screen automatic rotation controlling control corresponds to the inner screen automatic rotation function. When the electronic device is used as a tablet, the inner screen automatic rotation controlling control can control the landscape and portrait display switching of the inner screen of the electronic device. When the electronic device is configured as shown in FIG. 3, the electronic device can detect whether the outer screen automatic rotation controlling control is enabled, and detect whether the inner screen automatic rotation controlling control is enabled. For example, when the electronic device is in the unfolded state, it is detected whether the inner screen automatic rotation controlling control is enabled.

FIG. 4A, FIG. 4B, FIG. 4C, and FIG. 4D show an example of displaying content. FIG. 4A, FIG. 4B, FIG. 4C, and FIG. 4D show a scenario in which the automatic rotation function is enabled when the electronic device is in the unfolded state, but the automatic rotation function is disabled when the electronic device is in the folded state. In the scenario shown in FIG. 4A, FIG. 4B, FIG. 4C, and FIG. 4D, the electronic device is equipped with an automatic rotation controlling control, and the electronic device can determine, according to the usage form of the electronic device, whether the automatic rotation controlling control is for the inner screen or the outer screen. (1) in FIG. 4A, FIG. 4B, FIG. 4C, and FIG. 4D shows that the automatic rotation controlling control is enabled when the electronic device is in the unfolded state, the automatic rotation function is enabled, the user can fold the electronic device inwards, and the electronic device is switched from the unfolded state (1) in FIG. 4A, FIG. 4B, FIG. 4C, and FIG. 4D to folded state (2) in FIG. 4A, FIG. 4B, FIG. 4C, and FIG. 4D. When the electronic device is previously in the folded state, the automatic rotation function of the electronic device is disabled, and therefore, after the electronic device is switched from the unfolded state to the folded state, the automatic rotation function of the electronic device in the folded state is still disabled. Then, the user slides down to view the control center menu, and the electronic device can display the control center menu according to (3) in FIG. 4A, FIG. 4B, FIG. 4C, and FIG. 4D. In (3) in FIG. 4A, FIG. 4B, FIG. 4C, and FIG. 4D, the automatic rotation controlling control is disabled, and the automatic rotation function is disabled. The user slides up the control center menu, and the electronic device is switched from displaying the control center menu to displaying the desktop, for example, switched from (3) in FIG. 4A, FIG. 4B, FIG. 4C, and FIG. 4D to (4) in FIG. 4A, FIG. 4B, FIG. 4C, and FIG. 4D. The user may click the image application in the electronic device to view images in the image application, for example, switches from (4) in FIG. 4A, FIG. 4B, FIG. 4C, and FIG. 4D to (5) in FIG. 4A, FIG. 4B, FIG. 4C, and FIG. 4D, the electronic device can display the images, and the images are displayed in the first portrait display mode. The user can rotate the electronic device, and as shown in (6) in FIG. 4A, FIG. 4B, FIG. 4C, and FIG. 4D, the user rotates the electronic device by 90 degrees to the left. Because the automatic rotation function is disabled when the electronic device is used as a mobile phone, after the electronic device is rotated by 90 degrees to the left, the images displayed on the electronic device do not rotate, and as shown in (6) in FIG. 4A, FIG. 4B, FIG. 4C, and FIG. 4D, the image is still displayed in the first portrait display mode.

Based on the example in FIG. 4A, FIG. 4B, FIG. 4C, and FIG. 4D, it can be seen that when the electronic device is in the unfolded state, the electronic device has enabled the automatic rotation function. After switching from the unfolded state to the folded state, since the electronic device has disabled the automatic rotation function when the electronic device is previously in the folded state, under the premise of separate automatic control of inner and outer screens, although the electronic device has enabled the automatic rotation function, the automatic rotation function is valid for the unfolded state and invalid for the folded state. In the folded state, the automatic rotation function is still disabled, so that the automatic rotation function in the unfolded state does not affect the automatic rotation function in the folded state. In this way, when the electronic device is in the folded state, the electronic device can control the display of content in a manner that the automatic rotation function is disabled. That the automatic rotation function is disabled generally means that when the electronic device is in the folded state, the user disables the automatic rotation function, which means that the user prohibits landscape and portrait display when the electronic device is folded. Then, the electronic device continues to disable the automatic rotation function in the folded state. This satisfies user needs for landscape and portrait display when the inner and outer screens display can be controlled separately.

Figure 5A:
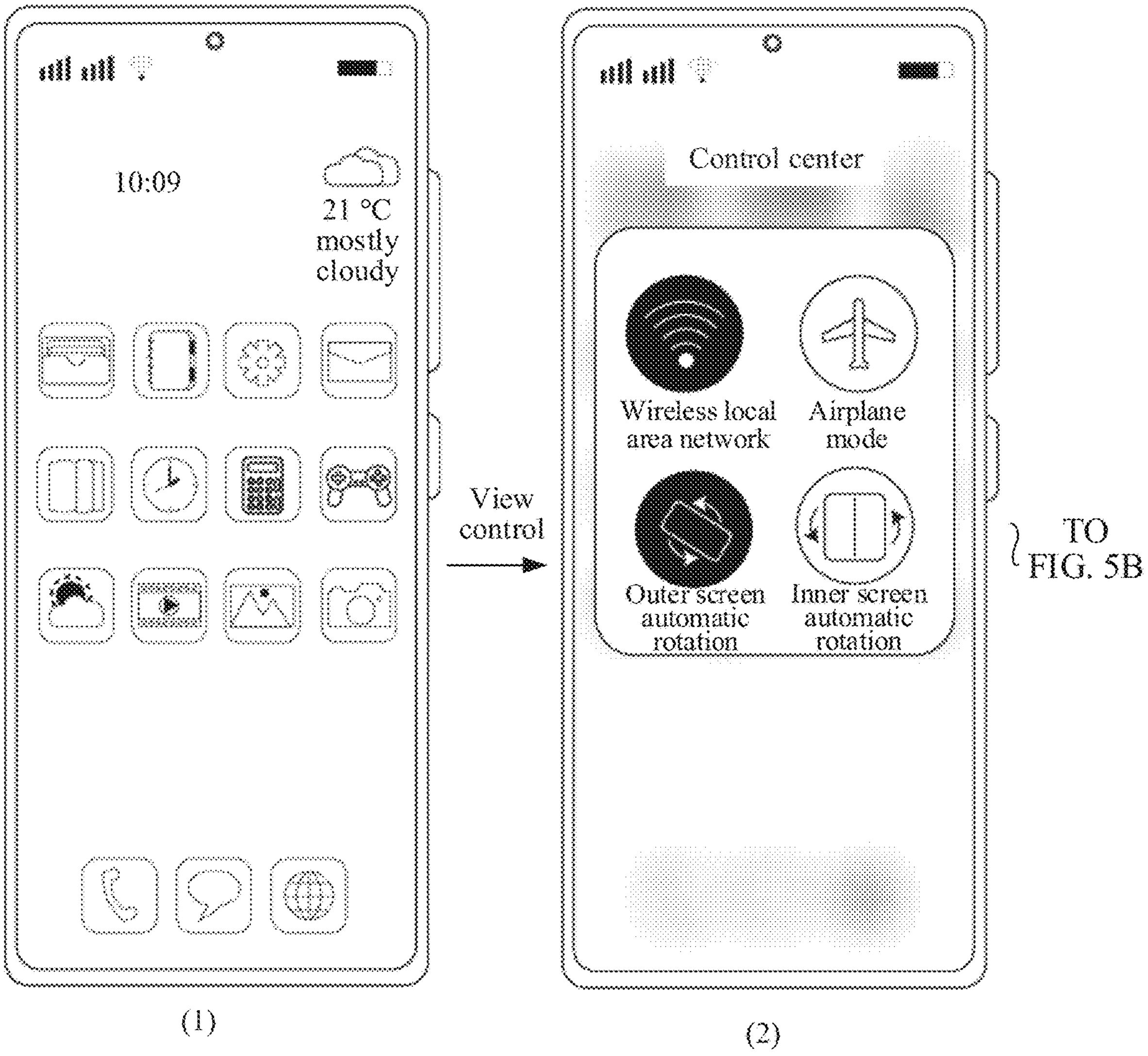
FIG. 5A, FIG. 5B, and FIG. 5C are another schematic diagram of displaying content according to this application.
Figure 5B:
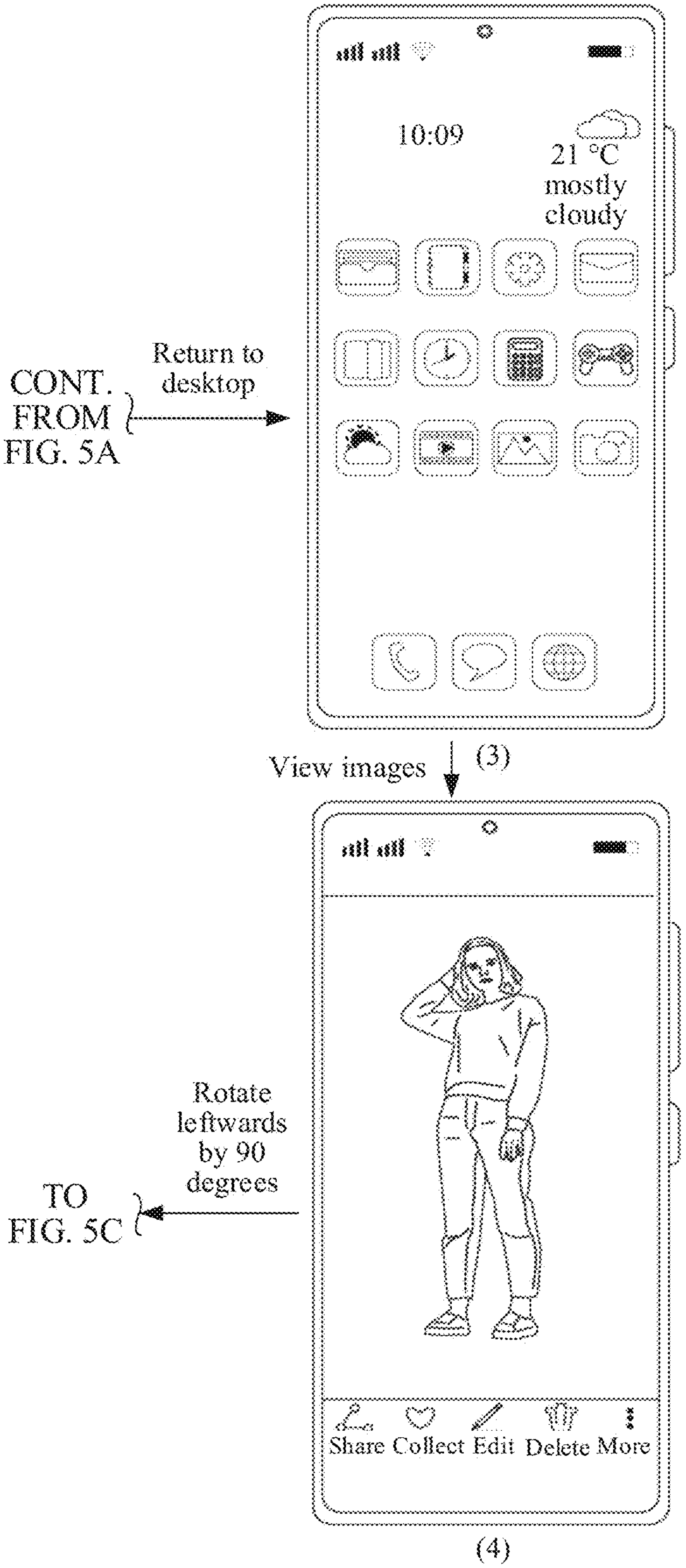
Figure 5C:
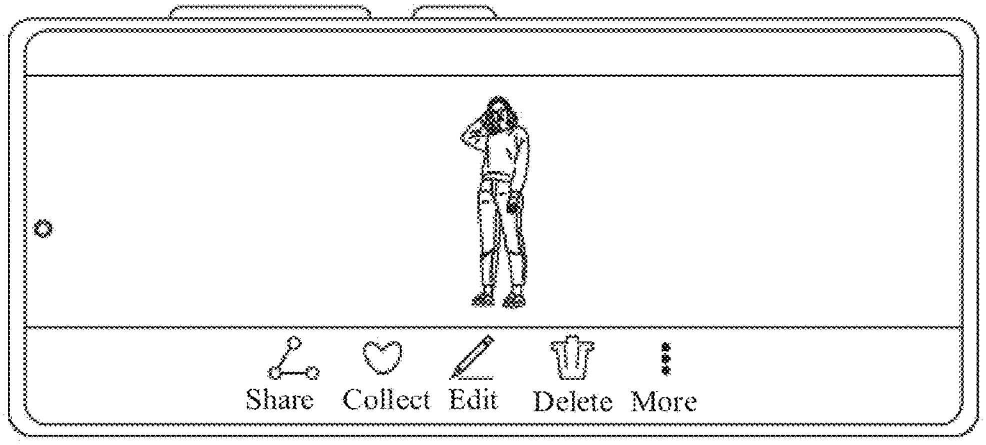
Figure 6A:
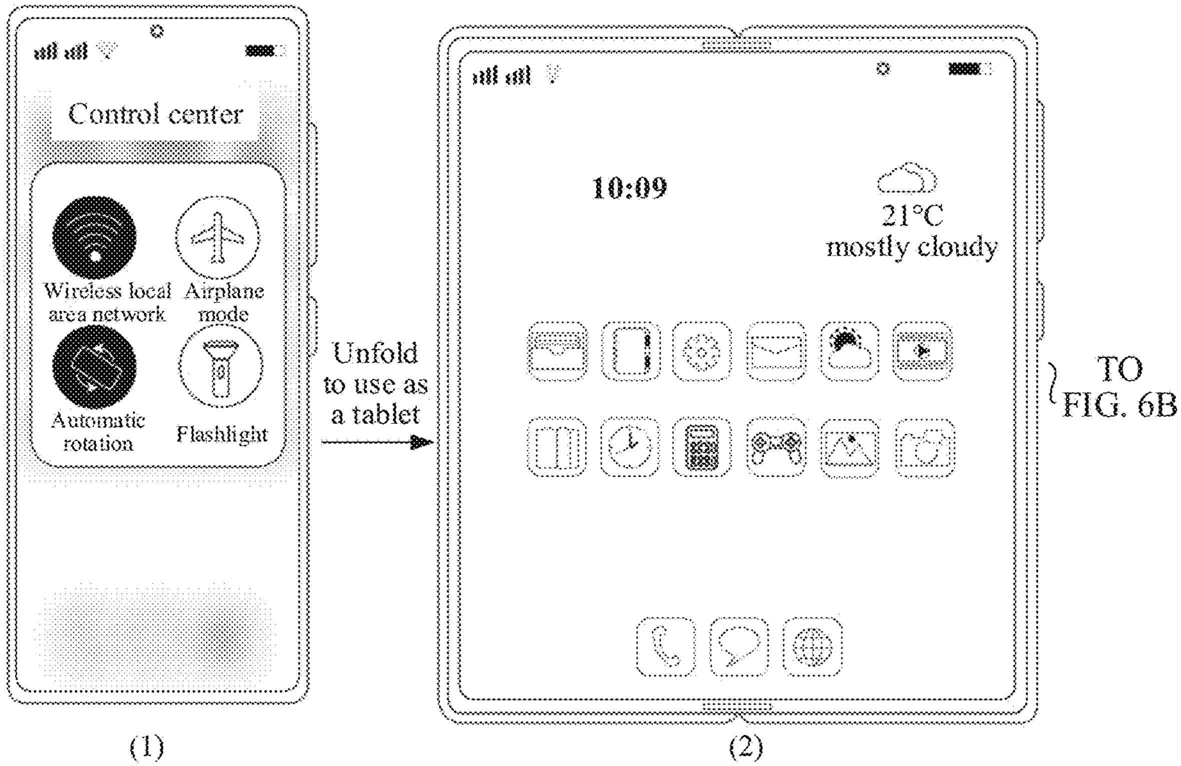
FIG. 6A, FIG. 6B, FIG. 6C, and FIG. 6D are still another schematic diagram of displaying content according to this application.
Figure 6B:
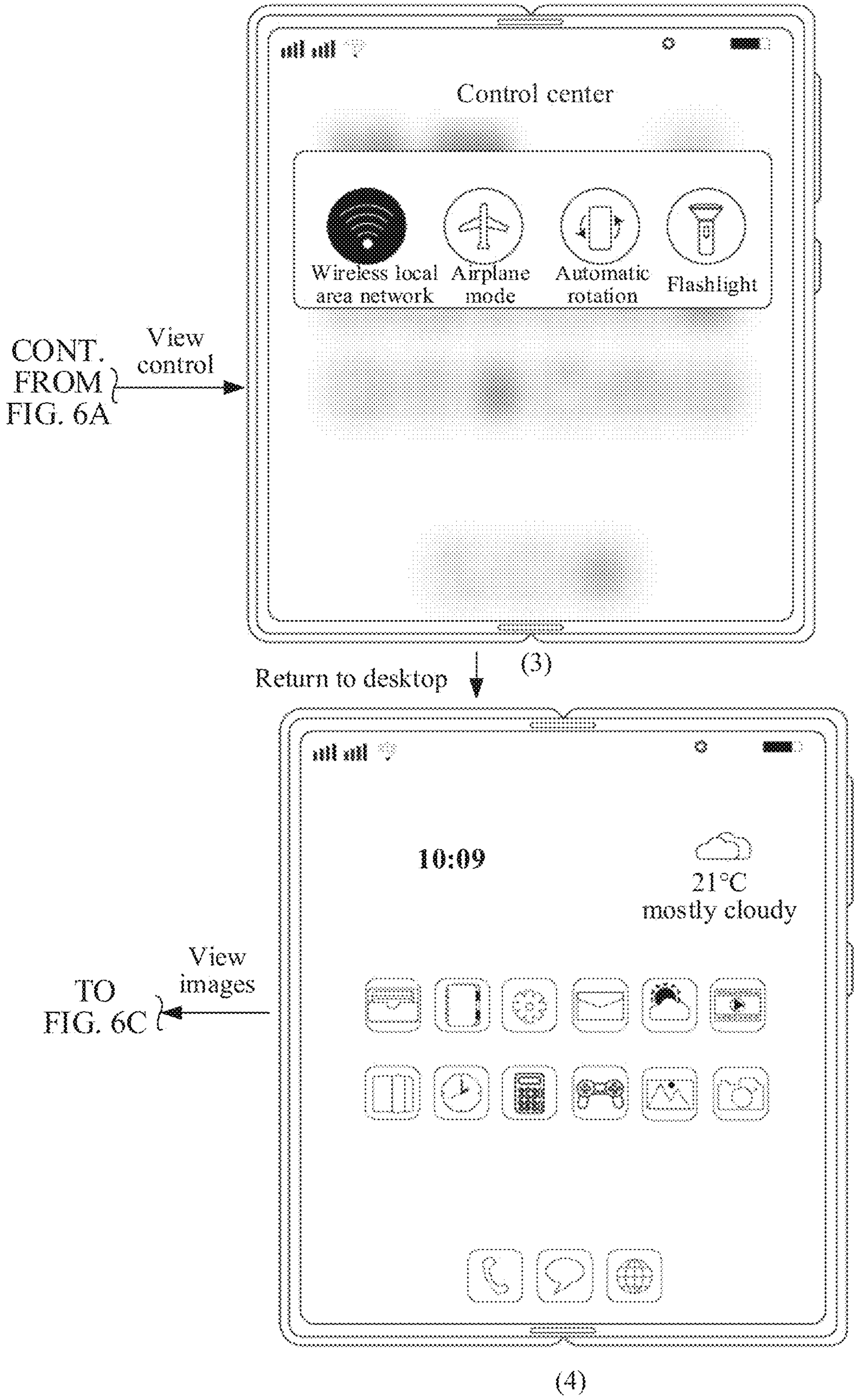
Figure 6C:
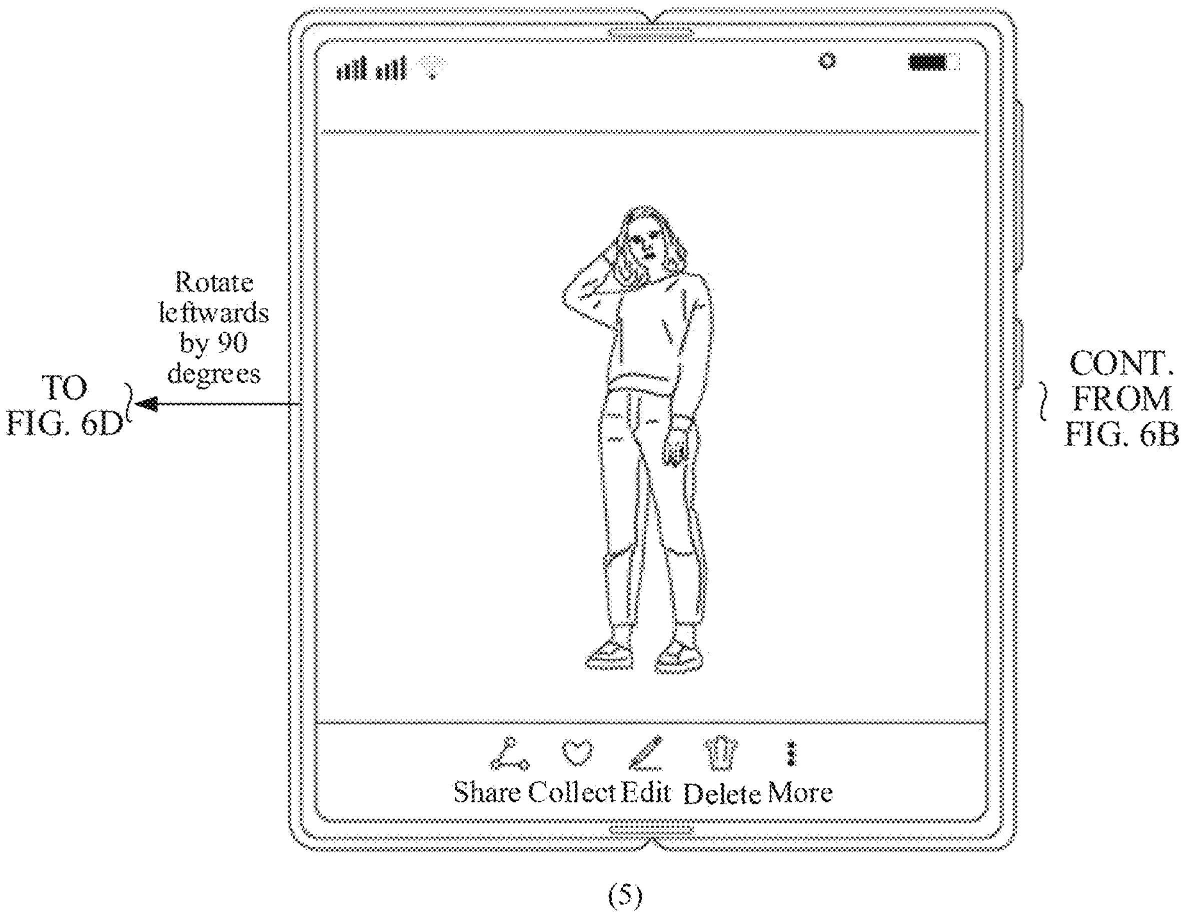
Figure 6D:
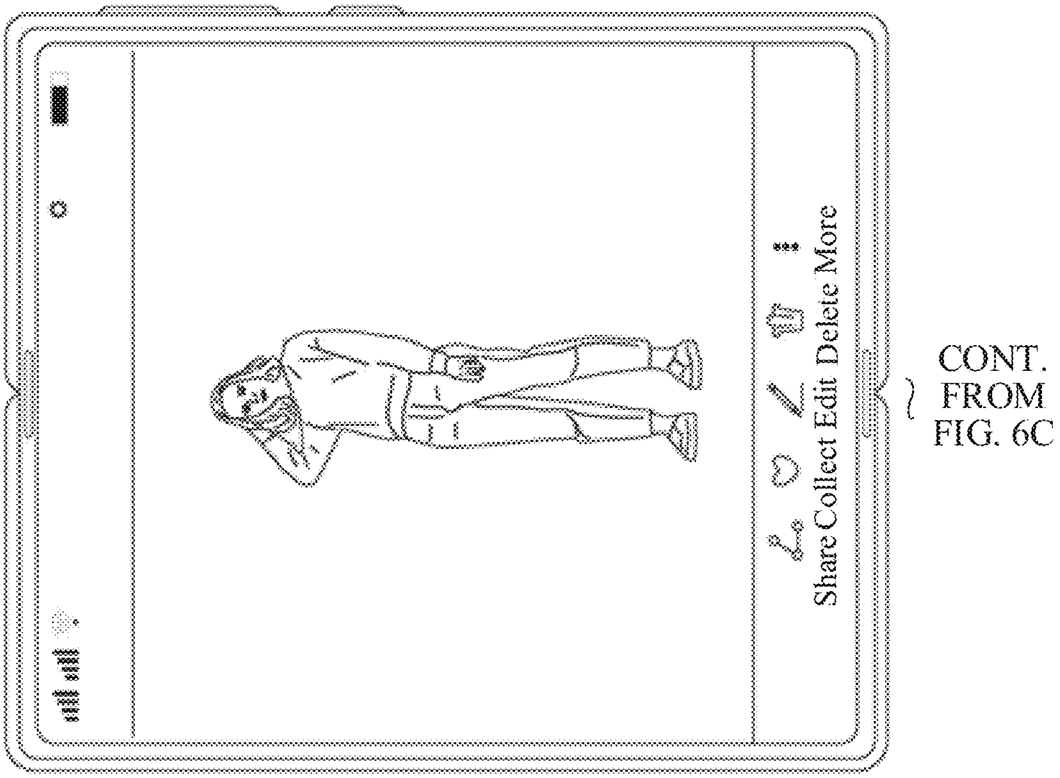

FIG. 5A, FIG. 5B, and FIG. 5C show another example of displaying content. In FIG. 5A, FIG. 5B, and FIG. 5C, the electronic device is configured with two automatic rotation controlling controls. For example, when the electronic device is in the folded state in (1) in FIG. 5A, FIG. 5B, and FIG. 5C, the user slides down to cause the electronic device to display the control center menu, and a form of the control center menu is shown in (2) in FIG. 5A, FIG. 5B, and FIG. 5C. The outer screen automatic rotation indicates the outer screen automatic rotation controlling control, and the inner screen automatic rotation indicates the inner screen automatic rotation controlling control, and the electronic device enables the outer screen automatic rotation function, and disables the inner screen automatic rotation function. After a power station device enables the outer screen automatic rotation function, a diagram in which the user views the image is shown in (3) to (5) in FIG. 5A, FIG. 5B, and FIG. 5C. When the electronic device is used in the first portrait mode, the image is displayed in the first portrait display mode, the user rotates the electronic device by 90 degrees to the left, and the image is also rotated and is displayed in the first landscape display mode. It can be seen from the example in FIG. 5A, FIG. 5B, and FIG. 5C that the disabling of the inner screen automatic rotation function does not affect the display content of the outer screen, and the electronic device can control the outer screen according to the outer screen automatic rotation function, to meet the user needs for the landscape and portrait display of the outer screen.

FIG. 6A, FIG. 6B, FIG. 6C, and FIG. 6D and FIG. 7A, FIG. 7B, and FIG. 7C show examples of displaying content when the electronic device is in the unfolded state. In FIG. 6A, FIG. 6B, FIG. 6C, and FIG. 6D, the electronic device is provided with an automatic rotation controlling control, and the electronic device determines whether the automatic rotation controlling control is for the inner screen or the outer screen according to the usage form. (1) in FIG. 6A, FIG. 6B, FIG. 6C, and FIG. 6D and (3) in FIG. 6A, FIG. 6B, FIG. 6C, and FIG. 6D show that the electronic device enables the automatic rotation function in the folded state, and disables the automatic rotation function in the unfolded state. Then, when the electronic device in the folded state is rotated, the displayed content can also be rotated. When the electronic device in the unfolded state is rotated, the displayed content is not rotated, as shown in (4) in FIG. 6A, FIG. 6B, FIG. 6C, and FIG. 6D to (6) in FIG. 6A, FIG. 6B, FIG. 6C, and FIG. 6D. When the electronic device in the unfolded state is used in the first portrait mode, the image can be displayed in the first portrait mode, and when the electronic device is rotated to the first left landscape mode, the image is not rotated.

Figure 7A:
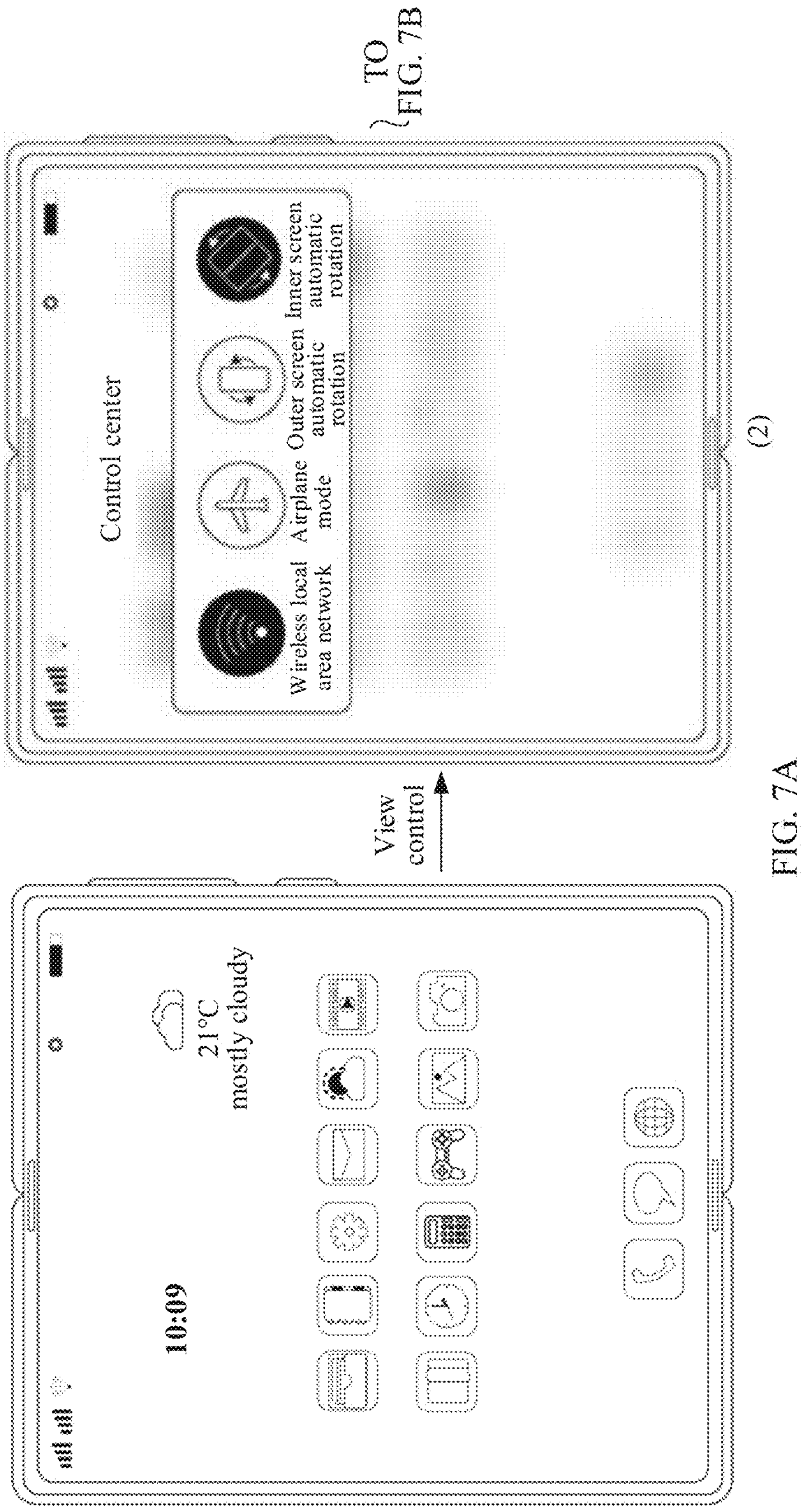
FIG. 7A, FIG. 7B, and FIG. 7C are still another schematic diagram of displaying content according to this application.
Figure 7B:
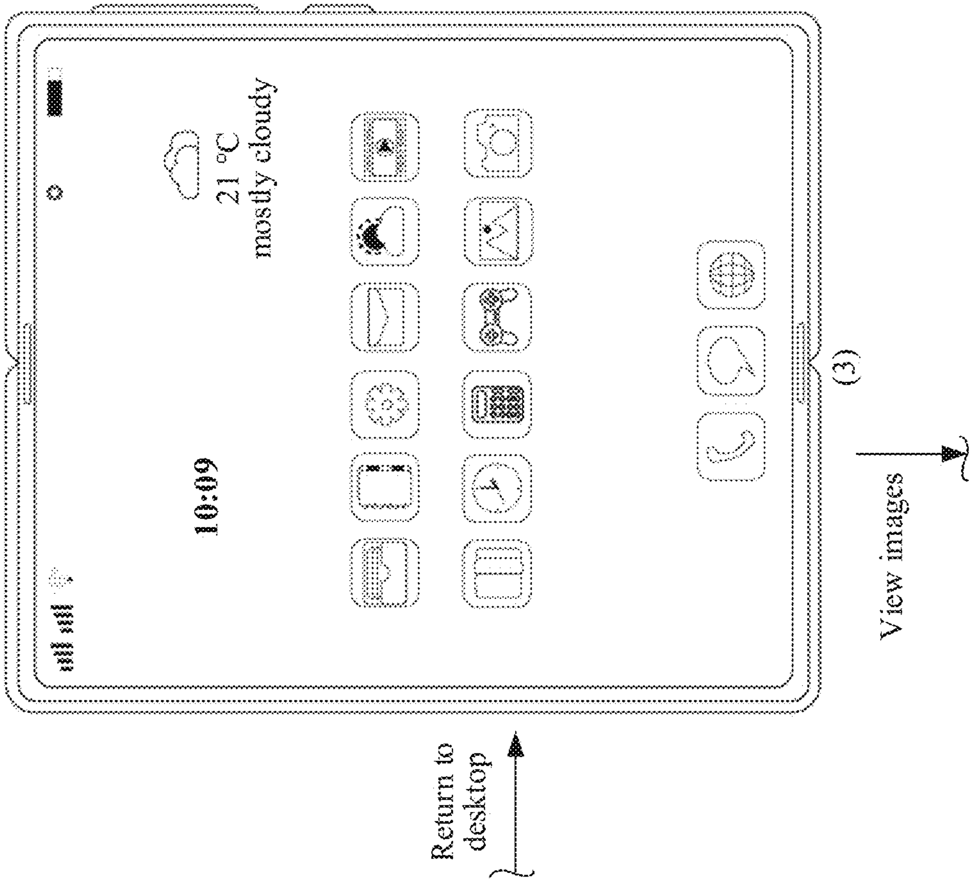
Figure 7C:
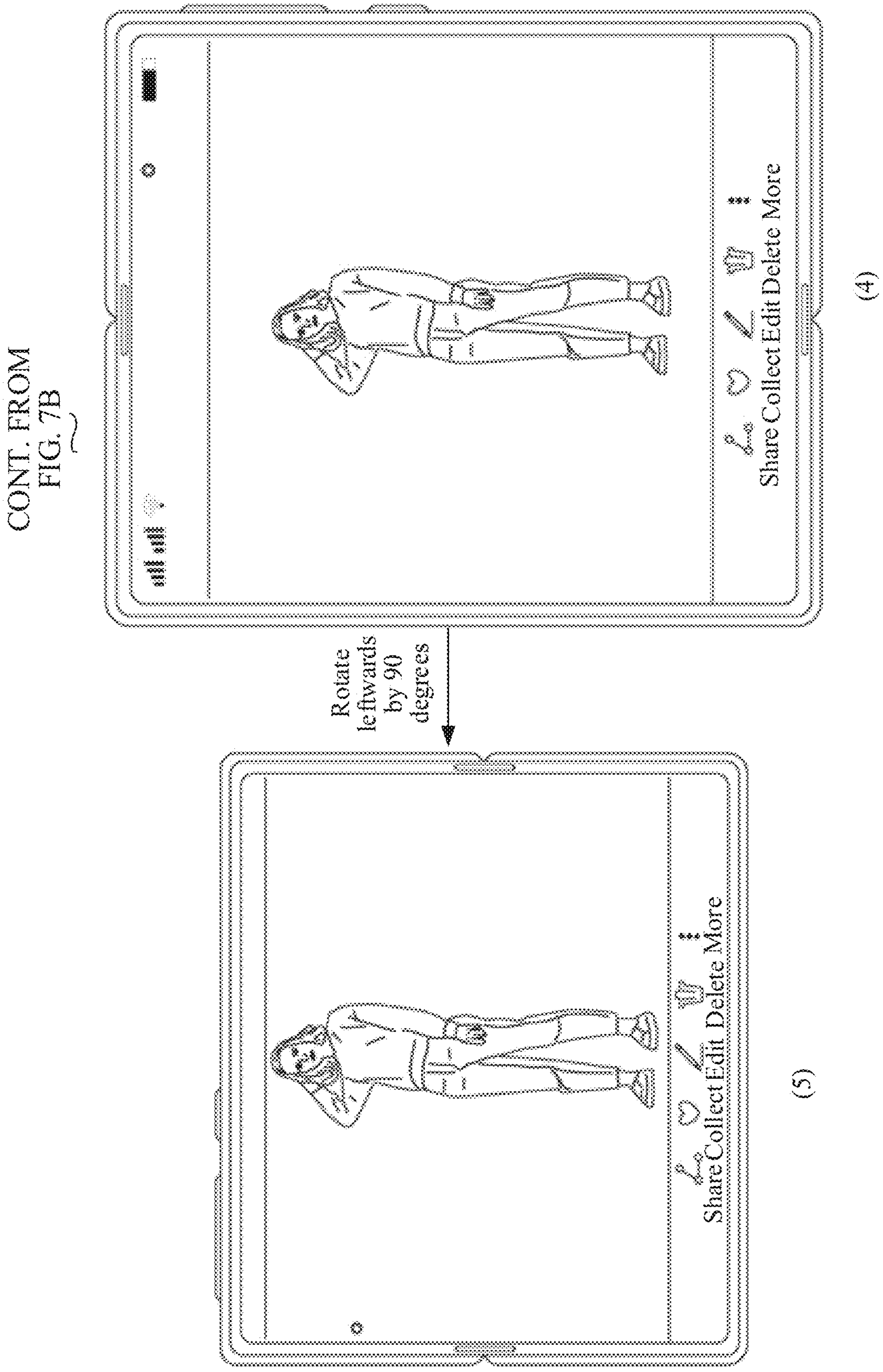

FIG. 7A, FIG. 7B, and FIG. 7C show that the electronic device is provided with two automatic rotation controls, that is, the outer screen automatic rotation and the inner screen automatic rotation. (2) in FIG. 7A, FIG. 7B, and FIG. 7C shows that the electronic device enables the inner screen automatic rotation function, and disables the outer screen automatic rotation function. Then, when the electronic device in the unfolded state is rotated, the displayed content can also be rotated. As shown in (3) in FIG. 7A, FIG. 7B, and FIG. 7C to (5) in FIG. 7A, FIG. 7B, and FIG. 7C, when the electronic device in the unfolded state is used in the first portrait mode, the image can be displayed in the first portrait mode, and when the electronic device is rotated to the first left landscape mode, the image is also rotated and displayed in the first left landscape mode.

It can be seen from the example in FIG. 6A, FIG. 6B, FIG. 6C, and FIG. 6D and FIG. 7A, FIG. 7B, and FIG. 7C that the outer screen automatic rotation function does not affect the display content of the inner screen, and the electronic device can control the inner screen according to the inner screen automatic rotation function, to meet the user needs for the landscape and portrait display of the inner screen.

In addition, when the electronic device implements the display control method, it can control the content display of the application program according to the type of the application program, where the type of application program includes: a first type of application program, a second type of application program, and a third type of application program. The first type of application program can be a mandatory landscape application program, which can be displayed in the left landscape and/or right landscape mode. For example, when the electronic device is used in the left landscape mode, the mandatory landscape application program can be displayed in the left landscape mode, and when the electronic device is used in the right landscape mode, the mandatory landscape application program can be displayed in the right landscape mode. The second type of application program can be a mandatory portrait application program, which can be displayed in the portrait and/or inverted portrait mode. For example, when the electronic device is used in the portrait mode, the mandatory portrait application program can be displayed in the portrait mode, and when the electronic device is used in the portrait mode, the mandatory portrait application program can be displayed in the portrait mode or inverted portrait mode.

The third type of application program may be an application program whose direction can be automatically rotated according to the state of the device (also referred to as the usage posture of the electronic device). In one example, the electronic device enables the automatic rotation function before the third type of application program is enabled, and then the display of the third type of application program can also change after the electronic device is rotated. For example, when the electronic device is used in the portrait mode, the third type of application program can be displayed in the portrait mode, and when the electronic device is used in the landscape mode, the third type of application program can be displayed in the landscape mode. However, if the electronic device disables the automatic rotation function after the third type of application program is enabled, the electronic device can continue to display the third type of application program in the display mode before disabling, for example, the electronic device is used in the left landscape mode and displays the third type of application program in the left landscape mode, and the automatic rotation function is disabled by the electronic device. Then, the electronic device may continue to display the third type of application program in the left landscape mode. If the electronic device disables the third type of application program or switches the third type of application program to the background, after the electronic device runs the third type of application program in the foreground, the electronic device may display the third type of application program in a default display mode.

For example, when the electronic device is used as a mobile phone, the electronic device includes a first type of application program, a second type of application program, and a third type of application program, the first type of application program may be a game application, the second type of application program may be a desktop and WeChat or the like, and the third type of application program can be settings and gallery or the like. When the electronic device is used as a tablet, the electronic device includes a first type of application program and a third type of application program, the first type of application program may be a game application, and the third type of application program may be an application other than the game program, for example, the third type of application program can be desktop, gallery, WeChat and so on.

Figure 8A:
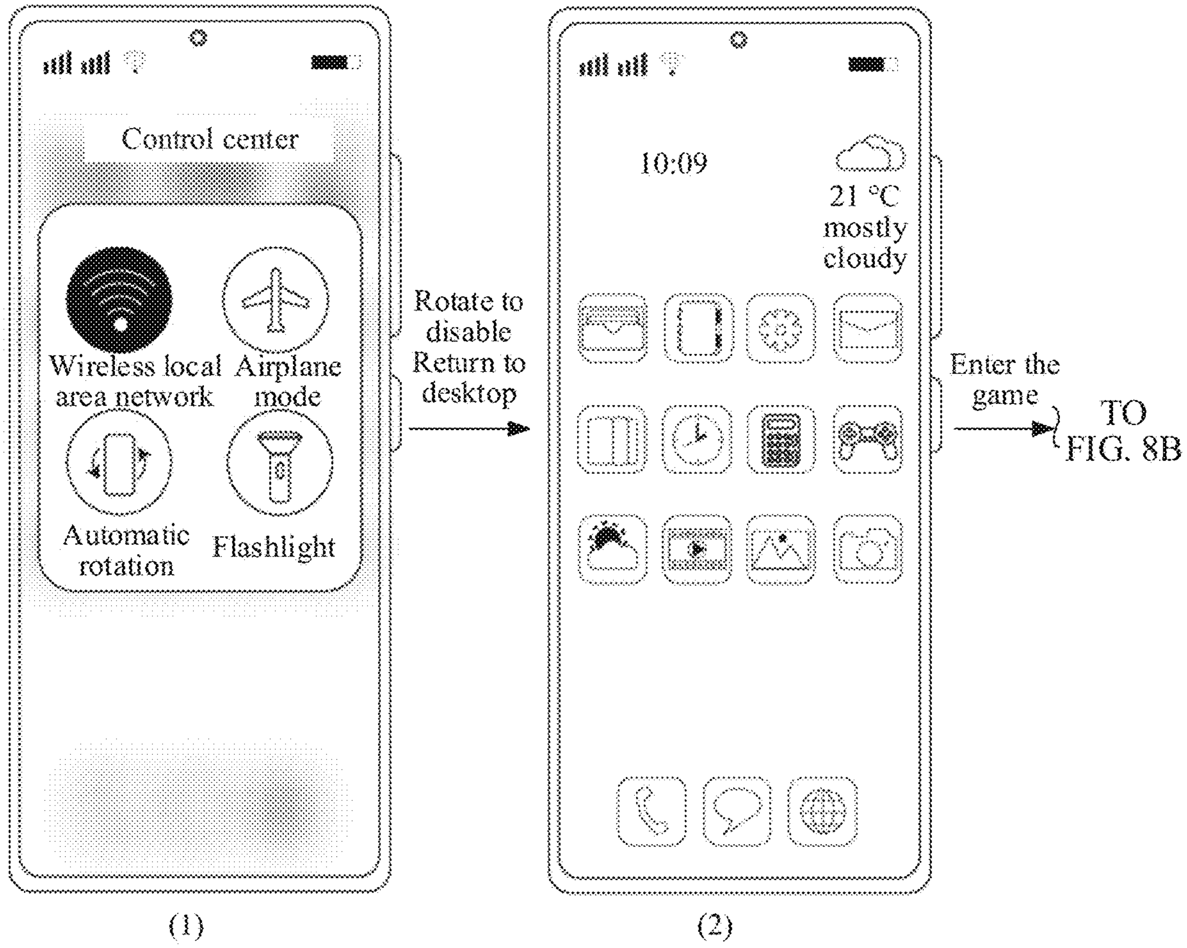
FIG. 8A and FIG. 8B are still another schematic diagram of displaying content according to this application.
Figure 8B:
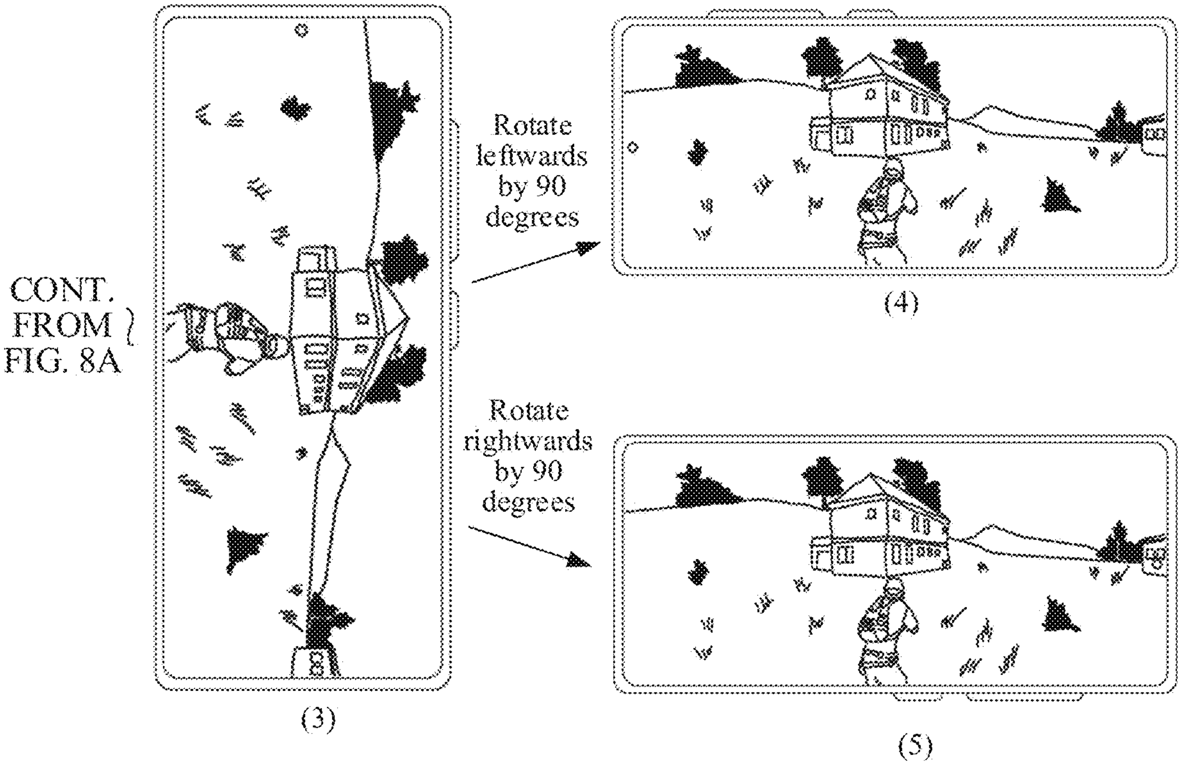

The following uses different types of application programs as examples to illustrate. FIG. 8A and FIG. 8B show a display example of a game application program when the electronic device is used as a mobile phone. (1) in FIG. 8A and FIG. 8B shows that when the electronic device displays the desktop, the user slides down to view the control center menu, and the automatic rotation controlling control in the control center menu is disabled, indicating that the electronic device has disabled the automatic rotation function. The user slides up the control center menu, and the electronic device is switched from displaying the control center menu in (1) in FIG. 8A and FIG. 8B to displaying the desktop in (2) in FIG. 8A and FIG. 8B. Then, the user clicks the game icon on the desktop, and the electronic device starts the game application. Since the electronic device is used in a portrait mode, the electronic device can display game content in a left landscape mode as shown in (3) in FIG. 8A and FIG. 8B after starting the game application.

The user rotates the electronic device by 90 degrees to the left, the electronic device is switched from portrait to left landscape, and correspondingly, the electronic device can display the game content in the left landscape mode as shown in (4) in FIG. 8A and FIG. 8B. If the user rotates the electronic device by 90 degrees to the right when the electronic device is used in the portrait mode, the electronic device is switched from portrait to right landscape, and correspondingly, the electronic device can display game content in the right landscape mode as shown in (5) in FIG. 8A and FIG. 8B.

Figure 9A:
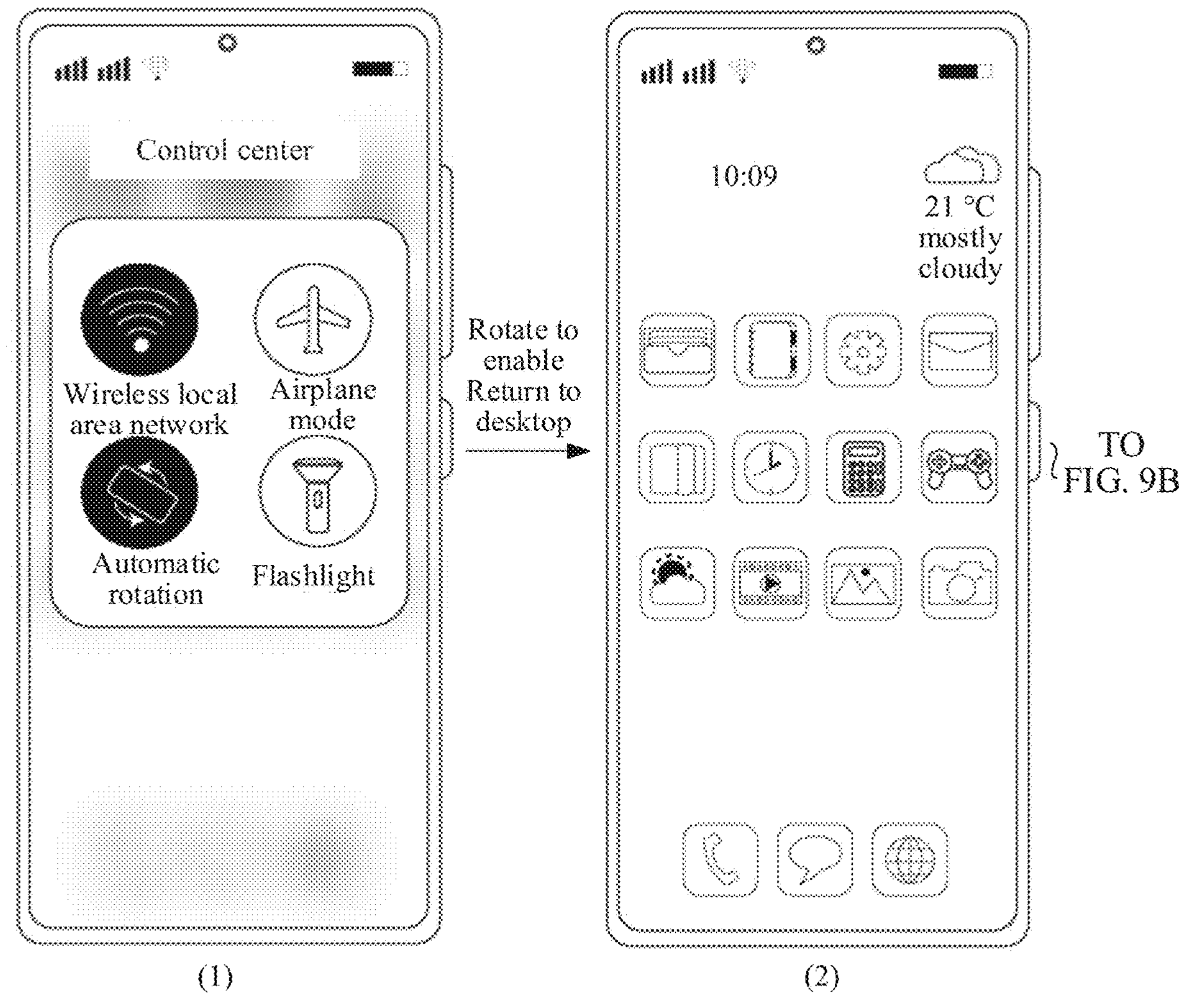
FIG. 9A and FIG. 9B are still another schematic diagram of displaying content according to this application.
Figure 9B:
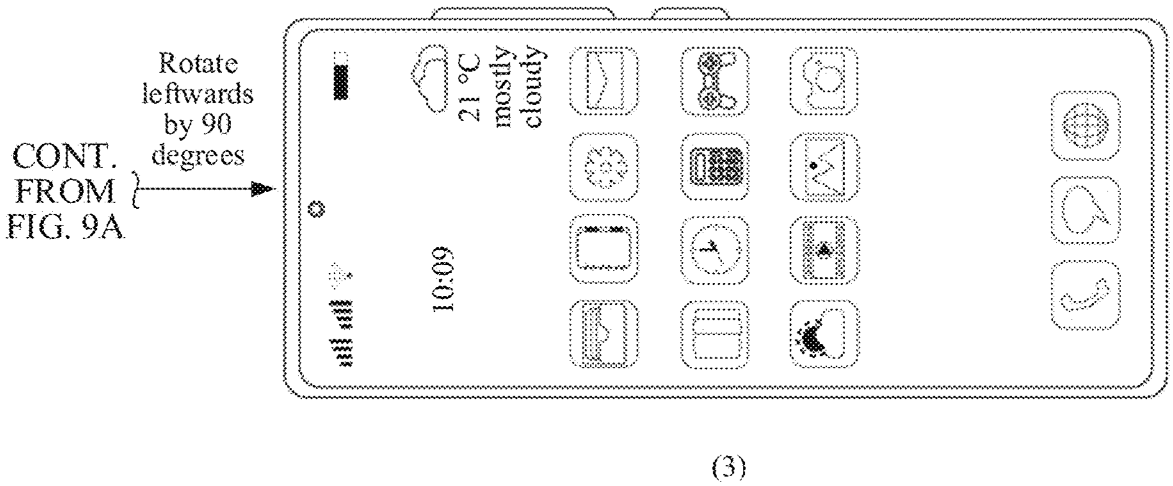
Figure 10A:
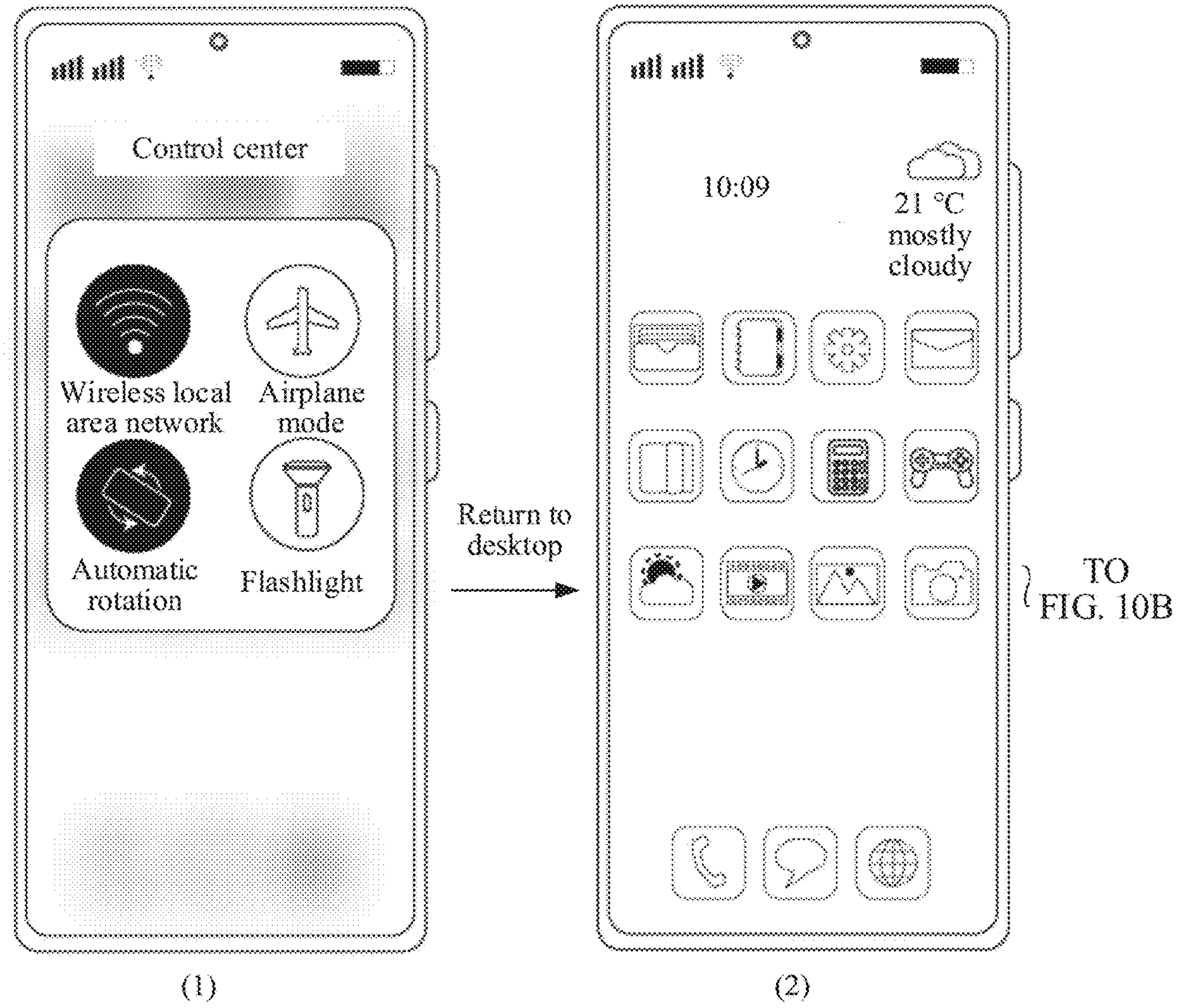
FIG. 10A, FIG. 10B, FIG. 10C, and FIG. 10D are still another schematic diagram of displaying content according to this application.
Figure 10B:
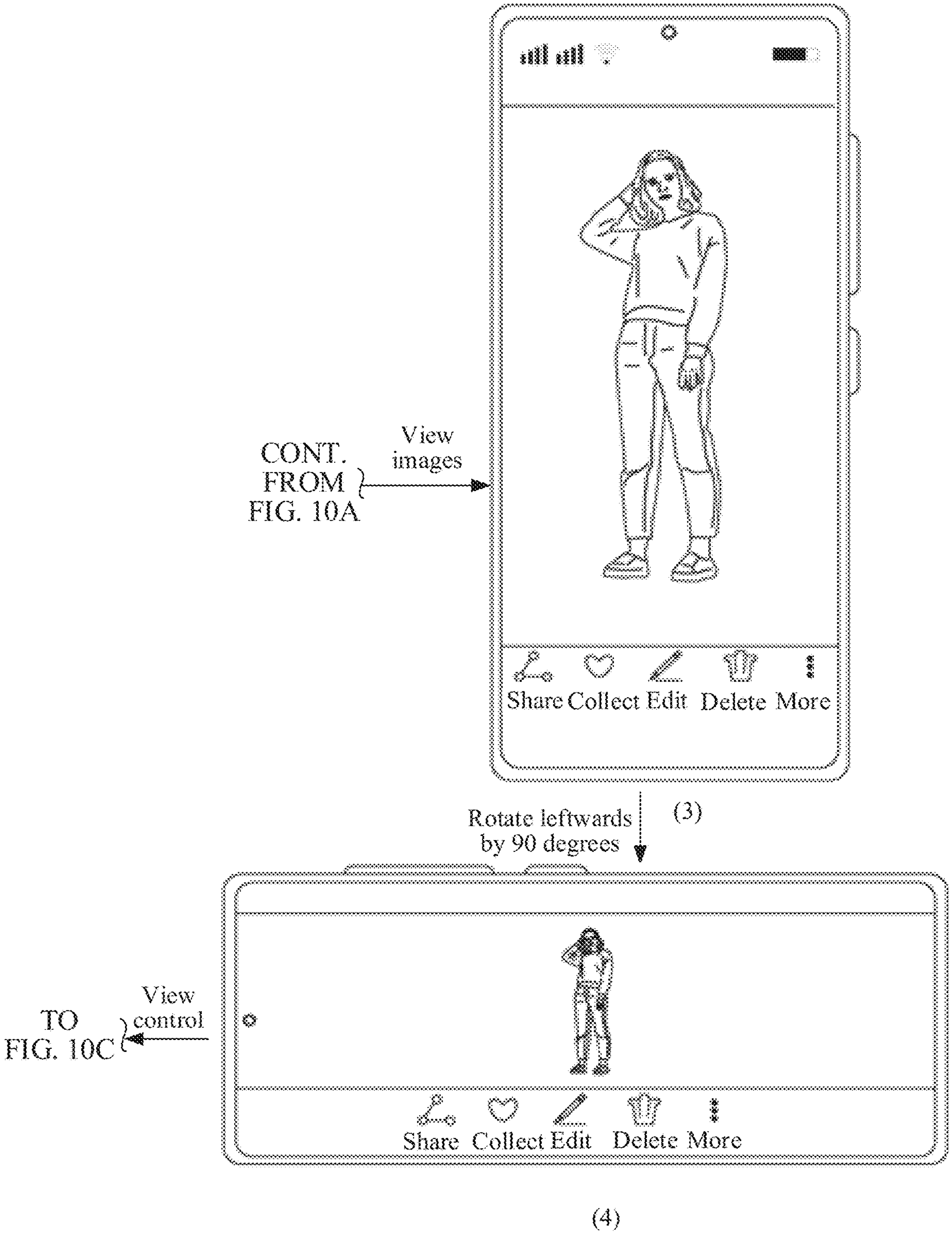
Figure 10C:
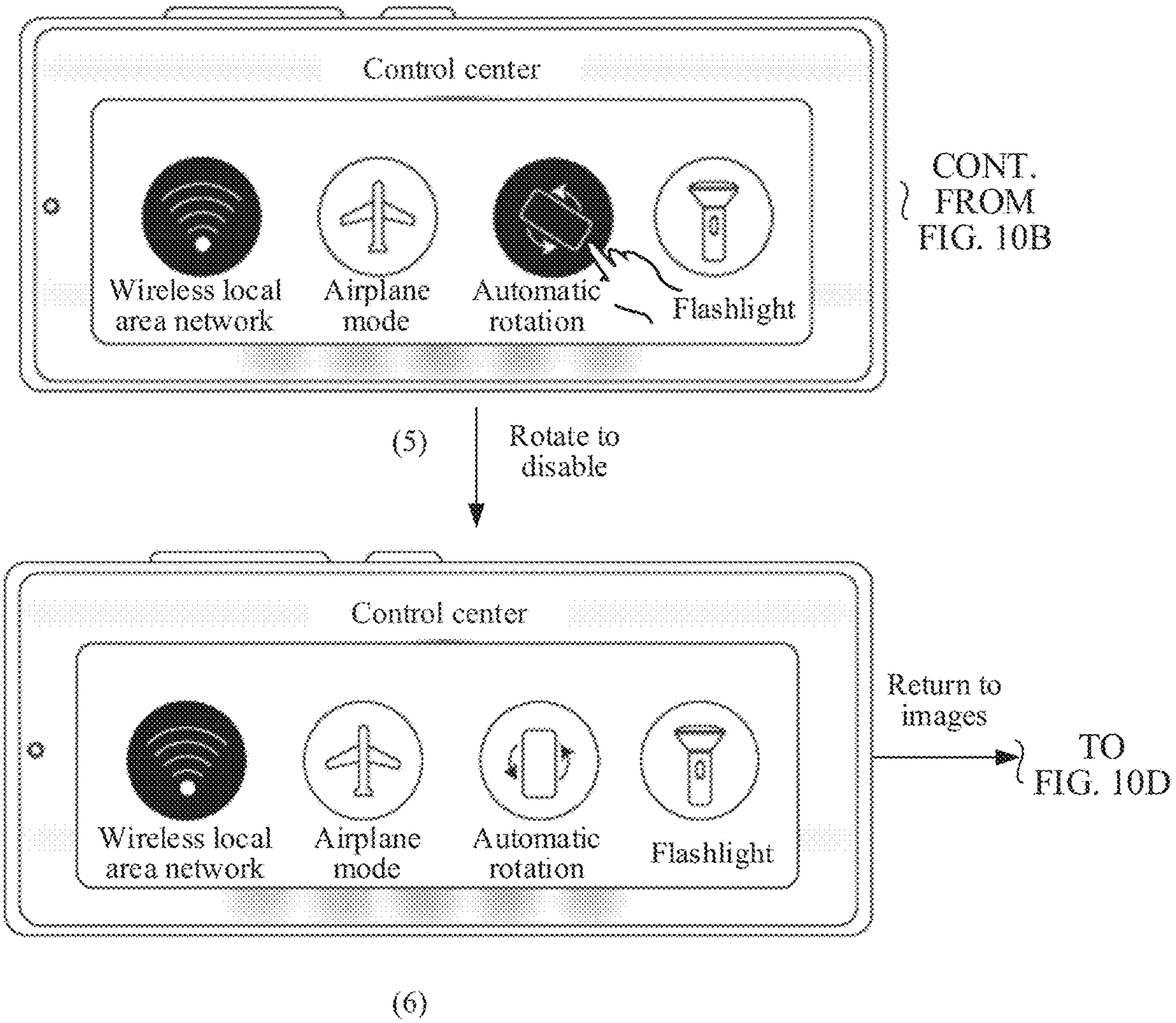
Figure 10D:
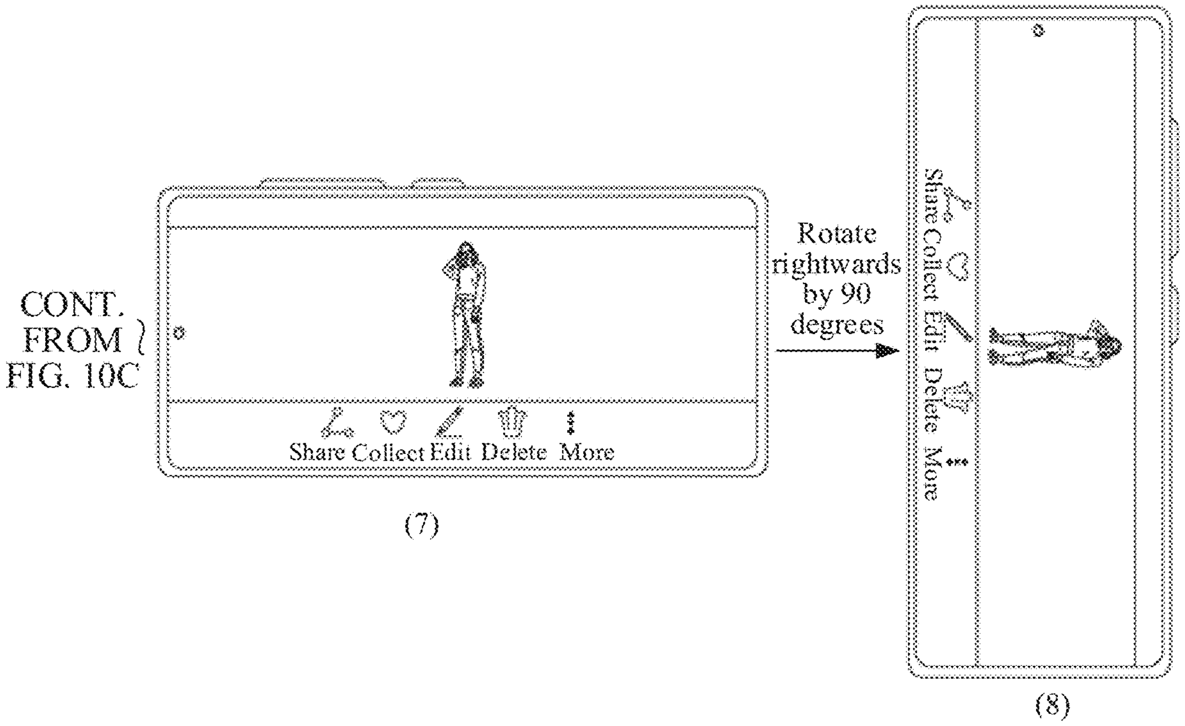

FIG. 9A and FIG. 9B show a display example of desktop when the electronic device is used as a mobile phone. (1) in FIG. 9A and FIG. 9B shows that when the electronic device displays the desktop, the user slides down to view the control center menu, and the automatic rotation controlling control in the control center menu is enabled, indicating that the electronic device has enabled the automatic rotation function. The user slides up the control center menu, and the electronic device is switched from displaying the control center menu in (1) in FIG. 9A and FIG. 9B to displaying the desktop in (2) in FIG. 9A and FIG. 9B. Because the electronic device is used in the portrait mode, the electronic device can display the desktop in the portrait mode. The user rotates the electronic device by 90 degrees to the left, and the electronic device is switched from portrait to left landscape. Because the desktop is a mandatory portrait application, after the electronic device is switched to left landscape, the electronic device still displays the desktop in the portrait mode, as shown in (3) in FIG. 9A and FIG. 9B.

FIG. 10A, FIG. 10B, FIG. 10C, and FIG. 10D show a display example of an image when the electronic device is used as a mobile phone. (1) in FIG. 10A, FIG. 10B, FIG. 10C, and FIG. 10D show that when the electronic device displays the desktop, the user slides down to view the control center menu, and the automatic rotation controlling control in the control center menu is enabled, indicating that the electronic device has enabled the automatic rotation function. The user slides up the control center menu, and the electronic device is switched from displaying the control center menu in (1) in FIG. 10A, FIG. 10B, FIG. 10C, and FIG. 10D to displaying the desktop in (2) in FIG. 10A, FIG. 10B, FIG. 10C, and FIG. 10D. Then, the user clicks the gallery icon on the desktop, and the electronic device starts the gallery application. Since the electronic device is used in a portrait mode, the electronic device can display images in the portrait mode as shown in (3) in FIG. 10A, FIG. 10B, FIG. 10C, and FIG. 10D after starting the gallery application.

The user rotates the electronic device by 90 degrees to the left, and the electronic device is switched from portrait to left landscape. Because the gallery application can change the display mode along with the rotation of the electronic device, after the electronic device is switched to the left landscape, the electronic device displays images in the left landscape mode in (4) in FIG. 10A, FIG. 10B, FIG. 10C, and FIG. 10D. The user slides down the control center menu, the electronic device displays the control center menu, the user clicks the automatic rotation controlling control, and the automatic rotation controlling control switches from the enabled state to the disabled state, as shown in (5) and (6) in FIG. 10A, FIG. 10B, FIG. 10C, and FIG. 10D, and the electronic device disables the automatic rotation function. Then, the user slides up the control center menu, and the electronic device continues to display the images, for example, continues to display the images in the left landscape mode as shown in (7) in FIG. 10A, FIG. 10B, FIG. 10C, and FIG. 10D. The user rotates the electronic device by 90 degrees to the right, and the electronic device is switched to portrait. Since the automatic rotation function of the electronic device is disabled, the electronic device can display images in the left landscape mode as shown in (8) in FIG. 10A, FIG. 10B, FIG. 10C, and FIG. 10D.

Figure 11A:
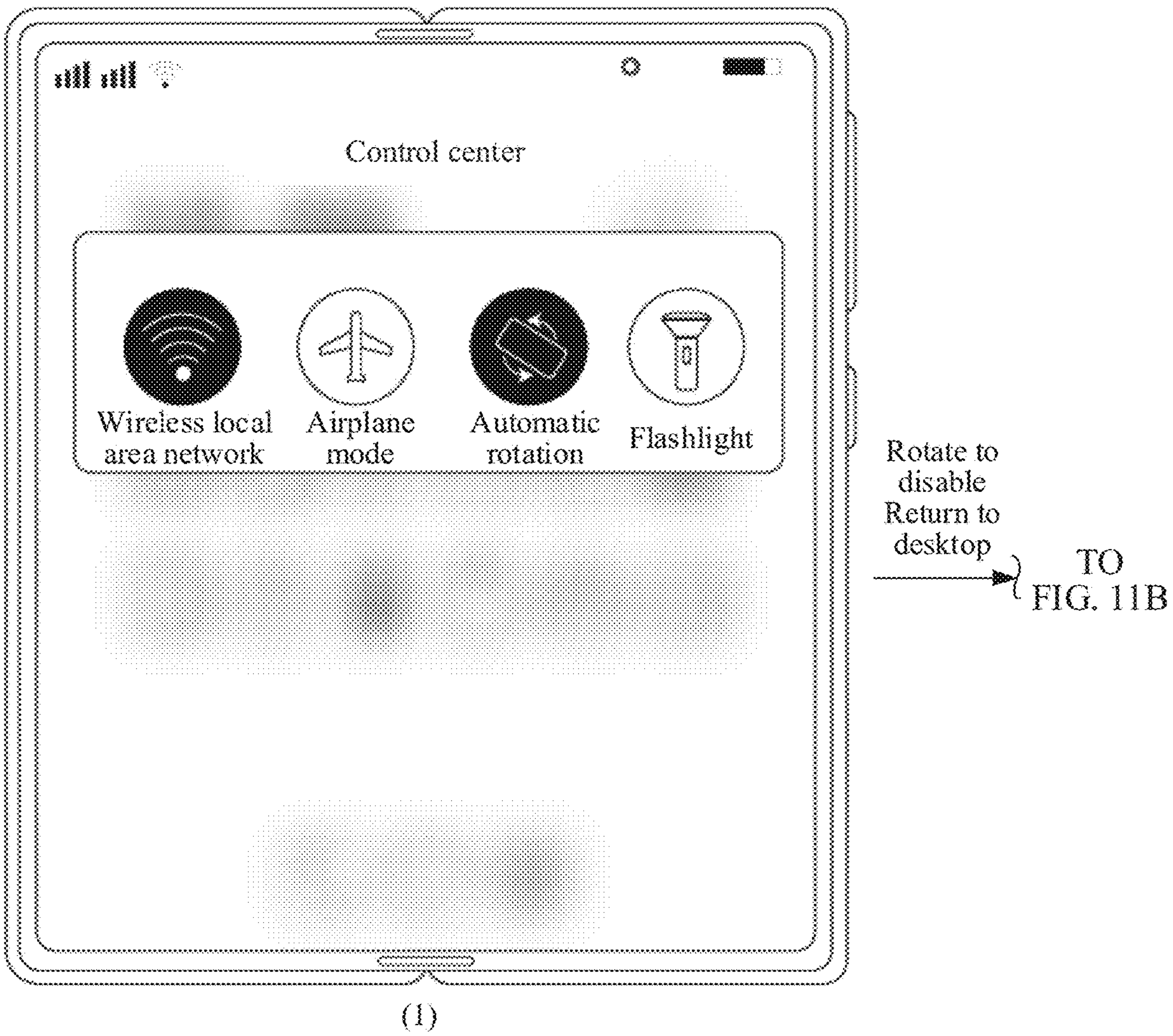
FIG. 11A, FIG. 11B, and FIG. 11C are still another schematic diagram of displaying content according to this application.
Figure 11B:
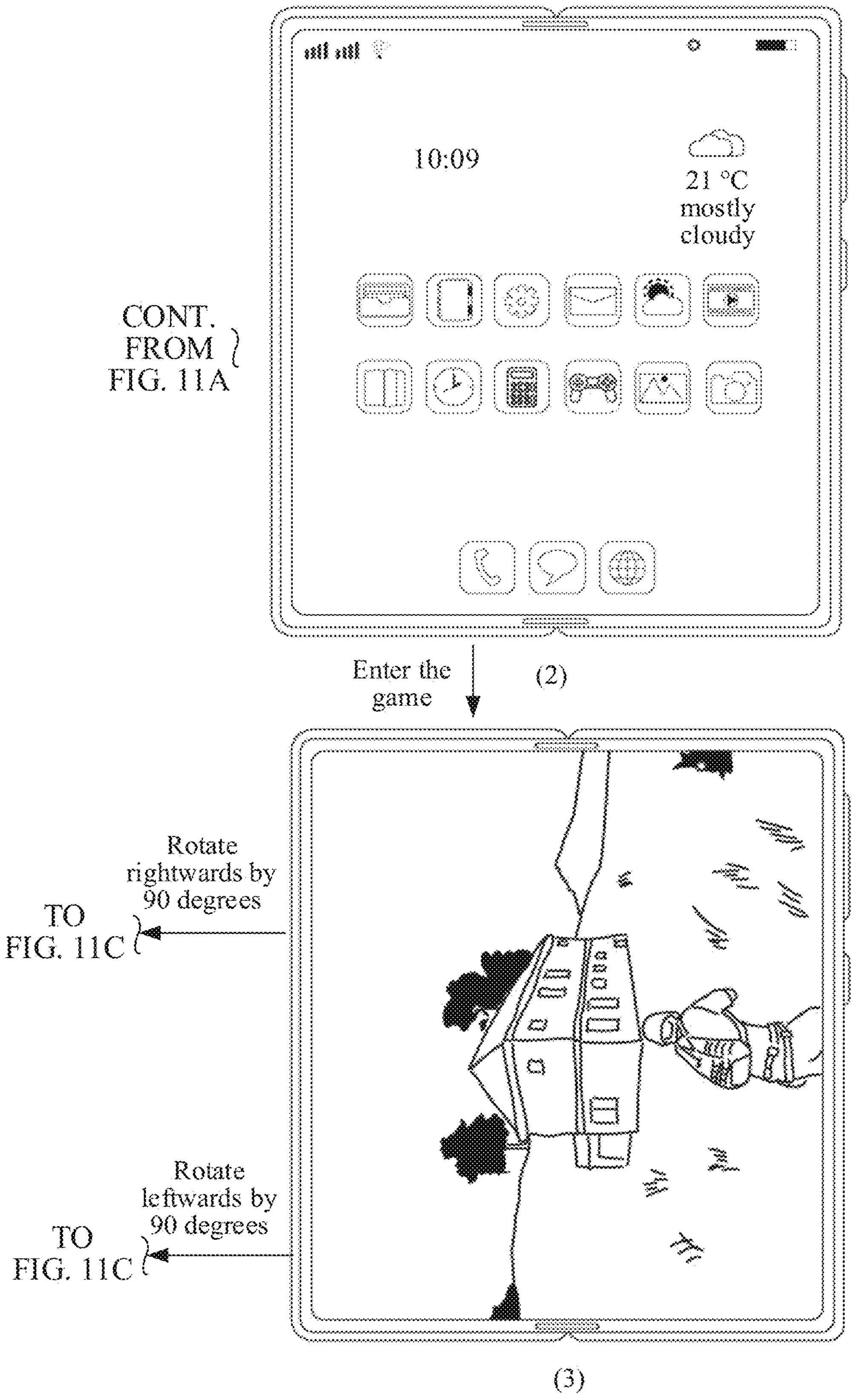
Figure 11C:
Figure 11C:
Figure 12A:
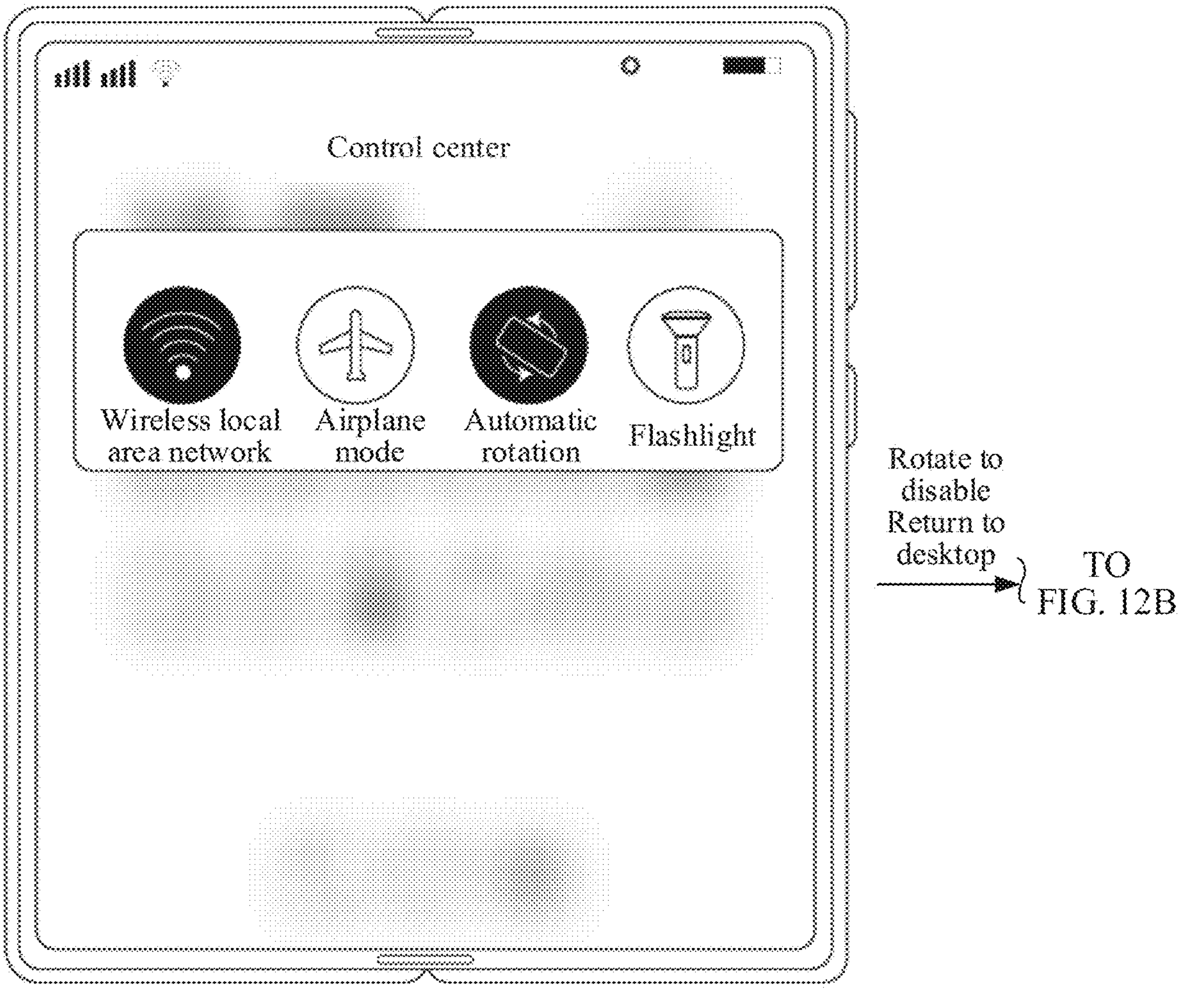
FIG. 12A, FIG. 12B, FIG. 12C, FIG. 12D, FIG. 12E, and FIG. 12F are still another schematic diagram of displaying content according to this application.
Figure 12B:
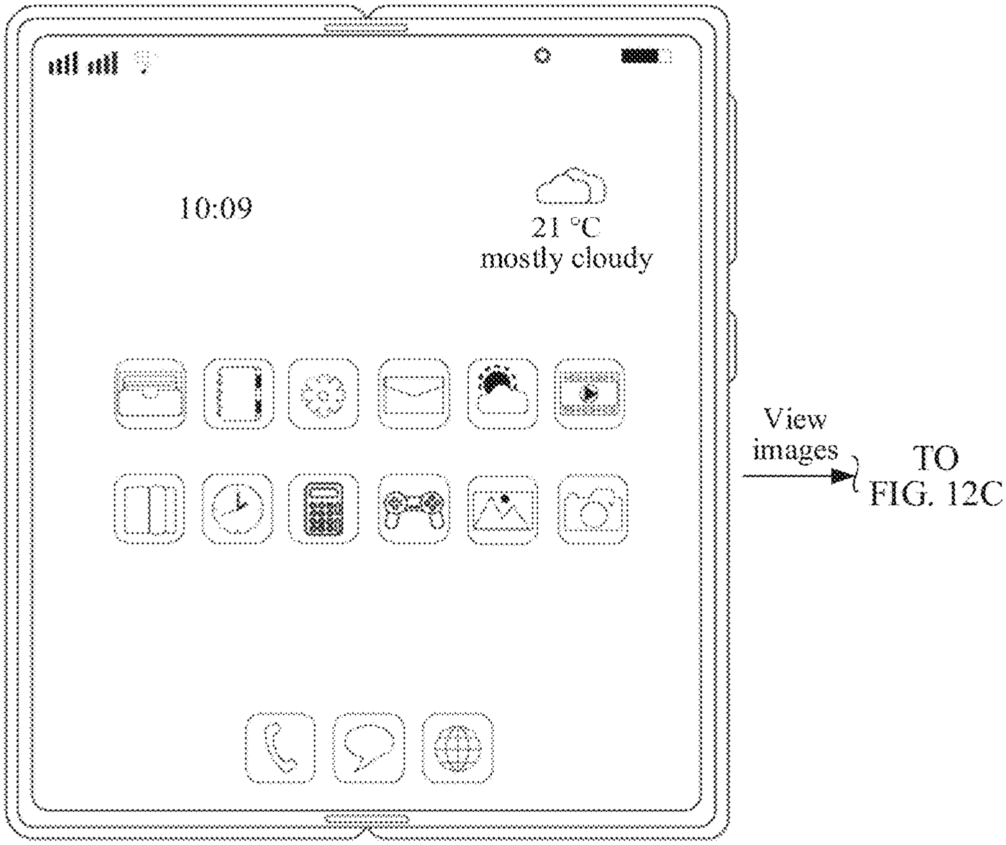
Figure 12C:
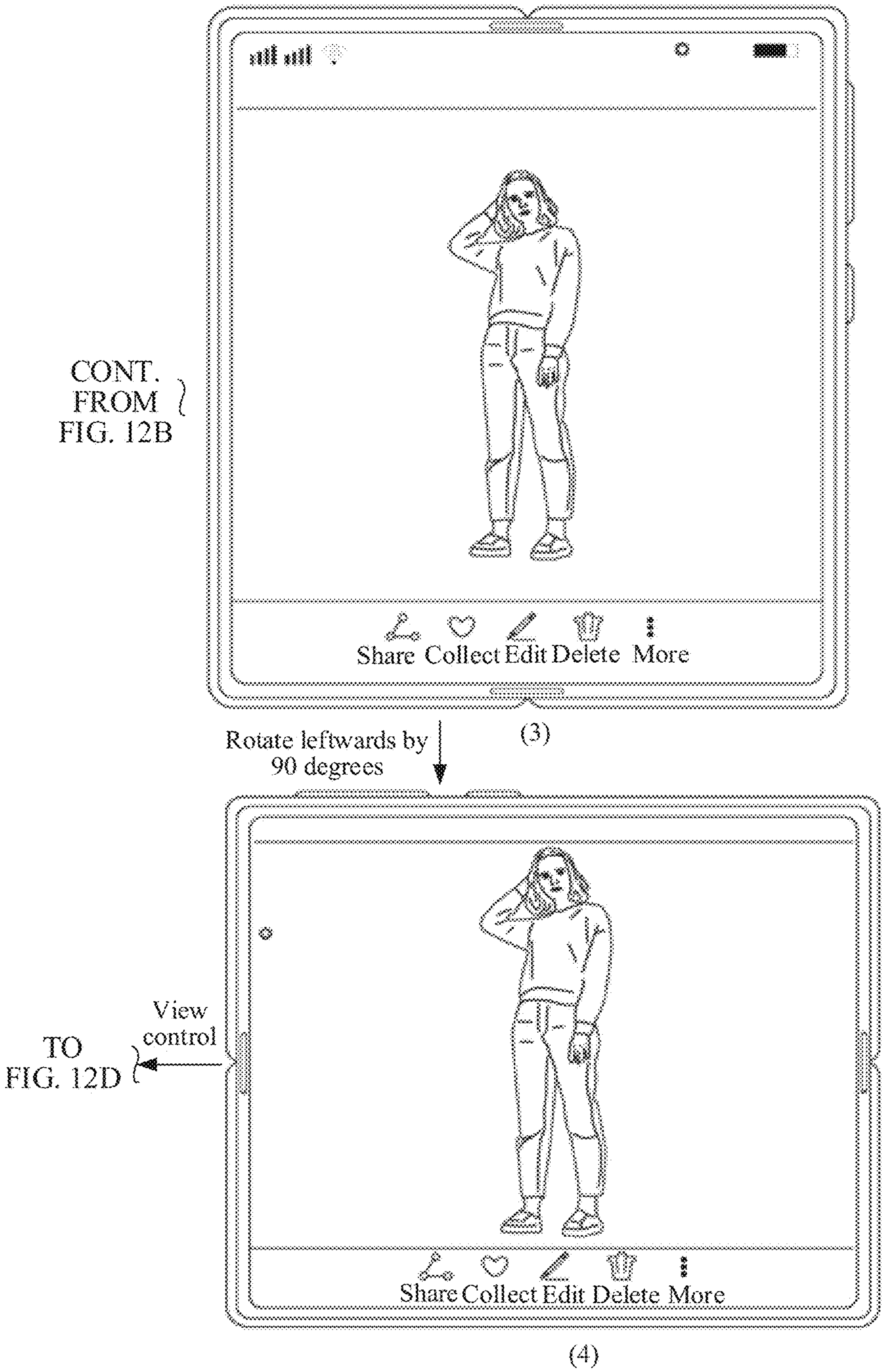
Figure 12D:
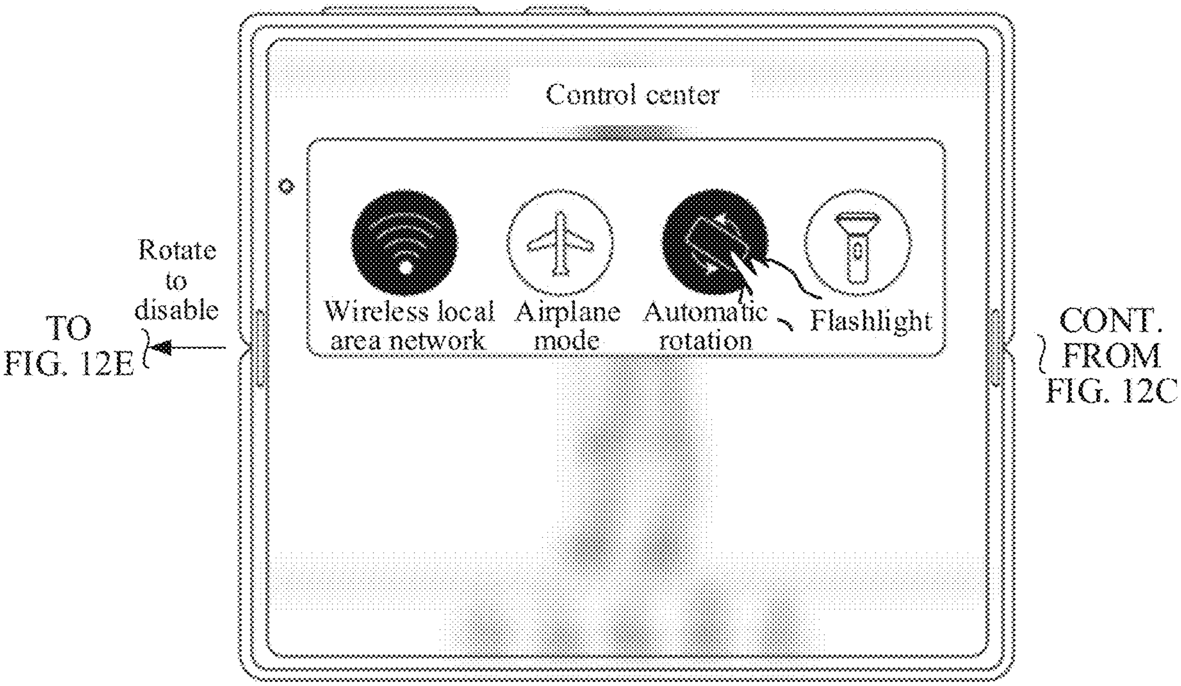
Figure 12E:
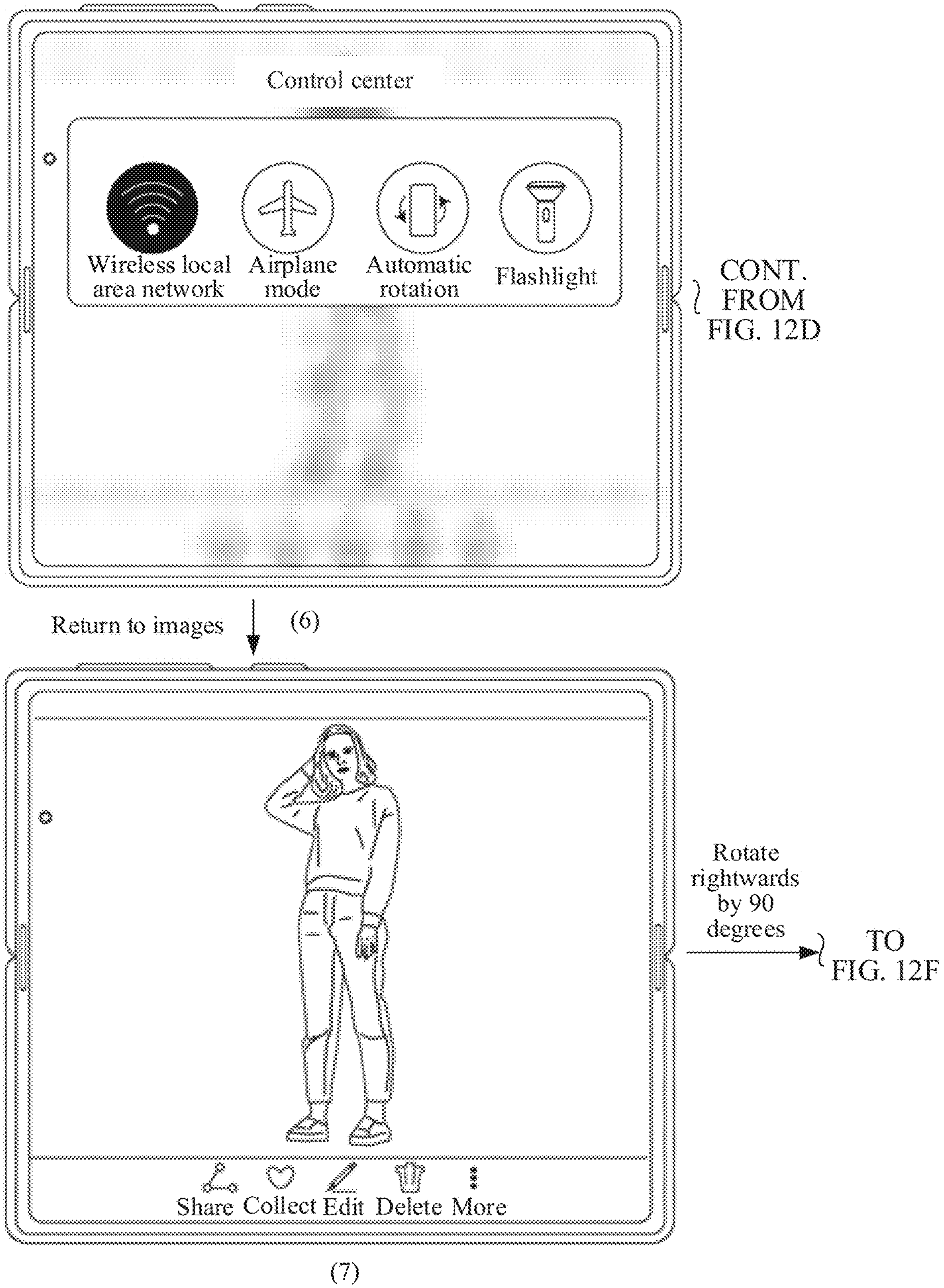
Figure 12F:
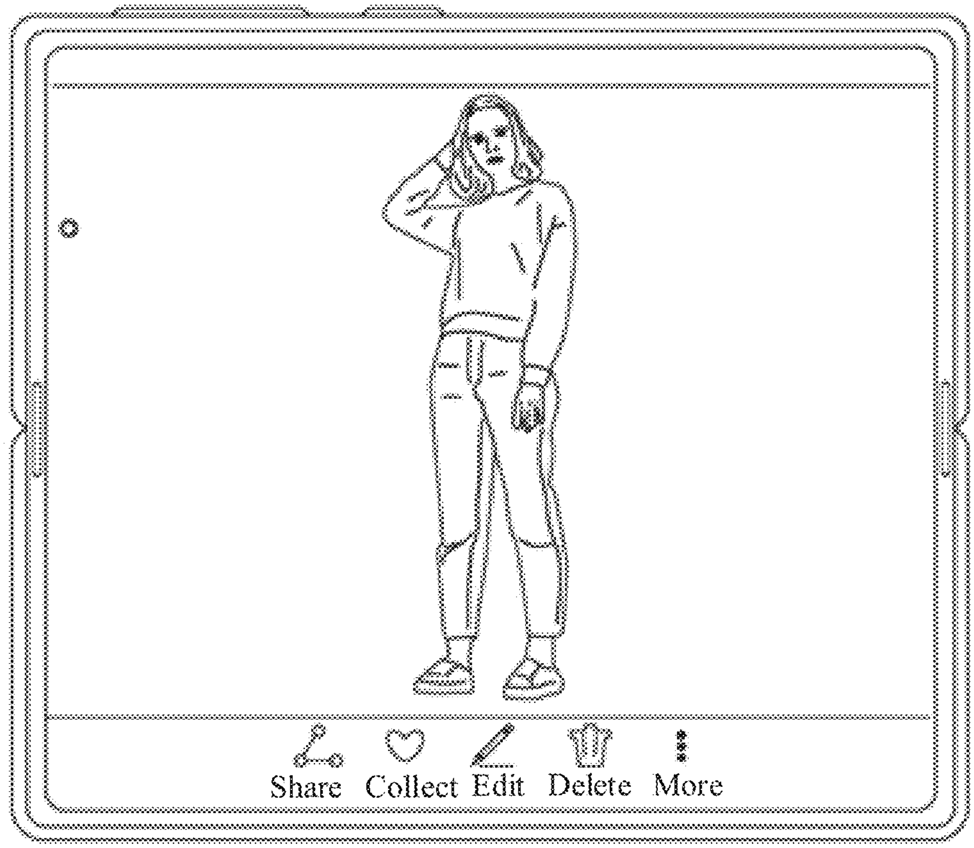

FIG. 11A, FIG. 11B, and FIG. 11C show a display example of a game application program when the electronic device is used as a tablet. (1) in FIG. 11A, FIG. 11B, and FIG. 11C show that when the electronic device displays the desktop, the user slides down to view the control center menu, and the automatic rotation controlling control in the control center menu is enabled, indicating that the electronic device has enabled the automatic rotation function. The user slides up the control center menu, and the electronic device is switched from displaying the control center menu in (1) in FIG. 11A, FIG. 11B, and FIG. 11C to displaying the desktop in (2) in FIG. 11A, FIG. 11B, and FIG. 11C. Then, the user clicks the game icon on the desktop, and the electronic device starts the game application. When the game application is started, the electronic device is used in the portrait mode. However, the game application is a mandatory landscape application program, after starting the game application, the electronic device does not display the game content in the portrait mode, and instead displays the game content in the left landscape mode as shown in (3) in FIG. 11A, FIG. 11B, and FIG. 11C.

The user rotates the electronic device by 90 degrees to the left, the electronic device is switched from portrait to left landscape, and correspondingly, the electronic device can display the game content in the left landscape mode as shown in (4) in FIG. 11A, FIG. 11B, and FIG. 11C. If the user rotates the electronic device by 90 degrees to the right when the electronic device is used in the portrait mode, the electronic device is switched from portrait to right landscape, and correspondingly, the electronic device can display game content in the right landscape mode as shown in (5) in FIG. 11A, FIG. 11B, and FIG. 11C.

FIG. 12A, FIG. 12B, FIG. 12C, FIG. 12D, FIG. 12E, and FIG. 12F show a display example of an image when the electronic device is used as a tablet. (1) in FIG. 12A, FIG. 12B, FIG. 12C, FIG. 12D, FIG. 12E, and FIG. 12F shows that when the electronic device displays the desktop, the user slides down to view the control center menu, and the automatic rotation controlling control in the control center menu is enabled, indicating that the electronic device has enabled the automatic rotation function. The user slides up the control center menu, and the electronic device is switched from displaying the control center menu in (1) in FIG. 12A, FIG. 12B, FIG. 12C, FIG. 12D, FIG. 12E, and FIG. 12F to displaying the desktop in (2) in FIG. 12A, FIG. 12B, FIG. 12C, FIG. 12D, FIG. 12E, and FIG. 12F. Then, the user clicks the gallery icon on the desktop, and the electronic device starts the gallery application. Since the electronic device is used in a portrait mode, the electronic device can display images in the portrait mode as shown in (3) in FIG. 12A, FIG. 12B, FIG. 12C, FIG. 12D, FIG. 12E, and FIG. 12F after starting the gallery application.

The user rotates the electronic device by 90 degrees to the left, and the electronic device is switched from portrait to left landscape. Because the gallery application can change the display mode along with the rotation of the electronic device, after the electronic device is switched to the left landscape, the electronic device displays images in the left landscape mode in (4) in FIG. 12A, FIG. 12B, FIG. 12C, FIG. 12D, FIG. 12E, and FIG. 12F. The user slides down the control center menu, the electronic device displays the control center menu, the user clicks the automatic rotation controlling control, and the automatic rotation controlling control switches from the enabled state to the disabled state, as shown in (5) and (6) in FIG. 12A, FIG. 12B, FIG. 12C, FIG. 12D, FIG. 12E, and FIG. 12F, and the electronic device disables the automatic rotation function. Then, the user slides up the control center menu, and the electronic device continues to display the images, for example, continues to display the images in the left landscape mode as shown in (7) in FIG. 12A, FIG. 12B, FIG. 12C, FIG. 12D, FIG. 12E, and FIG. 12F. The user rotates the electronic device by 90 degrees to the right, and the electronic device is switched to portrait. Since the automatic rotation function of the electronic device is disabled, the electronic device can display images in the left landscape mode as shown in (8) in FIG. 12A, FIG. 12B, FIG. 12C, FIG. 12D, FIG. 12E, and FIG. 12F.

Figure 13:
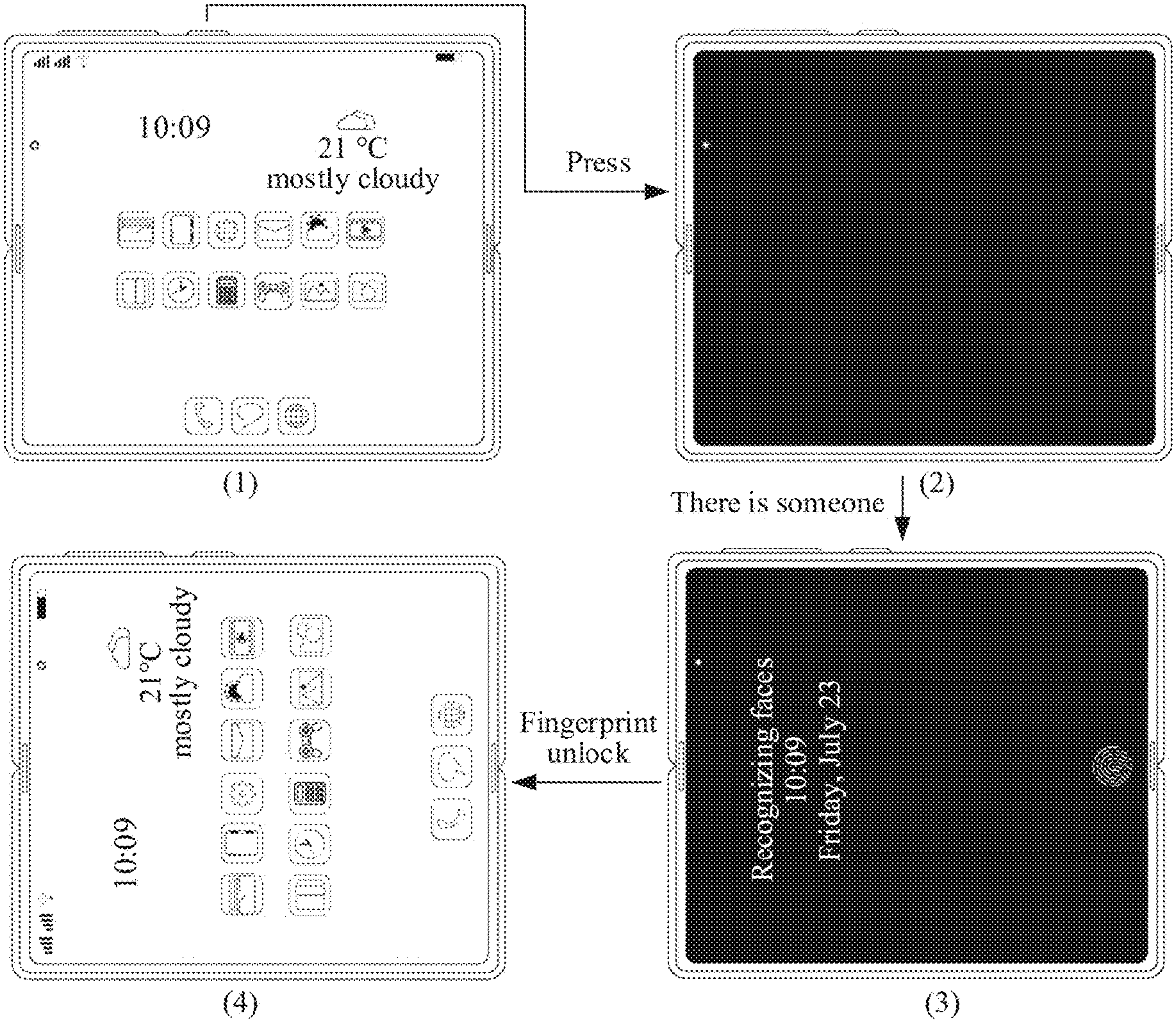
FIG. 13 is still another schematic diagram of displaying content according to this application.

As shown in FIG. 12A, FIG. 12B, FIG. 12C, FIG. 12D, FIG. 12E, and FIG. 12F above, after the automatic rotation function of the electronic device is disabled, if the electronic device is unlocked, the electronic device can display application content in the portrait mode. As shown in FIG. 13, (1) in FIG. 13 shows that when the electronic device is used as the tablet in the left landscape mode, it displays the desktop in the left landscape mode. When the user presses the power key, the electronic device is switched from displaying the desktop to the black screen, that is, the electronic device enters the screen lock state of (2) in FIG. 13. The electronic device displays the unlock interface of (3) in FIG. 13 when the user unlocks, and the user can unlock with fingerprint or face. After successful unlocking, the electronic device displays the desktop. In this case, the electronic device displays the desktop in the portrait mode in (4) in FIG. 13.

Figure 14:
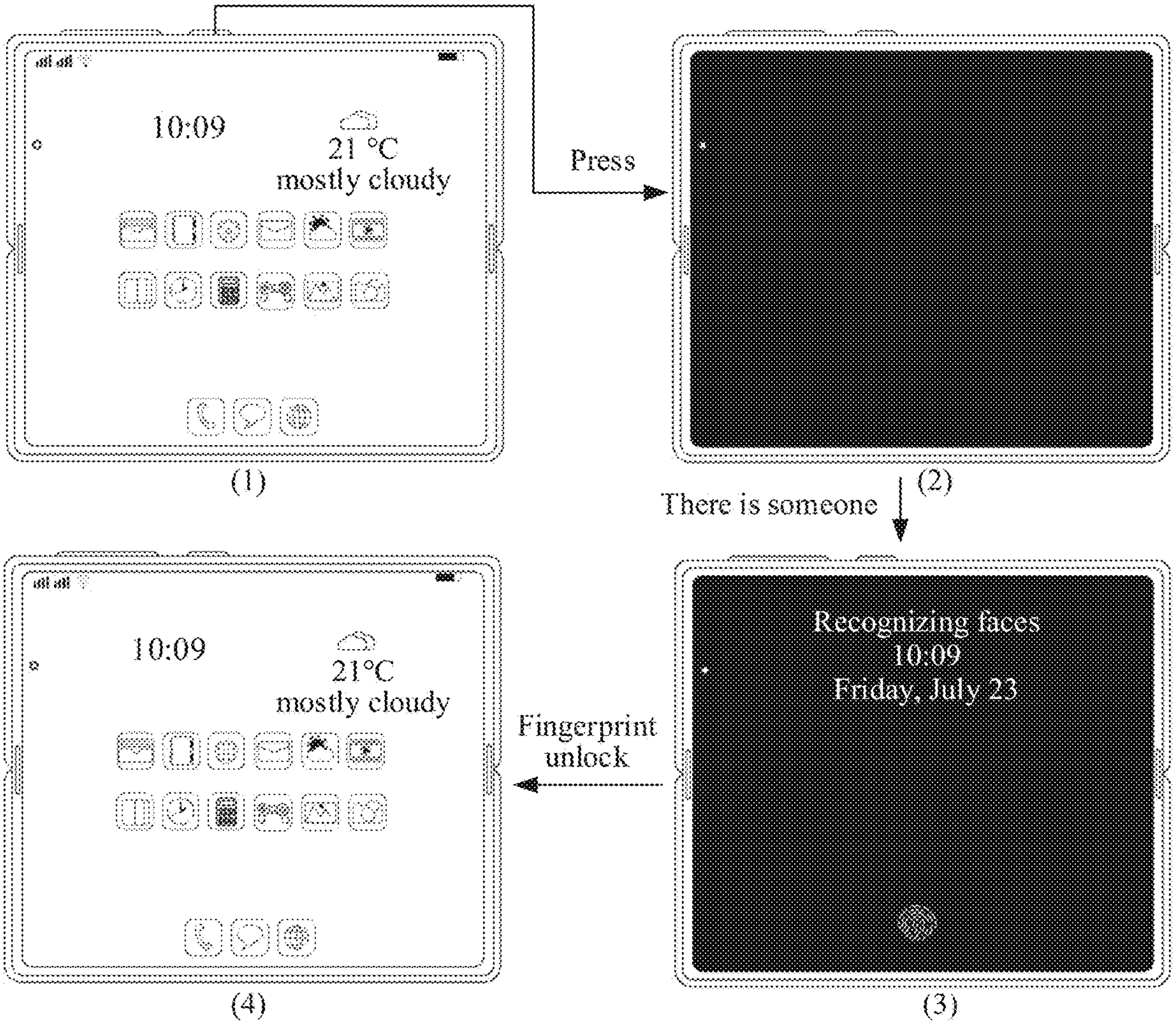
FIG. 14 is still another schematic diagram of displaying content according to this application.

In FIG. 13, the automatic rotation function of the electronic device is disabled after entering the landscape mode. If the electronic device is locked and then unlocked, although the electronic device is used in landscape mode, the content is displayed in the portrait mode. This display is contrary to the original intention of the user. For this reason, in this embodiment, display can be performed in the manner shown in FIG. 14. (1) in FIG. 14 shows that when the electronic device is used as the tablet in the left landscape mode, and displays the desktop in the left landscape mode. When the user presses the power key, the electronic device is switched from displaying the desktop to the black screen, that is, the electronic device enters the screen lock state of (2) in FIG. 14. The electronic device displays the unlock interface of (3) in FIG. 14 when the user unlocks, and the user can unlock with fingerprint or face. After successful unlocking, because the desktop is displayed in landscape mode before the screen of the electronic device is locked, the electronic device can display the desktop in landscape mode in the manner in (4) in FIG. 14.

In this embodiment, the electronic device may be a mobile phone, a smart screen, a tablet personal computer, a wearable electronic device, a vehicle-mounted electronic device, an augmented reality (AR) device, a virtual reality (VR) device, a notebook computer, an ultra-mobile personal computer (UMPC), a netbook, a personal digital assistant (PDA), a projector, or the like.

Figure 15:
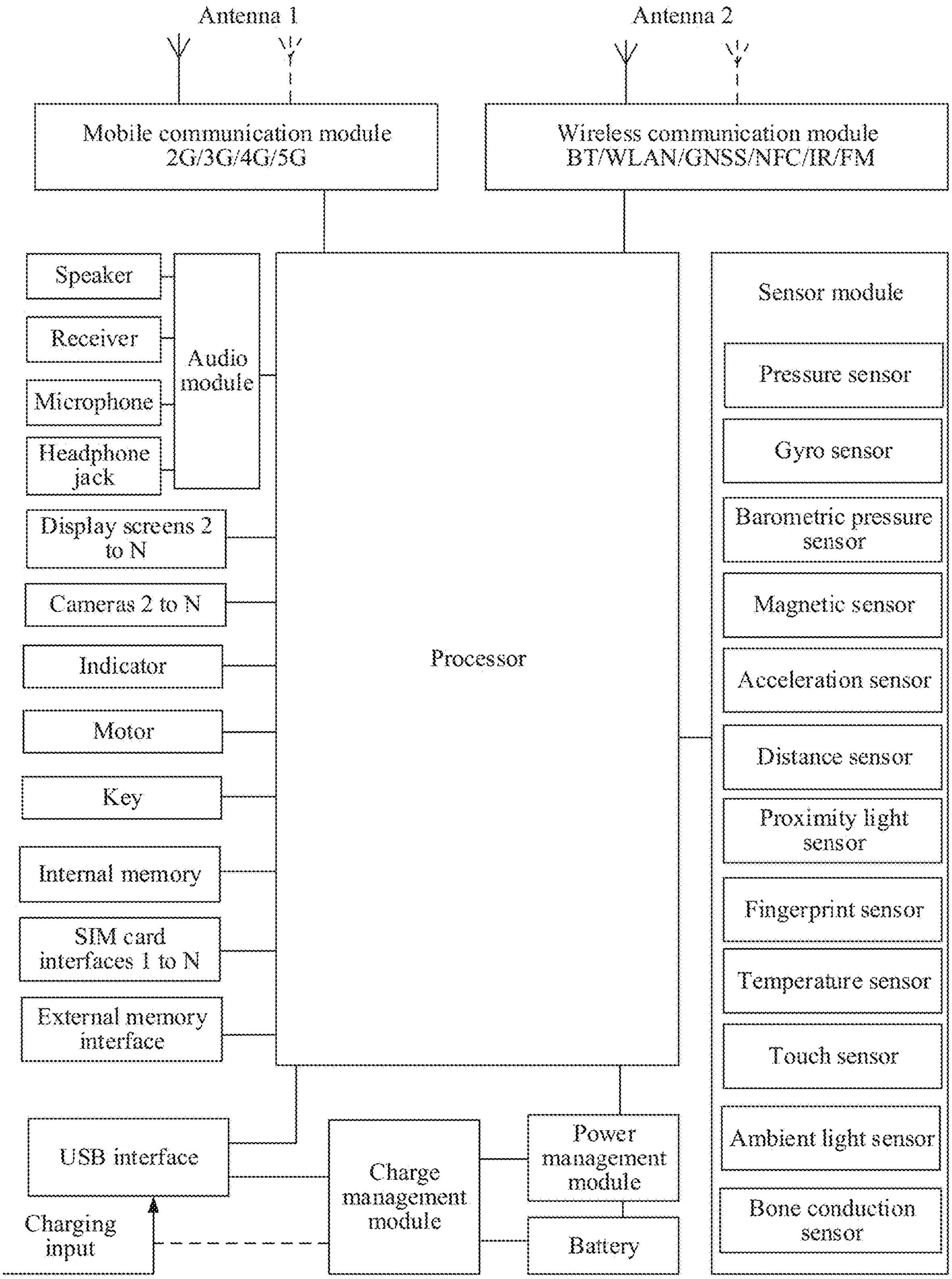
FIG. 15 is a schematic structural diagram of an electronic device according to this application.

FIG. 15 is a schematic diagram of a hardware structure of an electronic device. The electronic device may include: a processor, an outer memory interface, an inner memory, a universal serial bus (USB) interface, a charge management module, a power management module, a battery, an antenna 1, an antenna 2, a mobile communication module, a wireless communication module, a sensor module, a key, a motor, an indicator, an audio module, a camera, a display screen, and a subscriber identification module (SIM) card interface, and the like. The audio module may include a speaker, a receiver, a microphone, a headphone interface, and the like. The sensor module may include a pressure sensor, a gyro sensor, a barometric pressure sensor, a magnetic sensor, an acceleration sensor, a distance sensor, an optical proximity sensor, a fingerprint sensor, a temperature sensor, and a touch sensor, an ambient light sensor, a bone conduction sensor, and the like.

It may be understood that the schematic structure in this embodiment constitutes no specific limitation on the electronic device. In some other embodiments, the electronic device may include more or fewer components than those shown in the figure, or some components may be combined, or some components may be split, or components are arranged in different manners. The components in the portrait may be implemented by hardware, software, or a combination of software and hardware.

The processor may include one or more processing units. The processor may include an application processor (AP), a modem processor, a graphics processing unit (GPU), an image signal processor (ISP), a controller, a video codec, a digital signal processor (DSP), a baseband processor, and/or a neural-network processing unit (NPU), and the like. Different processing units may be separate devices, or may be integrated into one or more processors. The processor is the neural center and command center of the electronic device. The controller may generate an operation control signal based on an instruction operation code and a timing signal, to implement control of fetching an instruction and executing the instruction.

The outer memory interface may be configured to connect to an outer storage card, for example, a micro SD card, to expand a storage capability of the electronic device. The outer storage card communicates with the processor by using the outer memory interface, to implement a data storage function, for example, the processing rule, the automatic rotation controlling control flag, and the like are stored in the outer memory card. The inner memory may be configured to store computer-executable program code. The executable program code includes an instruction. The processor runs the instructions stored in the inner memory, to implement various functional applications and data processing of the electronic device. For example, in this application, the processor executes the instructions stored in the inner memory, so that the electronic device executes the display control method provided in this application.

The display screen may be configured to display an image, or a video. The display screen includes a display panel. The display panel may be a liquid crystal display (LCD), an organic light-emitting diode (OLED), an active-matrix organic light-emitting diode (AMOLED), a flex light-emitting diode (FLED), a mini light-emitting diode (Mini LED), a micro light-emitting diode (Micro LED), or a quantum dot light emitting diode (QLED). In some embodiments, the electronic device may include one or N display screens. N is a positive integer greater than 2. As shown in FIG. 1, the electronic device may include both an inner screen and an outer screen.

The camera is configured to capture a static image or a video. An optical image is generated for an object by using the lens and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into a standard image signal in red green blue (RGB) and YUV formats. In some embodiments, the electronic device may include 2 or N cameras, and N is a positive integer greater than 2.

An operating system runs on the foregoing components, for example, the iOS operating system developed by Apple, the Android open-source operating system developed by Google, and the Windows operating system developed by Microsoft. An application program may be installed and run on the operating system.

Figure 16:
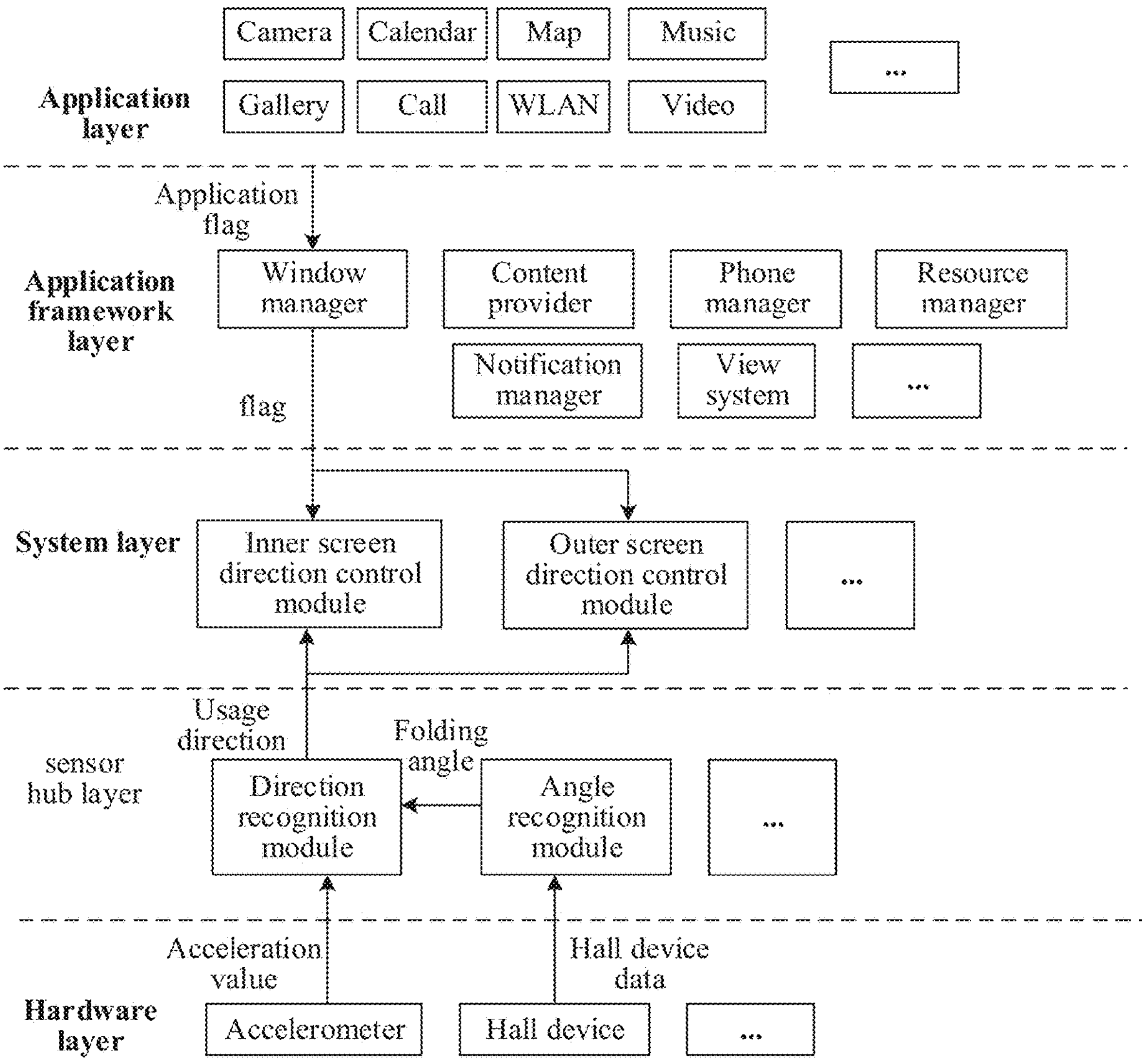
FIG. 16 is a schematic diagram of a software and hardware architecture of an electronic device according to this application.

An operating system of the electronic device may use a layered architecture, an event-driven architecture, a micro core architecture, a micro service architecture, or a cloud architecture. In this embodiment of this application, the software structure of the electronic device is illustrated by using an Android system with a layered architecture as an example. FIG. 16 is a schematic diagram of a software and hardware structure of an electronic device. The software and hardware structure adopts a layered architecture. In the layered architecture, software and hardware are divided into several layers, and each layer has a clear role and task. The layers communicate with each other through a software interface. Taking Android system as an example, in some embodiments, the Android system is divided into four layers, which are an application layer, an application framework layer, a system layer, a sensor hub layer, and a hardware layer from top to bottom.

The application layer may include a series of application packages. The application packages may include APPs such as camera, gallery, calendar, call, maps, WLAN, music, and videos. The application framework layer provides an application programming interface (API) and a programming framework for applications at the application layer. The application framework layer includes some predefined functions. For example, the application framework layer may include a window manager, a content provider, a view system, a phone manager, a resource manager, a notification manager, and the like. The window manager is configured to manage window programs. The window manager can obtain the size of the display screen, determine whether there is a state bar, lock the screen, capture the screen, or the like. For example, the window manager can obtain the state of the automatic rotation controlling control in the control center menu, and the state of the automatic rotation controlling control includes enabled and disabled.

The system library may include a plurality of function modules, For example, a surface manager, a media library (Media Libraries), a three-dimensional graphics processing library (for example, OpenGL ES), and a 2D graphics engine (for example, SGL) and so on. The system library can also include an inner screen direction control module and an outer screen direction control module. The inner screen direction control module is configured to control the real-time display direction of the inner screen, and the outer screen direction control module is configured to control the real-time display direction of the outer screen. The real-time display direction can include at least one of portrait display, left landscape display, right landscape display and inverted portrait display. The inner screen direction control module may be called a second display screen direction control module, and the outer screen direction control module may be called a first display screen direction control module.

The sensor hub layer is configured to obtain data from the hardware layer. For example, the sensor hub layer can obtain acceleration data (such as acceleration values) from the accelerometer, obtain Hall device data from the Hall device, or the like, and the sensor hub layer can include a direction recognition module and an angle recognition module. The angle recognition module is configured to obtain Hall device data, and calculate the folding angle according to the Hall device data, where the folding angle is the angle between the first body and the second body of the electronic device. The direction recognition module is configured to calculate the usage direction of the electronic device according to the acceleration value, where the usage direction is used to indicate the usage gesture (also called the usage posture) of the electronic device, such as portrait usage or left landscape usage. The hardware layer includes hardware such as an accelerometer and a Hall device. The accelerometer can feed back the acceleration value to the direction recognition module, and the Hall device can feed back the Hall device data to the angle recognition module.

In some examples, the direction recognition module and the angle recognition module can feed back information to the inner screen direction control module and the outer screen direction control module respectively, for example, the direction recognition module feeds back the usage direction to the inner screen direction control module and the outer screen direction control module, and the angle recognition module can feed back the folding angle to the inner screen direction control module and the outer screen direction control module. If the folding angle indicates that the electronic device is in the unfolded state, the inner screen direction control module is enabled, and the inner screen direction control module controls the inner screen to display the direction in real time. If the folding angle indicates that the electronic device is in the folded state, the outer screen direction control module is enabled, and the outer screen direction control module controls the outer screen to display the direction in real time.

In some examples, the angle recognition module can feed back the folding angle to the direction recognition module, and the folding angle is used to control the direction recognition module to feed back the usage direction to one of the inner screen direction control module and the outer screen direction control module. For example, if the folding angle indicates that the electronic device is in the unfolded state, the direction recognition module feeds back the usage direction to the inner screen direction control module, the inner screen direction control module is enabled, and the inner screen direction control module controls the inner screen to display the direction in real time. If the folding angle indicates that the electronic device is in the folded state, the direction recognition module feeds back the usage direction to the outer screen direction control module, the outer screen direction control module is enabled, and the outer screen direction control module controls the outer screen to display the direction in real time. During the control process of the outer screen direction control module and the inner screen direction control module, the application framework layer can feed back the state of the automatic rotation controlling control, for example, feed back the flag of the automatic rotation controlling control. If flag==false, it means that the electronic device disables the automatic rotation controlling control. If flag==true, it means that the electronic device enables the automatic rotation controlling control.

Figure 17:
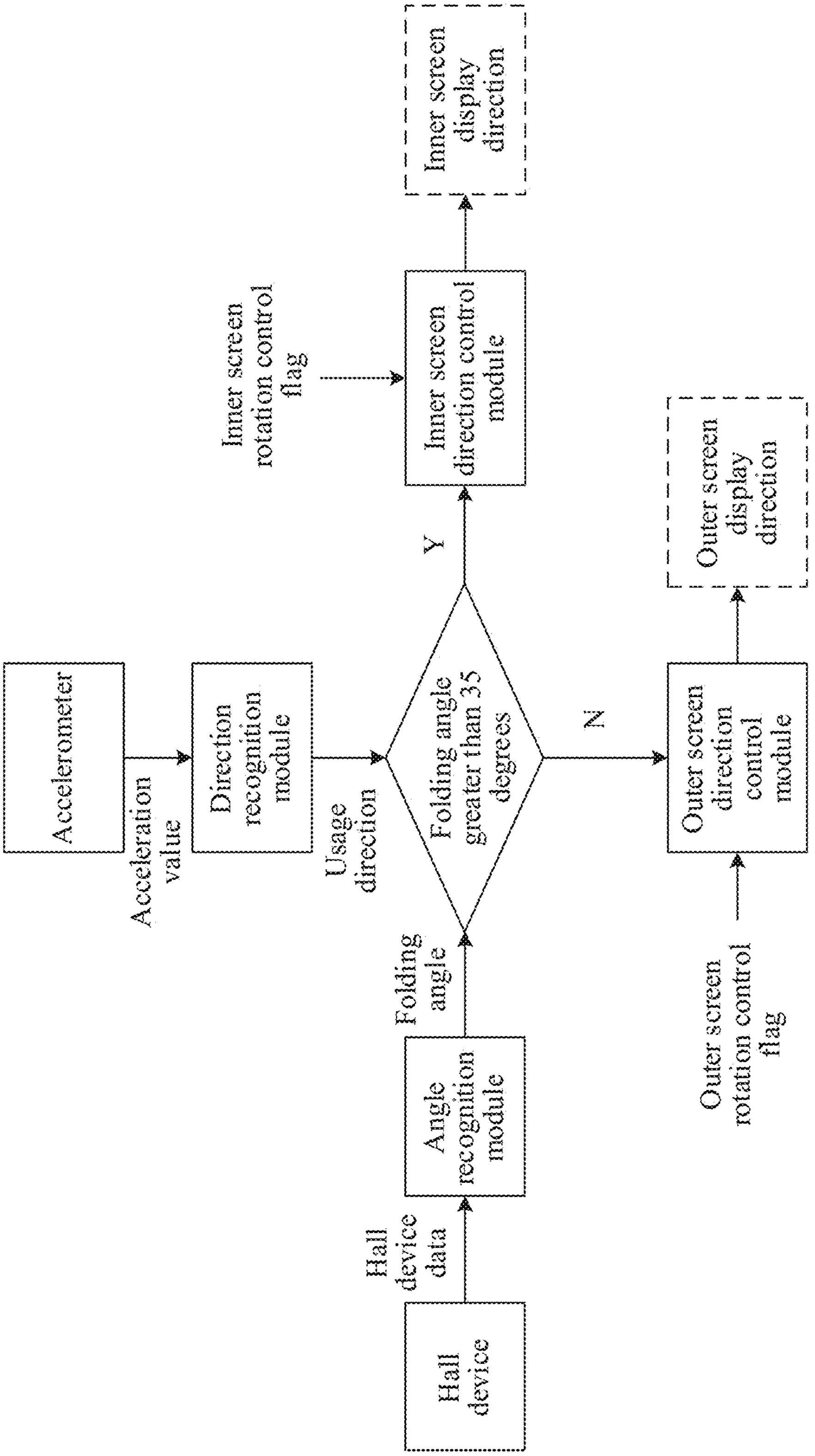
FIG. 17 is a schematic diagram of a working procedure in a display control method according to this application.

The electronic device invokes the angle recognition module, the direction recognition module, the outer screen direction control module and the inner screen direction control module to implement the display control method. The schematic diagram of the working process of the display control method is shown in FIG. 17. The display control method may include the following steps:

1) The angle recognition module can obtain Hall device data from the Hall device, and the angle recognition module can obtain the folding angle of the electronic device based on the Hall device data, where the folding angle of the electronic device is used to determine whether the electronic device is in an unfolded state or folded state.
2) The direction recognition module can obtain the acceleration value from the accelerometer, and the direction recognition module can determine the usage direction of the electronic device based on the acceleration value.
3) The electronic device determines whether the folding angle is greater than 35 degrees, if the folding angle is greater than 35 degrees, enables the inner screen direction control module, and if the folding angle is less than or equal to 35 degrees, enables the outer screen direction control module. 35 degrees is used to determine whether the electronic device is in an unfolded state or a folded state. If the folding angle is greater than 35 degrees, it is determined that the electronic device is in an unfolded state. If the folding angle is less than or equal to 35 degrees, it is determined that the electronic device is in a folded state. 35 degrees is just an example of a preset angle, which is not limited here.
4) The inner screen direction control module obtains the inner screen rotation control flag and the usage direction of the electronic device, and controls the inner screen display according to the inner screen rotation control flag and the usage direction of the electronic device. The inner screen rotation control flag can indicate whether the inner screen automatic rotation function is enabled, and if flag==false, it means that the electronic device disables the inner screen automatic rotation function. If flag==true, it means that the electronic device enables the inner screen automatic rotation function.

In some examples, the electronic device is configured with an automatic rotation controlling control. When the electronic device is in the unfolded state, the automatic rotation controlling control is used as an inner screen automatic rotation controlling control, and the corresponding flag of the automatic rotation controlling control is the inner screen rotation control flag. In some examples, the electronic device is configured with two automatic rotation controlling controls, one is an outer screen automatic rotation controlling control, and the other is an inner screen automatic rotation controlling control, and the inner screen rotation control flag is the flag of the inner screen automatic rotation controlling control.

5) The outer screen direction control module obtains the outer screen rotation control flag and the usage direction of the electronic device, and controls the outer screen display according to the outer screen rotation control flag and the usage direction of the electronic device. The outer screen rotation control flag can indicate whether the outer screen automatic rotation function is enabled, and if flag==false, it means that the electronic device disables the outer screen automatic rotation function. If flag==true, it means that the electronic device enables the outer screen automatic rotation function.

In some examples, the electronic device is configured with an automatic rotation controlling control. When the electronic device is in the folded state, the automatic rotation controlling control is used as an outer screen automatic rotation controlling control, and the corresponding flag of the automatic rotation controlling control is the outer screen rotation control flag. In some examples, the electronic device is configured with two automatic rotation controlling controls, one is an outer screen automatic rotation controlling control, and the other is an inner screen automatic rotation controlling control, and the outer screen rotation control flag is the flag of the outer screen automatic rotation controlling control. The outer screen rotation control flag can be a first control flag, the inner screen rotation control flag can be a second control flag, true can be a first value of the first control flag and the second control flag, and false can be a second value of the first control flag and the second control flag.

Figure 18:
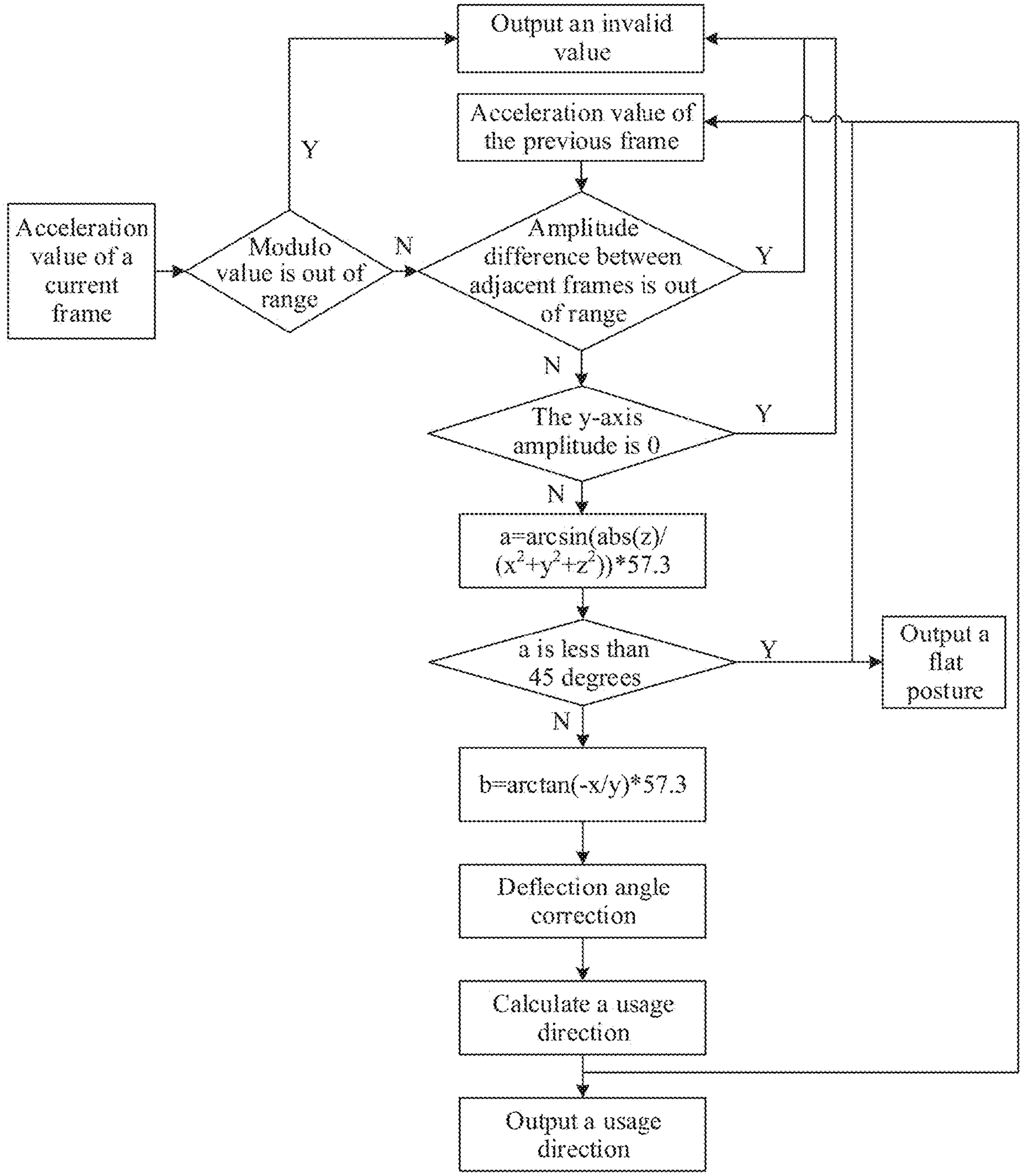
FIG. 18 is a schematic diagram of a working procedure of recognizing a usage direction according to this application.

The process of identifying the usage direction of the electronic device by the direction recognition module is shown in FIG. 18, and may include the following steps:

11) The direction recognition module determines whether the modulus value of the acceleration value of the current frame is out of range, and if the modulus value of the acceleration value of the current frame is out of range, an invalid value is output. If the modulus value of the acceleration value of the current frame is not out of range, perform step 12).

The direction recognition module outputs an invalid value, indicating that the acceleration value of the current frame is invalid, and the direction recognition module can continue to use the valid acceleration value of the current frame to identify the usage direction, for example, the valid acceleration value of the current frame is the previously obtained acceleration value.

The modulus of the acceleration value can be obtained through sqrt (x2+y2+72), where sqrt represents the square root, and x, y and z are values in the three directions of x-axis, y-axis and z-axis collected by the accelerometer. Generally, the standard gravity acceleration value is 9.80665, and therefore the electronic device can preset the value range of the acceleration value, for example, the value range is (9.0, 10.6). This value range can be regarded as a preset modulus threshold of the acceleration value of the current frame, if the modulus value of the acceleration value of the current frame is not within this value range, it is determined that the state of the electronic device is unstable, and thus it is determined that the acceleration value of the current frame is invalid. An invalid value is output, for example, an invalid value −2 is output in some examples.

12) The direction recognition module obtains the acceleration value of the previous frame, and determines whether the amplitude difference between the acceleration value of the current frame and the acceleration value of the previous frame exceeds the range, and outputs an invalid value if the difference exceeds the range, and if not, perform step 13).

The acceleration value of the previous frame is the acceleration value of the previous frame of the acceleration value of the current frame, and the acceleration value of the previous frame is a valid acceleration value determined based on the modulus value and the amplitude difference. An acceleration value includes x-axis amplitude, y-axis amplitude and z-axis amplitude, and the direction recognition module can calculate the amplitude difference between the x-axis amplitude of the acceleration value of the current frame and the x-axis amplitude of the acceleration value of the previous frame, calculate the amplitude difference between the y-axis amplitude of the acceleration value of the current frame and the y-axis amplitude of the acceleration value of the previous frame, and calculate the amplitude difference between the z-axis amplitude of the acceleration value of the current frame and the z-axis amplitude of the acceleration value of the previous frame.

The direction recognition module determines whether the absolute value of the amplitude difference of any of the x-axis, y-axis and z-axis exceeds the range, and if the absolute value of the amplitude difference of any axis exceeds the range, an invalid value is output to determine that the acceleration value of the current frame is invalid. For example, if the absolute value of the amplitude difference of any axis is greater than 1.2 (1.2 is an example of a preset amplitude difference threshold), it is determined that the value is out of range and an invalid value is output. If the absolute value of the amplitude difference of any axis is out of range, the direction recognition module may determine that the state of the electronic device is unstable.

It should be noted that: when the direction recognition module recognizes the usage direction for the first time, the acceleration value of the previous frame is empty, and the direction recognition module can initialize the three-axis values of the acceleration value of the previous frame to 0. After completing recognition of the usage direction once, the acceleration value of the previous frame is updated. For example, after completing recognition of the usage direction once, the acceleration value of the current frame is used as the acceleration value of the previous frame, and the direction recognition module obtains the valid acceleration value again and then uses the updated acceleration value of the previous frame.

13) The direction recognition module determines whether the amplitude of the y-axis is 0, and if the amplitude of the y-axis is 0, an invalid value is output. If the amplitude of the y-axis is not 0, perform step 14). 0 is an example of a preset value of the y-axis amplitude, which is not limited in this embodiment.

14) The direction recognition module calculates the pitch angle, and the calculation formula of the pitch angle is a=arcsin(abs(z)/(x2+y2+z2))*57.3.

15) The direction recognition module determines whether the pitch angle is less than 45 degrees. If the angle is less than 45 degrees, it is output that the usage direction is flat, that is, the display screen of the electronic device is flat. The direction recognition module can output −1, and −1 indicates that the usage direction is flat and the electronic device is in a flat posture. If the pitch angle is less than 45 degrees, the direction recognition module determines the acceleration value of the current frame as the acceleration value of the previous frame, and continues to obtain the acceleration value. If the pitch angle is greater than or equal to 45 degrees, perform step 16). 45 degrees is an example of a preset pitch angle, and the flat posture is a special usage posture of the electronic device. For example, the inner screen of the electronic device faces upwards, and the electronic device is placed flat on the table, and in this case, the electronic device is in a special usage posture.

45 degrees and −1 are examples and are not limited here, a represents the pitch angle, and x, y and z represent the amplitude of the x-axis, the amplitude of the y-axis and the amplitude of the z-axis respectively.

16) The direction recognition module calculates the deflection angle according to the pitch angle. The calculation formula of the deflection angle is b=arctan (−x/y)*57.3, and b represents the deflection angle. Since y is the denominator when calculating the deflection angle, it is determined that the acceleration value of the current frame is an invalid value when the y-axis amplitude is determined as 0 in step 13, so as to avoid abnormal calculation of the deflection angle.

17) The direction recognition module corrects the deflection angle. One way of correction is, if b<0, b=b+360 degrees; otherwise, b=b; to normalize the deflection angle between 0 and 360 degrees.

18) The direction recognition module calculates the usage direction according to the corrected deflection angle. In some examples, the calculation of the usage direction is R=(b+45°)/90°, and the usage direction is the result of rounding down R. 0 can represent portrait, 1 can represent left landscape, 2 can represent inverted portrait, and 3 can represent right landscape. 2 generally does not take effect, which can mean that when the electronic device is switched to the inverted portrait, the display direction of the content displayed by the electronic device does not change. For example, the content is displayed in the left landscape mode before switching to the inverted portrait, and the content is still displayed in the left landscape after switching to the inverted portrait.

19) The direction recognition module outputs the usage direction, and determines the acceleration value of the current frame as the acceleration value of the previous frame, and continues to obtain the acceleration value.

In this embodiment, the usage direction of the electronic device is used to represent the usage posture/usage state of the electronic device. For example, the usage direction of the electronic device is portrait, indicating that the electronic device is used in the portrait mode. Another example is that the usage direction of the electronic device is the left landscape, indicating that the electronic device is used in left landscape mode. The direction recognition module can send the usage direction to the outer screen direction control module and/or the inner screen direction control module, and the outer screen direction control module and/or the inner screen direction control module control the content display according to the usage direction.

When the outer screen direction control module controls the content display according to the usage direction, the outer screen direction control module can refer to the application type and the outer screen rotation control flag. A processing rule of the outer screen direction control module is as follows:

For mandatory portrait applications (also called portrait display applications), the outer screen direction control module controls the applications to be displayed in the portrait and/or inverted portrait mode. For mandatory landscape applications (also called landscape display applications), the outer screen direction control module controls the applications to be displayed in the left landscape and/or right landscape mode.

For applications whose direction can be automatically rotated according to the state of the device (also called landscape and portrait display applications), the outer screen direction control module can control, according to the outer screen rotation control flag, such applications to be displayed, for example, before starting such applications, the outer screen rotation control flag indicates that the electronic device disables the outer screen automatic rotation function, and the outer screen direction control module controls such applications to be displayed in the portrait mode. If the outer screen rotation control flag indicates, before such applications are started, that the electronic device enables the automatic rotation function of the outer screen, after such application are started, the outer screen direction control module can control the display of such applications according to the usage direction of the electronic device, so that the display of such applications can change with the change of the usage direction of the electronic device. If the automatic rotation function is disabled after the application is started, the outer screen direction control module controls the application to be displayed in the display mode last used before the disabling.

Figure 19:
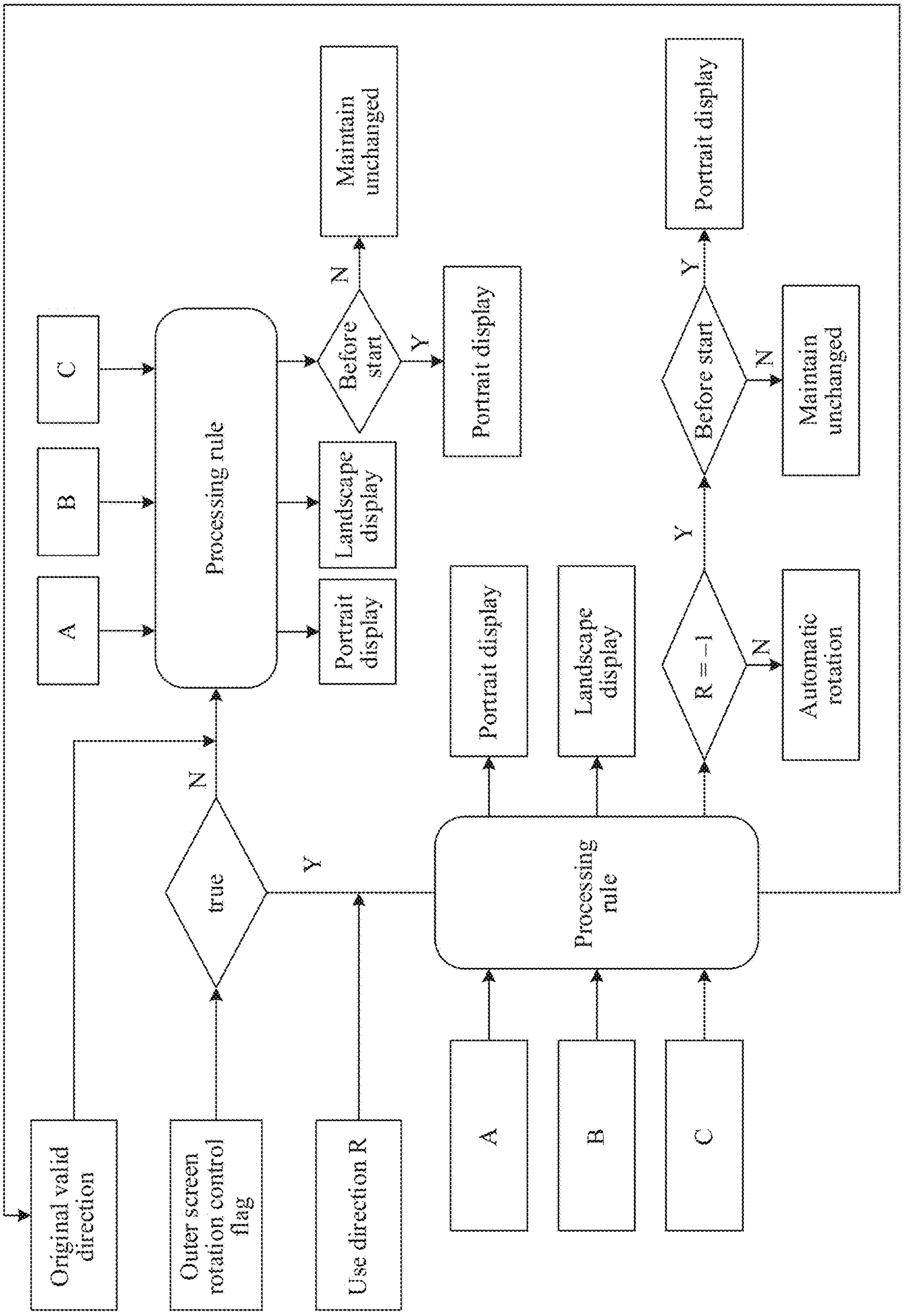
FIG. 19 is a schematic diagram of a working procedure of an outer screen direction control module according to this application.

The schematic diagram of the working process of the outer screen direction control module is shown in FIG. 19. In FIG. 19, A is a mandatory portrait application, such as desktop and WeChat, B is a mandatory landscape application, such as games, and C is an application whose direction can be automatically rotated according to the state of the device, such as settings and gallery. The working process of the outer screen direction control module may include the following steps:

21) The outer screen direction control module obtains the outer screen rotation control flag and the flag of the application program, where the flag of the application program is the flag of the focus application running on the electronic device in the foreground, the focus application is the application that occupies the focus window, and the focus window can be a window in which the user is currently operating. The flag of the application program can be the name of the application program, and the outer screen direction control module can determine the type of the application program through the flag of the application program, such as mandatory portrait or mandatory landscape.

The outer screen rotation control flag can indicate whether the outer screen automatic rotation function is enabled, and if flag==false, it means that the electronic device disables the outer screen automatic rotation function. If flag==true, it means that the electronic device enables the outer screen automatic rotation function.

22) The outer screen direction control module determines the type of the application program according to the flag of the application program.

23) If the application is a mandatory portrait application, the outer screen direction control module can control, according to processing rules, the application program to be displayed in the portrait or inverted portrait mode.

For example, if the electronic device is used in the portrait mode, the outer screen direction control module controls the application program to be displayed in the portrait mode. If the electronic device is used in the inverted portrait mode, the outer screen direction control module controls the application program to be displayed in the portrait or inverted portrait mode. Mandatory portrait applications may not be affected by the outer screen rotation control flag, that is, regardless of whether the outer screen automatic rotation function is enabled or disabled on the electronic device, the outer screen direction control module can control the mandatory portrait application to be displayed in the portrait or inverted portrait mode. For example, if the outer screen rotation control flag indicates that the electronic device enables the outer screen automatic rotation function, and the electronic device is used in the left or right landscape mode, the outer screen direction control module can control this type of application to be used in the portrait mode.

As shown in FIG. 9A and FIG. 9B, the outer screen displays the desktop. Although the electronic device has enabled the outer screen automatic rotation function, since the desktop is a mandatory portrait application, the desktop is displayed in the portrait mode when the electronic device is used in the portrait mode. The electronic device is used in the left landscape mode, and the desktop is still displayed in the portrait mode.

24) If the application is a mandatory landscape application, the outer screen direction control module can control, according to processing rules, the application program to be displayed in the left landscape or right landscape mode.

For example, if the electronic device is used in the left landscape mode, the outer screen direction control module controls the application program to be displayed in the left landscape mode. If the electronic device is used in the right landscape, the outer screen direction control module controls the application program to be displayed in the right landscape. Mandatory landscape applications may not be affected by the outer screen rotation control flag, that is, regardless of whether the outer screen automatic rotation function is enabled or disabled on the electronic device, the outer screen direction control module can control the mandatory landscape application to be displayed in the left landscape or right landscape mode. For example, if the outer screen rotation control flag indicates that the electronic device enables the outer screen automatic rotation function, and the electronic device is used in the portrait mode, the outer screen direction control module can control this type of application to be used in the left landscape mode.

As shown in FIG. 8A and FIG. 8B, the outer screen displays the game application. Although the electronic device has enabled the outer screen automatic rotation function, since the game application is a mandatory landscape application, the game application is displayed in the left landscape mode when the electronic device is used in the portrait mode. The electronic device is used in the left landscape mode, and the game application is displayed in the left landscape mode. The electronic device is used in the right landscape mode, and the game application is displayed in the right landscape mode.

25) If the application is an application whose direction can be automatically rotated according to the state of the device, the outer screen rotation control flag indicates that the outer screen automatic rotation function is disabled, and the outer screen direction control module determines that the outer screen automatic rotation function is disabled before the application is started, controls the application program to be displayed in the portrait mode, and if the outer screen automatic rotation function is disabled after the application is started, when the usage direction of the electronic device is changed, controls the application program to be displayed in the original valid direction.

The original valid direction is the display direction last used by the electronic device before the outer screen automatic rotation function of the electronic device is disabled. Before the electronic device disables the outer screen automatic rotation function, if the display direction of the application program changes with change of the usage direction of the electronic device, the outer screen direction control module can update the original valid direction. After the electronic device disables the outer screen automatic rotation function, the original valid direction is not updated, and maintains unchanged until the outer screen automatic rotation function is enabled again.

Take FIG. 10A, FIG. 10B, FIG. 10C, and FIG. 10D as an example. Images are displayed on the outer screen. Before displaying the images, the electronic device has enabled the outer screen automatic rotation function. Then, when the electronic device is switched from portrait to left landscape, the images are switched from portrait display to left landscape display, and the original valid direction is updated from portrait to left landscape. In the process of displaying images in the left landscape mode, the electronic device disables the outer screen automatic rotation function. The original valid direction of the image is the left landscape. In this case, after the electronic device is switched from the left landscape to the portrait, the outer screen direction control module controls the image to be displayed in the left landscape mode.

26) If the application is an application whose direction can be automatically rotated according to the state of the device, and the outer screen rotation control flag indicates that the outer screen automatic rotation function is enabled, the outer screen direction control module determines whether the usage direction is −1 (that is, in a flat posture), if the usage direction is −1, determines whether to enable the outer screen automatic rotation function before the application is started, and if the outer screen automatic rotation function is enabled before the application is started, controls the application to be displayed in the portrait mode. If the outer screen automatic rotation function is enabled after the application program is started, the application program is controlled to keep the display direction unchanged. For example, if the image is displayed in the left landscape mode in a flat position, the outer screen automatic rotation function is enabled after the gallery application is started, and regardless of whether the electronic device is used in the portrait mode or the left landscape mode, the image maintains unchanged in the left landscape mode.

If the usage direction is not −1, the outer screen direction control module controls the display of the application program according to the usage direction of the electronic device. In addition, the outer screen direction control module updates the original valid direction after determining the change of the display direction of the application program. Take FIG. 10A, FIG. 10B, FIG. 10C, and FIG. 10D as an example. Images are displayed on the outer screen. Before displaying the images, the electronic device has enabled the outer screen automatic rotation function. Then, when the electronic device is switched from portrait to left landscape, the images are switched from portrait display to left landscape display, and the original valid direction is updated from portrait to left landscape. It should be noted that when the usage direction is −1, the outer screen direction control module does not update the original valid direction. For the outer screen direction control module, the original valid direction is valid for the application program that is currently running in the foreground and can automatically rotate with the state of the device, and becomes invalid after the application exits. For example, the application program that is currently running in the foreground and can automatically rotate with the state of the device is a gallery application. When displaying images in the gallery application, the original valid direction is updated to the left landscape. Afterwards, the user disables the automatic rotation function of the outer screen. Before the gallery application exits from the foreground in the electronic device, the image is displayed in the left landscape mode. However, if the electronic device launches settings and other applications that can automatically rotate with the state of the device, these applications are displayed in the default display direction, and the electronic device exits the gallery application from the foreground (such as starts the gallery application again), and the images are displayed in the default display direction, such as in the portrait mode.

FIG. 19 shows the working process of the outer screen direction control module. The outer screen direction control module can control the display of applications according to the type of the application and whether the automatic rotation function of the outer screen is enabled, so that different types of applications can be displayed according to processing rules of this type of application program, so as to set personalized display for different types of application programs, meet the user display requirements for different types of application programs, and improve user experience.

In this embodiment, When the inner screen direction control module controls the content display according to the usage direction, the outer screen direction control module can refer to the application type and the inner screen rotation control flag. A processing rule of the inner screen direction control module is as follows:

For mandatory portrait applications, the inner screen direction control module controls the applications to be displayed in the portrait and/or inverted portrait mode. For mandatory landscape applications, the inner screen direction control module controls the applications to be displayed in the left landscape and/or right landscape mode.

For applications whose direction can be automatically rotated according to the state of the device, the inner screen direction control module can control the display of such applications according to the inner screen rotation control flag. For example, the inner screen rotation control flag indicates that the electronic device has enabled the inner screen automatic rotation function. The direction control module can control the display of the application program according to the usage direction of the electronic device, so that the display of such application program can change with the change of the usage direction of the electronic device. During the usage of such application program, if the inner screen rotation control flag indicates that the electronic device disables the inner screen automatic rotation function, that is, switches from enabling the inner screen automatic rotation function to disabling the inner screen automatic rotation function, the inner screen direction control module can control the application program to be displayed in the original valid direction.

The original valid direction is the display direction last used by the electronic device before the inner screen automatic rotation function of the electronic device is disabled. For example, the display direction used last time is the portrait, and the inner screen direction control module controls the application program to be displayed in the portrait mode. The display direction used last time is the landscape, and the inner screen direction control module may control the application program to be displayed in the landscape mode.

Before the electronic device disables the inner screen automatic rotation function, if the display direction of the application program changes with change of the usage direction of the electronic device, the inner screen direction control module can update the original valid direction. After the electronic device disables the inner screen automatic rotation function, the original valid direction is not updated, and maintains unchanged until the inner screen automatic rotation function is enabled again.

Figure 20:
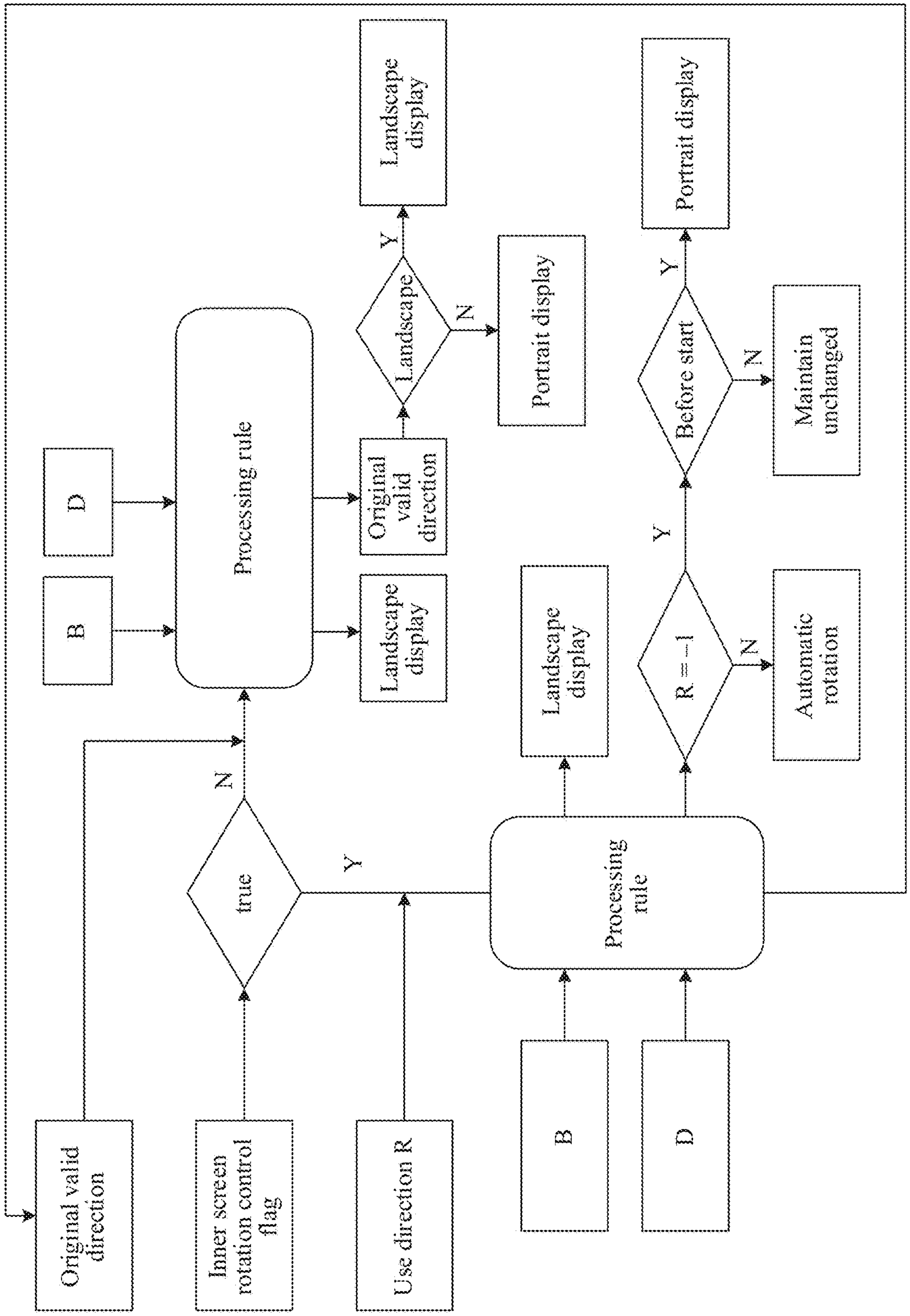
FIG. 20 is a schematic diagram of a working procedure of an inner screen direction control module according to this application.

The schematic diagram of the working process of the inner screen direction control module is shown in FIG. 20. In FIG. 20, B is a mandatory landscape application program, such as a game; and D is an application whose direction can be automatically rotated according to the state of the device, such as desktop, WeChat, settings and gallery. The working process of the inner screen direction control module may include the following steps:

21) The inner screen direction control module obtains the inner screen rotation control flag and the flag of the application program, where the flag of the application program is the flag of the focus application running on the electronic device in the foreground, the focus application is the application that occupies the focus window, and the focus window can be a window in which the user is currently operating. The flag of the application program can be the name of the application program, and the inner screen direction control module can determine the type of the application program through the flag of the application program, such as mandatory portrait or mandatory landscape.

The inner screen rotation control flag can indicate whether the inner screen automatic rotation function is enabled, and if flag==false, it means that the electronic device disables the inner screen automatic rotation function. If flag==true, it means that the electronic device enables the inner screen automatic rotation function.

22) The inner screen direction control module determines the type of the application program according to the flag of the application program.

23) If the application is a mandatory landscape application, the inner screen direction control module can control, according to processing rules, the application program to be displayed in the left landscape or right landscape mode.

For example, if the electronic device is used in the left landscape mode, the inner screen direction control module controls the application program to be displayed in the left landscape mode. If the electronic device is used in the right landscape, the inner screen direction control module controls the application program to be displayed in the right landscape. Mandatory landscape applications may not be affected by the inner screen rotation control flag, that is, regardless of whether the inner screen automatic rotation function is enabled or disabled on the electronic device, the inner screen direction control module can control the mandatory landscape application to be displayed in the left landscape or right landscape mode. For example, if the inner screen rotation control flag indicates that the electronic device enables the inner screen automatic rotation function, and the electronic device is used in the portrait mode, the inner screen direction control module can control this type of application to be used in the left landscape mode.

As shown in FIG. 11A, FIG. 11B, and FIG. 11C, the inner screen displays the game application. Although the electronic device has enabled the inner screen automatic rotation function, since the game application is a mandatory landscape application, the game application is displayed in the left landscape mode when the electronic device is used in the portrait mode. The electronic device is used in the left landscape mode, and the game application is displayed in the left landscape mode. The electronic device is used in the right landscape mode, and the game application is displayed in the right landscape mode.

24) If the application is an application whose direction can be automatically rotated according to the state of the device, the inner screen rotation control flag indicates that the inner screen automatic rotation function is disabled, and the inner screen direction control module controls the application program to be displayed in the original valid direction.

The original valid direction is the display direction last used by the electronic device before the inner screen automatic rotation function of the electronic device is disabled. Take FIG. 14 as an example. The electronic device is used in the left landscape mode, and the inner screen displays the desktop in the left landscape mode. If the user disables the automatic rotation function of the inner screen, the original valid direction of the desktop is the left landscape. After the user locks the electronic device and unlocks the electronic device again, the inner screen can continue to display the desktop in the left landscape mode, instead of automatically switching to the portrait mode as shown in FIG. 13. Therefore, when the electronic device is used as a tablet, for an application whose direction can be automatically rotated according to the state of the device, the display of the application is fixed after the automatic rotation function of the inner screen is disabled, and the display direction of the application maintains unchanged after entering the interface again to avoid forced rotation.

25) If the application is an application whose direction can be automatically rotated according to the state of the device, and the inner screen rotation control flag indicates that the inner screen automatic rotation function is enabled, the inner screen direction control module determines whether the usage direction is −1 (that is, in a flat posture), if the usage direction is −1, determines whether to enable the inner screen automatic rotation function before the application is started, and if the inner screen automatic rotation function is enabled before the application is started, controls the application to be displayed in the portrait mode. If the inner screen automatic rotation function is enabled after the application program is started, the application program is controlled to keep the display direction unchanged. For example, if the image is displayed in the left landscape mode in a flat position, the inner screen automatic rotation function is enabled after the gallery application is started, and regardless of whether the electronic device is used in the portrait mode or the left landscape mode, the image maintains unchanged in the left landscape mode.

If the usage direction is not −1, the inner screen direction control module controls the display of the application program according to the usage direction of the electronic device. In addition, the inner screen direction control module updates the original valid direction after determining the change of the display direction of the application program. Take FIG. 12A, FIG. 12B, FIG. 12C, FIG. 12D, FIG. 12E, and FIG. 12F as an example. If the electronic device has enabled the inner screen automatic rotation function, when the electronic device is switched from portrait to left landscape, the images are switched from portrait display to left landscape display, and the original valid direction is updated from portrait to left landscape. It should be noted that when the usage direction is −1, the inner screen direction control module does not update the original valid direction.

FIG. 20 shows the working process of the inner screen direction control module. The inner screen direction control module can control the display of applications according to the type of the application and whether the automatic rotation function of the inner screen is enabled, so that different types of applications can be displayed according to processing rules of this type of application program, so as to set personalized display for different types of application programs, meet the user display requirements for different types of application programs, and improve user experience.

For example, force landscape applications are always displayed in the landscape mode. If the electronic device is used in the left landscape mode, mandatory landscape applications are used in the left landscape mode; if the electronic device is used in the right landscape, mandatory landscape applications are used in the right landscape mode. For applications whose direction can be automatically rotated according to the state of the device (referred to as rotatable applications for short), if the electronic device enables the automatic rotation function of the inner screen, the display direction of the rotatable application can change with the change of the usage direction. If the electronic device disables the automatic rotation function of the inner screen, the display direction of the rotating application is the original valid direction.

For example, when the inner screen displays images, the original valid direction is the left landscape. If the electronic device disables the automatic rotation function of the inner screen and the electronic device is used in the left landscape mode, when the electronic device enters the desktop or other rotatable applications again, the desktop or other rotatable applications can be displayed in the left landscape mode. If the electronic device is used in the portrait mode when the electronic device enters the desktop or other rotatable applications again, the desktop or other rotatable applications can be displayed in the left landscape mode. That is, during the direction control process of the inner screen, the original valid direction is valid for all applications whose direction can be automatically rotated according to the state of the device. For example, when displaying an image, the original valid direction is the left landscape. If the electronic device started applications such as desktop and WeChat after the automatic rotation function of the inner screen is disabled, the desktop and WeChat can be displayed in the left landscape mode according to the original valid direction, that is, regardless of whether the electronic device is used in portrait or landscape mode, all applications that can be automatically rotated according to the state of the device are displayed by the electronic device in the original valid direction before the disabling. In addition, after the electronic device enters the desktop or other rotatable applications again, the user can enable the automatic rotation function of the inner screen, and the display direction of the desktop or other rotatable applications can change with the rotation of the electronic device. The original valid direction can be changed according to change of the display direction. However, once the automatic rotation function of the inner screen is disabled, the display direction of the desktop or other rotatable applications is the original valid direction before the disabling until the user enables the automatic rotation function of the inner screen again.

Besides, this application provides an electronic device. The electronic device includes a first display screen, a second display screen, one or more processors, and a memory; where the memory stores programs, and when executed by the one or more processors, the programs cause the electronic device to perform the above display control method.

This application further provides a readable storage medium. The readable storage medium stores a computer program, and when the computer program is executed by a processor, the above display control method is implemented.

This application further provides a display control apparatus, applied to an electronic device including a first display screen and a second display screen. The display control apparatus includes: a first control module, a first display screen direction control module, and a second display screen direction control module.

The first control module is configured to: in response to a first type of operation of a user, if the electronic device is in a first usage posture of a folded state, display first application content in a first display direction through the first display screen, and if the electronic device is in a first usage posture of an unfolded state, display the first application content in the first display direction through the second display screen.

The first display screen direction control module is configured to: in response to a second type of operation of a user, if the electronic device is switched from the first usage posture of the folded state to a second usage posture of the folded state and a first control flag of the electronic device is a first value, display the first application content in a second display direction through the first display screen, where the second display direction is different from the first display direction, and the first usage posture is different from the second usage posture.

The second display screen direction control module is configured to: if the electronic device is switched from the first usage posture of the unfolded state to a second usage posture of the unfolded state and a second control flag of the electronic device is a second value, continue to display the first application content in the first display direction through the second display screen.

It can be seen from the above technical solutions that the electronic device can be used in different usage postures of the folded state or the unfolded state, the content is displayed through the first display screen in the folded state, and the content is displayed through the second display screen in the unfolded state. If the electronic device is switched from the first usage posture of the folded state to the second usage posture of the folded state and the first control flag is the first value, the first display screen is switched from the first display direction to the second display direction, and the first application content is displayed in the second display direction. If the electronic device is switched from the first usage posture of the unfolded state to the second usage posture of the unfolded state and the second control flag is the second value, and the second display screen can continue to display the first application content in the first display direction, to control the first display screen and the second display screen based on the first control flag and the second control flag. Besides, the first control flag corresponds to the first display screen, and the second control flag corresponds to the second display screen. The first control flag and the second control flag are independent of each other and do not affect each other. Therefore, the first display screen can be independently controlled based on the first control flag, and the second display screen can be independently controlled based on the second control flag, preventing the display of the first display screen from affecting the display of the second display screen.

For example, the first usage posture and the second usage posture are respectively one of a portrait usage posture, a left landscape usage posture, and a right landscape usage posture. The portrait usage posture corresponds to portrait display, and the left landscape usage posture corresponds to left landscape display, and the right landscape usage gesture corresponds to right landscape display. If the electronic device is in the folded state and is switched from the portrait usage posture to the left landscape usage posture, the first control flag is the first value, and the first value indicates that a first display screen automatic rotation function is enabled, the electronic device can be switched from portrait display to left landscape display to display the first application content. If the electronic device is in the unfolded state and is switched from the portrait usage posture to the left landscape usage posture, the second control flag is the second value, and the second value indicates that an automatic rotation function of the second display screen is disabled, the usage posture of the electronic device changes but the second display screen still displays the first application content in the portrait mode, so that the display of the first display screen and the second display screen can be independently controlled according to whether the automatic rotation function is enabled, so as to prevent the first display screen and the second display screen from affecting each other.

In a possible implementation, the second display screen direction control module is configured to: if the electronic device is switched from the first usage posture of the unfolded state to the second usage posture of the unfolded state, and the second control flag is the first value, display the first application content in the second display direction through the second display screen, where the first application content is content of a first application running in the foreground of the electronic device. Correspondingly, the display control apparatus further includes: an adjustment module and a switching module. The adjustment module is configured to: in response to the third type of operation of the user, adjust the second control flag from the first value to the second value. The second display screen direction control module is configured to: in response to the second type of operation of the user, if the electronic device is switched from the second usage posture of the unfolded state to a third usage posture of the unfolded state, display the first application content in the second display direction through the second display screen, where the second usage posture and the third usage posture are different. The switching module is configured to: in response to a fourth type of operation of the user, switch an application running in the foreground of the electronic device from the first application to a second application, where the first application and the second application are landscape and portrait display applications. The second display screen direction control module is configured to display second application content in the second display direction through the second display screen, where the second application content is content of the second application.

In this embodiment, if the second control flag is the first value, it means that the electronic device has enabled the automatic rotation function of the second display screen, and when the usage posture of the electronic device in the unfolded state changes, the display direction of the second display screen can also change. When the second control flag maintains the second value, the application running in the foreground of the electronic device is switched from the first application to the second application of the same type as the first application, and the electronic device can display the content of the second application in the same display direction as that of the first application content, so that the first application and the second application of the same type can adopt the same display direction when the second control flag is the second value. Therefore, after the display direction is fixed, this reduces the probability that the display direction of the second display screen is forced to rotate due to application switching. For example, when the second control flag is the first value, the second display screen is displayed in left landscape mode, the electronic device is switched from the gallery application to the setting application, and when the setting application is started, the electronic device can display content of the setting application in left landscape mode.

In a possible implementation, the switching module is configured to: in response to the fourth type of operation of the user, switch the application running in the foreground of the electronic device from the second application to the first application; and the second display screen direction control module is configured to display the first application content in the second display direction through the second display screen, so that when the second control flag maintains the second value, after the electronic device runs the first application again, the content of the first application is still displayed in the previous display direction (that is, the second display direction).

In a possible implementation, the display control apparatus further includes: a screen lock module and an unlocking module. The screen lock module is configured to: in response to a screen lock operation of the user, locking the second display screen in a black screen state. The unlocking module is configured to: when the second display screen is switched from the black screen state to an off screen display state, display an unlocking interface in the second display direction through the second display screen. The second display screen direction control module is configured to: in response to an unlocking operation of the user, switch the second display screen from displaying the unlocking interface to displaying application content, and display application content in the second display direction through the second display screen. Because the second control flag maintains the second value, and the display direction of the electronic device is fixed at the second display direction, regardless of whether the unlocking interface or the application content is displayed, the electronic device can display the unlocking interface or the application content in the second display direction. Therefore, after the display direction is fixed, when the application is entered again, the display direction maintains unchanged and there is no forced rotation of the display direction.

In a possible implementation, the first application content is the content of the first application running in the foreground of the electronic device, and the first application is a landscape and portrait display application. The display control apparatus further includes: a switching module, configured to: in response to the fourth type of operation of the user, switch an application running in the foreground of the electronic device from the first application to a fourth application, where the fourth application is a portrait display application; and a second display screen direction control module, configured to: if the electronic device is switched from the first usage posture of the unfolded state to the second usage posture of the unfolded state, and the second control flag is the first value, display fourth application content in the second display direction or the first display direction through the second display screen, where the fourth application content is content of the fourth application, a usage direction of the first usage posture is one of portrait and inverted portrait, a usage direction of the second usage posture is opposite to that of the first usage posture, and the second display direction is opposite to the first display direction. For a portrait display application, after the electronic device is switched from a portrait usage posture to an inverted portrait usage posture, the display direction of the second display screen may change or maintain unchanged.

In a possible implementation, the second display screen direction control module is configured to: in response to the first type of operation of the user, if the electronic device is in a special usage posture of the unfolded state, and the second control flag is the first value, display the first application content in a portrait display direction through the second display screen. The display control apparatus further includes: an adjustment module, configured to: in response to the third type of operation of the user, adjust the second control flag from the first value to the second value; and a second display screen direction control module, configured to: when the electronic device maintains the special usage posture of the unfolded state, display the first application content in the portrait display direction through the second display screen. In this embodiment, the special usage posture may be a flat posture. If the electronic device is in the flat posture, and the second control flag is the first value before the first application is started, the second display screen can display the first application content in the portrait mode. After the first application is started, the second control flag is adjusted to the second value. In this case, the first application content can maintain display in the portrait mode.

In a possible implementation, the second display screen direction control module is configured to: if the electronic device is in the special usage posture of the unfolded state and the second control flag is the first value after displaying the first application content, maintain the display direction of the second display screen unchanged. For example, the second display screen displays the first application content in the second display direction, and then the electronic device is in the special usage posture of the unfolded state. Even if the second control flag is the first value, the second display screen still displays the first application content in the second display direction. If switching from the first application to the second application, when the electronic device maintains the special usage posture, the second display screen can display the content of the second application in the second display direction, so that the display direction of the second display screen maintains unchanged under the special usage posture.

In a possible implementation, the display control apparatus further includes: an angle recognition module and a direction recognition module, where the angle recognition module is configured to determine the current usage form of the electronic device. a direction recognition module, configured to determine the current usage posture of the electronic device; a first display screen direction control module, configured to: if the current usage form of the electronic device is the folded state, control display of the first display screen according to the current usage posture of the electronic device and the first control flag; and a second display screen direction control module, configured to: if the current usage form of the electronic device is the unfolded state, control display of the second display screen according to the current usage posture of the electronic the second control flag, so as to control the first display screen through the first display screen direction control module, and control the second display screen through the second display screen direction control module.

In a possible implementation, the display control apparatus further includes: a determining module, configured to determine a type of the first application running in the foreground of the electronic device. The first display screen direction control module and the second display screen direction control module refer to the type of the first application when controlling the display, so as to control the display of the first display screen or the second display screen according to the type of the first application.

In a possible implementation, the second display screen direction control module being configured to: if the current usage form of the electronic device is the unfolded state, control display of the second display screen according to the current usage posture of the electronic device and the second control flag includes: if the first application is a landscape display application, controlling the second display screen to display in the left landscape mode when the current usage posture of the electronic device is the left landscape usage posture, and controlling the second display screen to display in the right landscape mode when the current usage posture of the electronic device is the right landscape usage posture; if the first application is a landscape and portrait display application and the current usage posture of the electronic device is a special usage posture, if it is determined that the second control flag is the first value before the first application is started, controlling the second display screen to display in the portrait mode, and if it is determined that the second control flag is the first value after the first application is started, controlling the second display screen to display in a display direction that is used before the first application is started; if the first application is a landscape and portrait display application and the current usage posture of the electronic device is not the special usage posture, if it is determined that the second control flag is the first value, controlling the second display screen to display in a display direction that matches the usage posture; and if the first application is a landscape and portrait display application, if it is determined that the second control flag is the second value, controlling the second display screen to display in an original effective direction, where the original effective direction is a display direction used by the second display screen for the last time before the second control flag is adjusted to the second value.

In a possible implementation, the second display screen direction control module being configured to: if the current usage form of the electronic device is the unfolded state, control display of the second display screen according to the current usage posture of the electronic device and the second control flag includes: if the first application is a portrait display application and the second control flag is the first value, controlling the second display screen to display in the portrait mode when the current usage posture of the electronic device is the portrait usage posture, and controlling the second display screen to display in portrait or inverted portrait mode when the current usage posture of the electronic device is an inverted portrait usage posture.

In a possible implementation, the angle recognition module is configured to obtain a folding angle of the electronic device; if the folding angle of the electronic device is greater than a preset angle, determine that the electronic device is in the unfolded state; and if the folding angle of the electronic device is less than or equal to the preset angle, determine that the electronic device is in the folded state.

In a possible implementation, the direction recognition module is configured to obtain a pitch angle of the electronic device based on the acceleration value of the current frame; obtain a deflection angle of the electronic device according to the pitch angle of the electronic device; and determine a usage direction of the electronic device according to the deflection angle of the electronic device, where the usage direction of the electronic device represents the usage posture of the electronic device.

In a possible implementation, the direction recognition module is configured to: if the direction recognition module determines that a modulus of the acceleration value of the current frame does not exceed a preset modulus threshold, an amplitude difference between the acceleration value of the current frame and an acceleration value of a previous frame does not exceed a preset amplitude difference threshold, and a y-axis amplitude value of the acceleration value of the current frame is not a preset value, obtain the pitch angle of the electronic device according to the acceleration value of the current frame; obtain a deflection angle of the electronic device when the pitch angle is less than a preset pitch angle; and correct the deflection angle of the electronic device, where correcting the deflection angle includes correcting the deflection angle of the electronic device to a positive number if it is determined that the deflection angle of the electronic device is a negative number; maintain the deflection angle unchanged if it is determined that the deflection angle of the electronic device is a positive number; and obtain the usage direction of the electronic device according to the corrected deflection angle.

In a possible implementation, if the direction recognition module determines that a modulus of the acceleration value of the current frame exceeds a preset modulus threshold, or an amplitude difference between the acceleration value of the current frame and an acceleration value of a previous frame exceeds a preset amplitude difference threshold, or a y-axis amplitude value of the acceleration value of the current frame is a preset value, the direction recognition module is configured to determine that the acceleration value of the current frame is invalid; and/or the direction recognition module is configured to determine that the usage posture of the electronic device is the special usage posture when the pitch angle is greater than or equal to the preset pitch angle; and/or the direction recognition module is configured to replace the acceleration value of the previous frame with the acceleration value of the current frame after determining the usage direction of the electronic device.

The descriptions of the processes or structures corresponding to each of the above figures have their own emphasis. For parts that are not detailed in a certain process or structure, please refer to the relevant descriptions of other processes or structures.

What is claimed is:

1. A display control method, applicable to an electronic device, wherein the electronic device comprises a first display screen and a second display screen, and the method comprises:

in response to a first operation of rotating the electronic device, based on a first usage posture of the electronic device being folded, displaying first application content of a first application in a first display direction through the first display screen, and based on the first usage posture of the electronic device being unfolded, displaying the first application content in the first display direction through the second display screen;

when the electronic device is folded, in response to a second operation of rotating the electronic device and the electronic device being switched from the first usage posture to a second usage posture;

based on a first control flag of the electronic device being a first value, displaying the first application content in a second display direction through the first display screen, wherein the second display direction is different from the first display direction, and the first usage posture is different from the second usage posture; and when the electronic device is unfolded, in response to the second operation of rotating the electronic device and the electronic device being switched from the first usage posture to the second usage posture:

based on a second control flag of the electronic device being a first value and the first application being a landscape display application, displaying the first application content in a left landscape display direction through the second display screen when the second usage posture is a left landscape usage posture and displaying the first application content in a right landscape display direction when the second usage posture is a right landscape usage posture; and based on the second control flag of the electronic device being a second value and the first application being a landscape and portrait display application, displaying the first application content in an original effective display direction through the second display screen, wherein the original effective display direction is a display direction adopted by the second display screen at a last time before the second control flag is adjusted to the second value.

2. The method according to claim 1, wherein the method further comprises:

when the electronic device is unfolded, based on the electronic device being switched from the first usage posture to the second usage posture and the second control flag being the first value, displaying the first application content in the second display direction through the second display screen, wherein the first application content is content of the first application running in a foreground of the electronic device;

in response to a third operation of clicking an automatic rotation controlling control, adjusting the second control flag from the first value to the second value;

when the electronic device is unfolded, in response to the second operation, based on the electronic device being switched from the second usage posture to a third usage posture, displaying the first application content in the second display direction through the second display screen, wherein the second usage posture and the third usage posture are different;

in response to a fourth operation of clicking an icon, switching an application running in the foreground of the electronic device from the first application to a second application, wherein the first application and the second application are landscape and portrait display applications; and displaying second application content in the second display direction through the second display screen, wherein the second application content is content of the second application.

3. The method according to claim 2, wherein the method further comprises:

in response to the fourth operation, switching the application running in the foreground of the electronic device from the second application to the first application; and displaying the first application content in the second display direction through the second display screen.

4. The method according to claim 2, wherein after displaying the first application content in the second display direction through the second display screen or displaying the second application content in the second display direction through the second display screen, the method further comprises:

in response to a screen lock operation, displaying the second display screen in a black screen state;

based on the second display screen being switched from the black screen state to an off screen display state, displaying an unlocking interface in the second display direction through the second display screen; and in response to an unlocking operation, switching the second display screen from displaying the unlocking interface to displaying application content, and displaying application content in the second display direction through the second display screen.

5. The method according to claim 1, wherein the first application content is content of the first application running in a foreground of the electronic device, and the first application is a landscape and portrait display application; and wherein the method further comprises:

in response to a fourth operation of clicking an icon, switching an application running in the foreground of the electronic device from the first application to a fourth application, wherein the fourth application is a portrait display application; and based on the electronic device being switched from the first usage posture to the second usage posture and the second control flag being the first value, displaying fourth application content in the second display direction or the first display direction through the second display screen, wherein the fourth application content is content of the fourth application, a usage direction of the first usage posture is one of portrait and inverted portrait, a usage direction of the second usage posture is opposite to that of the first usage posture, and the second display direction is opposite to the first display direction.

6. The method according to claim 1, wherein the method further comprises:

in response to the first operation, based on the electronic device being in a special usage posture and the second control flag being the first value, displaying the first application content in a portrait display direction through the second display screen;

in response to a third operation of clicking an automatic rotation controlling control, adjusting the second control flag from the first value to the second value; and based on the electronic device maintaining the special usage posture, displaying the first application content in the portrait display direction through the second display screen.

7. The method according to claim 1, wherein the method further comprises:

based on the electronic device being in a special usage posture and the second control flag being the first value, after displaying the first application content, maintaining the display direction of the second display screen unchanged.

8. The method according to claim 1, wherein the method further comprises:

determining a current usage form of the electronic device through angle recognition of the electronic device;

determining a current usage posture of the electronic device through direction recognition of the electronic device;

based on the current usage form of the electronic device being folded, controlling display of the first display screen according to the current usage posture of the electronic device and the first control flag; and controlling, based on the current usage form of the electronic device being unfolded, display of the second display screen according to the current usage posture of the electronic device and the second control flag.

9. The method according to claim 8, wherein the method further comprises:

determining a type of the first application running in a foreground of the electronic device, wherein controlling the display of the second display screen is based on the type of the first application.

10. The method according to claim 9, wherein the controlling, based on the current usage form of the electronic device being unfolded, display of the second display screen according to the current usage posture of the electronic device and the second control flag further comprises:

when the first application is a landscape and portrait display application and the current usage posture of the electronic device is a special usage posture, based on the second control flag being the first value before the first application is started, controlling the second display screen to display in a portrait display direction, and based on the second control flag being the first value after the first application is started, controlling the second display screen to display in a display direction that is adopted before the first application is started, wherein the special usage posture is a usage posture other than the first usage posture and the second usage posture; and when the first application is a landscape and portrait display application and the current usage posture of the electronic device is not the special usage posture, based on the second control flag being the first value, controlling the second display screen to display in a display direction that matches the current usage posture.

11. An electronic device, comprising: a first display screen; a second display screen; one or more processors; and a memory, wherein the memory stores a program, the program, when executed by the one or more processors, causes the electronic device to perform operations comprising: in response to a first operation of rotating the electronic device, based on a first usage posture of the electronic device being folded, displaying first application content of a first application in a first display direction through the first display screen, and based on the first usage posture of the electronic device being unfolded, displaying the first application content in the first display direction through the second display screen; when the electronic device is folded, in response to a second operation of rotating the electronic device and the electronic device being switched from the first usage posture to a second usage posture: based on a first control flag of the electronic device being a first value, displaying the first application content in a second display direction through the first display screen, wherein the second display direction is different from the first display direction, and the first usage posture is different from the second usage posture; and when the electronic device is unfolded, in response to the second operation of rotating the electronic device and the electronic device being switched from the first usage posture to the second usage posture: based on a second control flag of the electronic device being a first value and the first application being a landscape display application, displaying the first application content in a left landscape display direction through the second display screen when the second usage posture is a left landscape usage posture and displaying the first application content in a right landscape display direction when the second usage posture is a right landscape usage posture; and based on the second control flag of the electronic device being a second value and the first application being a landscape and portrait display application, displaying the first application content in an original effective display direction through the second display screen, wherein the original effective display direction is a display direction adopted by the second display screen at a last time before the second control flag is adjusted to the second value.

12. The electronic device according to claim 11, wherein the operations further comprise:

when the electronic device is unfolded, based on the electronic device being switched from the first usage posture to the second usage posture and the second control flag being the first value, displaying the first application content in the second display direction through the second display screen, wherein the first application content is content of the first application running in a foreground of the electronic device;

in response to a third operation of clicking an automatic rotation controlling control, adjusting the second control flag from the first value to the second value;

when the electronic device is unfolded, in response to the second operation, based on the electronic device being switched from the second usage posture to a third usage posture, displaying the first application content in the second display direction through the second display screen, wherein the second usage posture and the third usage posture are different;

in response to a fourth operation of clicking an icon, switching an application running in the foreground of the electronic device from the first application to a second application, wherein the first application and the second application are landscape and portrait display applications; and displaying second application content in the second display direction through the second display screen, wherein the second application content is content of the second application.

13. The electronic device according to claim 12, wherein the operations further comprise:

in response to the fourth operation, switching the application running in the foreground of the electronic device from the second application to the first application; and displaying the first application content in the second display direction through the second display screen.

14. The electronic device according to claim 12, wherein after displaying the first application content in the second display direction through the second display screen or displaying the second application content in the second display direction through the second display screen, the operations further comprise:

in response to a screen lock operation, displaying the second display screen in a black screen state;

based on the second display screen being switched from the black screen state to an off screen display state, displaying an unlocking interface in the second display direction through the second display screen; and in response to an unlocking operation, switching the second display screen from displaying the unlocking interface to displaying application content, and displaying application content in the second display direction through the second display screen.

15. The electronic device according to claim 11, wherein the first application content is content of the first application running in a foreground of the electronic device, and the first application is a landscape and portrait display application; and wherein the operations further comprise:

in response to a fourth operation of clicking an icon, switching an application running in the foreground of the electronic device from the first application to a fourth application, wherein the fourth application is a portrait display application; and based on the electronic device being switched from the first usage posture to the second usage posture and the second control flag being the first value, displaying fourth application content in the second display direction or the first display direction through the second display screen, wherein the fourth application content is content of the fourth application, a usage direction of the first usage posture is one of portrait and inverted portrait, a usage direction of the second usage posture is opposite to that of the first usage posture, and the second display direction is opposite to the first display direction.

16. The electronic device according to claim 11, wherein the operations further comprise:

in response to the first operation, based on the electronic device being in a special usage posture and the second control flag being the first value, displaying the first application content in a portrait display direction through the second display screen;

in response to a third operation of clicking an automatic rotation controlling control, adjusting the second control flag from the first value to the second value; and based on the electronic device maintaining the special usage posture, displaying the first application content in the portrait display direction through the second display screen.

17. The electronic device according to claim 11, wherein the operations further comprise:

based on the electronic device being in a special usage posture and the second control flag being the first value, after displaying the first application content, maintaining the display direction of the second display screen unchanged.

18. The electronic device according to claim 11, wherein when the electronic device is unfolded, in response to the second operation of rotating the electronic device and based on the electronic device being switched from the first usage posture of the unfolded state to the second usage posture:

when the first application is a landscape and portrait display application and the current usage posture of the electronic device is a special usage posture, based on the second control flag being the first value before the first application is started, controlling the second display screen to display in a portrait display direction, and based on the second control flag being the first value after the first application is started, controlling the second display screen to display in a display direction that is adopted before the first application is started, wherein the special usage posture is a usage posture other than the first usage posture and the second usage posture; and when the first application is a landscape and portrait display application and the current usage posture of the electronic device is not the special usage posture, based on the second control flag being the first value, controlling the second display screen to display in a display direction that matches the current usage posture.

19. A non-transitory computer-readable storage medium storing a computer program that, when executed by a processor included in an electronic device, causes the electronic device to perform operations comprising:

in response to a first operation of rotating the electronic device, based on a first usage posture of the electronic device being folded, displaying first application content of a first application in a first display direction through a first display screen, and based on the first usage posture of the electronic device being unfolded, displaying the first application content in the first display direction through a second display screen, wherein the electronic device comprises the first display screen and the second display screen;

when the electronic device is folded, in response to a second operation of rotating the electronic device and the electronic device being switched from the first usage posture to a second usage posture:

based on a first control flag of the electronic device being a first value, displaying the first application content in a second display direction through the first display screen, wherein the second display direction is different from the first display direction, and the first usage posture is different from the second usage posture; and when the electronic device is unfolded, in response to the second operation of rotating the electronic device and the electronic device being switched from the first usage posture to the second usage posture:

based on a second control flag of the electronic device being a first value and the first application being a landscape display application, displaying the first application content in a left landscape display direction through the second display screen when the second usage posture is a left landscape usage posture and displaying the first application content in a right landscape display direction when the second usage posture is a right landscape usage posture; and based on the second control flag of the electronic device being a second value and the first application being a landscape and portrait display application, displaying the first application content in an original effective display direction through the second display screen, wherein the original effective display direction is a display direction adopted by the second display screen at a last time before the second control flag is adjusted to the second value.

20. The computer-readable medium according to claim 19, wherein the operations further comprise:

when the electronic device is unfolded, based on the electronic device being switched from the first usage posture to the second usage posture and the second control flag being the first value, displaying the first application content in the second display direction through the second display screen, wherein the first application content is content of the first application running in a foreground of the electronic device;

in response to a third operation of clicking an automatic rotation controlling control, adjusting the second control flag from the first value to the second value;

when the electronic device is unfolded, in response to the second operation, based on the electronic device being switched from the second usage posture to a third usage posture, displaying the first application content in the second display direction through the second display screen, wherein the second usage posture and the third usage posture are different;

in response to a fourth operation of clicking an icon, switching an application running in the foreground of the electronic device from the first application to a second application, wherein the first application and the second application are landscape and portrait display applications; and displaying second application content in the second display direction through the second display screen, wherein the second application content is content of the second application.

* * * * *